United States Patent
Uchimura et al.

(10) Patent No.: US 10,321,111 B2
(45) Date of Patent: *Jun. 11, 2019

(54) INFORMATION PROCESSING APPARATUS, INFORMATION RECORDING MEDIUM, INFORMATION PROCESSING METHOD, AND PROGRAM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/833,669

(22) Filed: Dec. 6, 2017

(65) Prior Publication Data
US 2018/0098045 A1    Apr. 5, 2018

Related U.S. Application Data

(63) Continuation of application No. 14/916,450, filed as application No. PCT/JP2015/071080 on Jul. 24, 2015, now Pat. No. 9,860,508.

(30) Foreign Application Priority Data

Sep. 8, 2014  (JP) .................. 2014-181976
Oct. 21, 2014  (JP) .................. 2014-214198

(51) Int. Cl.
*H04N 9/80*  (2006.01)
*H04N 5/935*  (2006.01)
(Continued)

(52) U.S. Cl.
CPC .............. *H04N 9/87* (2013.01); *G11B 20/10* (2013.01); *G11B 20/1217* (2013.01);
(Continued)

(58) Field of Classification Search
CPC ..... G11B 27/322; G11B 27/32; G11B 27/105; H04N 9/8227; H04N 9/7921;
(Continued)

(56) References Cited

U.S. PATENT DOCUMENTS

| | | | |
|---|---|---|---|
| 9,454,996 B2 | 9/2016 | Kato | |
| 2008/0155401 A1* | 6/2008 | Honda | .............. G06F 17/30274 715/273 |
| 2014/0119712 A1 | 5/2014 | Jang et al. | |

FOREIGN PATENT DOCUMENTS

| | | |
|---|---|---|
| JP | 2011-023071 A | 2/2011 |
| JP | 2015-022775 A | 2/2015 |

(Continued)

OTHER PUBLICATIONS

Oct. 13, 2015, Written Opinion of the International Searching Authority for related International application No. PCT/JP2015/071080.

*Primary Examiner* — Robert Chevalier
(74) *Attorney, Agent, or Firm* — Paratus Law Group, PLLC

(57) ABSTRACT

Image reproduction according to a display apparatus is realized by acquiring image information of an ultra-high definition (UHD) image from a playlist file or a clip information file. A data processing unit that performs a reproduction process of a disc recording data acquires a playlist file or a clip information file as a reproduction control information file corresponding to reproduction data recorded in a disc, determines whether or not an ultra-high definition (UHD) image is recorded in the disc based on recording data of such a file, and, in a case where the ultra-high definition (UHD) image is recorded in the disc, acquires image information of the ultra-high definition (UHD) image from the (Continued)

reproduction control information and controls output data for a display apparatus based on the acquired image information.

20 Claims, 43 Drawing Sheets

(51) Int. Cl.
  *H04N 9/87* (2006.01)
  *H04N 11/24* (2006.01)
  *G11B 20/10* (2006.01)
  *H04N 5/85* (2006.01)
  *H04N 5/93* (2006.01)
  *G11B 27/10* (2006.01)
  *G11B 27/32* (2006.01)
  *G11B 20/12* (2006.01)
  *G11B 27/00* (2006.01)

(52) U.S. Cl.
  CPC ............ *G11B 27/00* (2013.01); *G11B 27/105* (2013.01); *G11B 27/329* (2013.01); *H04N 5/85* (2013.01); *H04N 5/93* (2013.01); *H04N 11/24* (2019.01); *G11B 2220/2541* (2013.01)

(58) Field of Classification Search
  CPC ......... H04N 21/234327; H04N 9/8042; H04N 9/8063; H04N 19/33; H04N 9/8205; H04N 5/775; H04N 5/85; H04N 5/765; H04N 5/907
  USPC ....... 386/241, 219, 243, 248, 281, 323, 324, 386/335, 336, 337
  See application file for complete search history.

(56) References Cited

FOREIGN PATENT DOCUMENTS

| WO | WO2012/147365 A1 | 11/2012 |
| WO | WO2013/046095 A1 | 4/2013 |

\* cited by examiner

FIG. 2

| | (A) CODEC (CODING FORMAT) | (B) RESOLUTION (PIXEL CONFIGURATION) | (C) OUTPUTTABLE COLOR GAMUT | (D) DYNAMIC RANGE |
|---|---|---|---|---|
| (1) | AVC | 1920×1080 (2K) | BT.709 | SDR |
| (2) | HEVC | 1920×1080 (2K) | BT.709 | SDR |
| (3) | HEVC | 1920×1080 (2K) | BT.2020 | SDR |
| (4) | HEVC | 1920×1080 (2K) | BT.2020 | HDR |
| (5) | HEVC | 3840×2160 (4K) | BT.709 | SDR |
| (6) | HEVC | 3840×2160 (4K) | BT.2020 | SDR |
| (7) | HEVC | 3840×2160 (4K) | BT.2020 | HDR |

FIG. 7

| Syntax | No. of bits | Mnemonic |
|---|---|---|
| xxxx. mpls { | | |
|   type_Indicator | 8*4 | bslbf |
|   version_number | 8*4 | bslbf |
|   playList_start_address | 32 | uimsbf |
|   playlistMark_start_address | 32 | uimsbf |
|   ExtensionData_start_address | 32 | uimsbf |
|   reserved | 160 | bslbf |
|   AppInfoPlayList() | | |
|   for (i=0;i<N1;i++) { | | |
|     padding_word | 16 | bslbf |
|   } | | |
|   PlayList() | | |
|   for (i=0;i<N2;i++) { | | |
|     padding_word | 16 | bslbf |
|   } | | |
|   PlayListMark() | | |
|   for (i=0;i<N3;i++) { | | |
|     padding_word | 16 | bslbf |
|   } | | |
|   ExtensionData() | | |
|   for (i=0;i<N4;i++) { | | |
|     padding_word | 16 | bslbf |
|   } | | |
| } | | |

FIG. 8

| Syntax | No. of bits | Mnemonic |
|---|---|---|
| ExtensionData() { | | |
|   length | 32 | uimsbf |
|   if(length !=0) { | | |
|     data_block_start_address | 32 | uimsbf |
|     reserved | 24 | bslbf |
|     number_of_ext_data_entries | 8 | uimsbf |
|     for (i=0;i<number_of_ext_data_entries;i++) { | | |
|       ext_data_entry() { | | |
|         ID1 | 16 | uimsbf |
|         ID2 | 16 | uimsbf |
|         ext_data_start_address | 32 | uimsbf |
|         ext_data_length | 32 | uimsbf |
|       } | | |
|     for (i=0<;i<L1;i++) { | | |
|       padding_word | 16 | bslbf |
|       padding_word | 16 | bslbf |
|     } | | |
|   } | | |
|   data_block | 32+ 8*(length− data_block_ start_address) | |
| } | | |

101 → {ID1, ID2}

102 → {data_block}

FIG. 9

| ID1 | ID2 | Data |
|---|---|---|
| 0x0001 | 0x0001 | ... |
| 0x0002 | ... | ... |
| 0x0002 | 0x0001 | ... |
| 0x0002 | ... | ... |
| 0x0003 | 0x0006 | ... |
| 0x0003 | 0x0001 | STN_table_UHD |

| Syntax | No. of bits | Mnemonic |
|---|---|---|
| STN_table() { | | |
|   length | 16 | uimsbf |
|   reserved | 16 | bslbf |
|   number_of_video_stream_entries | 8 | uimsbf |
|   ... | .. | .. |
|   for_video_stream_id=0;<br>    video_stream_id<<br>    number_of_video_stream_entries[pi_id];<br>    video_stream_id++) { | | |
|     stream_entry() | | |
|     stream_attribute_UHD() | | |
|   } | | |
| } | | |

121 → stream_entry()
122 → stream_attribute_UHD()

FIG. 11

| stream_attributes_UHD() | No. of bits | Mnemonic |
|---|---|---|
| { | | |
| stream_coding_type | 8 | bslbf |
| HDR_type | 2 | bslbf |
| color_space | 2 | bslbf |
| reserved | 28 | bslbf |
| } | | |

FIG. 12

| STREAM CODING INFORMATION (stream_coding_type) | MEANING (Meaning) |
|---|---|
| 0x02 | MPEG-2 |
| 0x1B | AVC |
| .. | .. |
| 0x21 | HEVC |
| .. | .. |

FIG. 13

| DYNAMIC RANGE SETTING INFORMATION (HDR_type) | MEANING (Meaning) |
|---|---|
| 00 | SDR |
| 01 | HDR-TYPE 1 |
| 10 | HDR-TYPE 2 |
| 11 | HDR-TYPE 3 |

FIG. 14

| COLOR GAMUT SETTING INFORMATION (color_space) | MEANING (Meaning) |
|---|---|
| 00 | BT. 709 |
| 01 | BT. 2020 |
| 10 | reserved |
| 11 | reserved |

FIG. 15

| stream_attributes_UHD() | No. of bits | Mnemonic |
|---|---|---|
| { | | |
| stream_coding_type | 8 | bslbf |
| HDR_type | 3 | bslbf |
| color_space | 2 | bslbf |
| reserved | 27 | bslbf |
| } | | |

FIG. 16

| DYNAMIC RANGE SETTING INFORMATION (HDR_type) | MEANING (Meaning) |
|---|---|
| 000 | SDR |
| 001 | HDR-TYPE 1 |
| 010 | HDR-TYPE 2 |
| 011 | HDR-TYPE 1 & 2 |
| 100 | HDR-TYPE 3 |
| 101 | HDR-TYPE 1 & 3 |
| 110 | HDR-TYPE 2 & 3 |
| 111 | HDR-TYPE 1 & 2 & 3 |

FIG. 17

| stream_attributes_UHD() | No. of bits | Mnemonic |
|---|---|---|
| { | | |
| stream_coding_type | 8 | bslbf |
| HDR_type_1_flag | 1 | bslbf |
| HDR_type_2_flag | 1 | bslbf |
| HDR_type_3_flag | 1 | bslbf |
| color_space | 2 | bslbf |
| reserved | 27 | bslbf |
| } | | |

FIG. 18

| DYNAMIC RANGE SETTING INFORMATION (HDR_type) | | MEANING (Meaning) |
|---|---|---|
| HDR TYPE-1 FLAG (HDR_type_1_flag) | 0 | HDR TYPE-1 IS NOT INCLUDED |
| HDR TYPE-1 FLAG (HDR_type_1_flag) | 1 | HDR TYPE-1 IS INCLUDED |
| HDR TYPE-2 FLAG (HDR_type_2_flag) | 0 | HDR TYPE-2 IS NOT INCLUDED |
| HDR TYPE-2 FLAG (HDR_type_2_flag) | 1 | HDR TYPE-2 IS INCLUDED |
| HDR TYPE-3 FLAG (HDR_type_3_flag) | 0 | HDR TYPE-3 IS NOT INCLUDED |
| HDR TYPE-3 FLAG (HDR_type_3_flag) | 1 | HDR TYPE-3 IS INCLUDED |

HDR TYPE-1 FLAG (HDR_type_1_flag) = 0
&
HDR TYPE-2 FLAG (HDR_type_2_flag) = 0   } = SDR
&
HDR TYPE-3 FLAG (HDR_type_3_flag) = 0

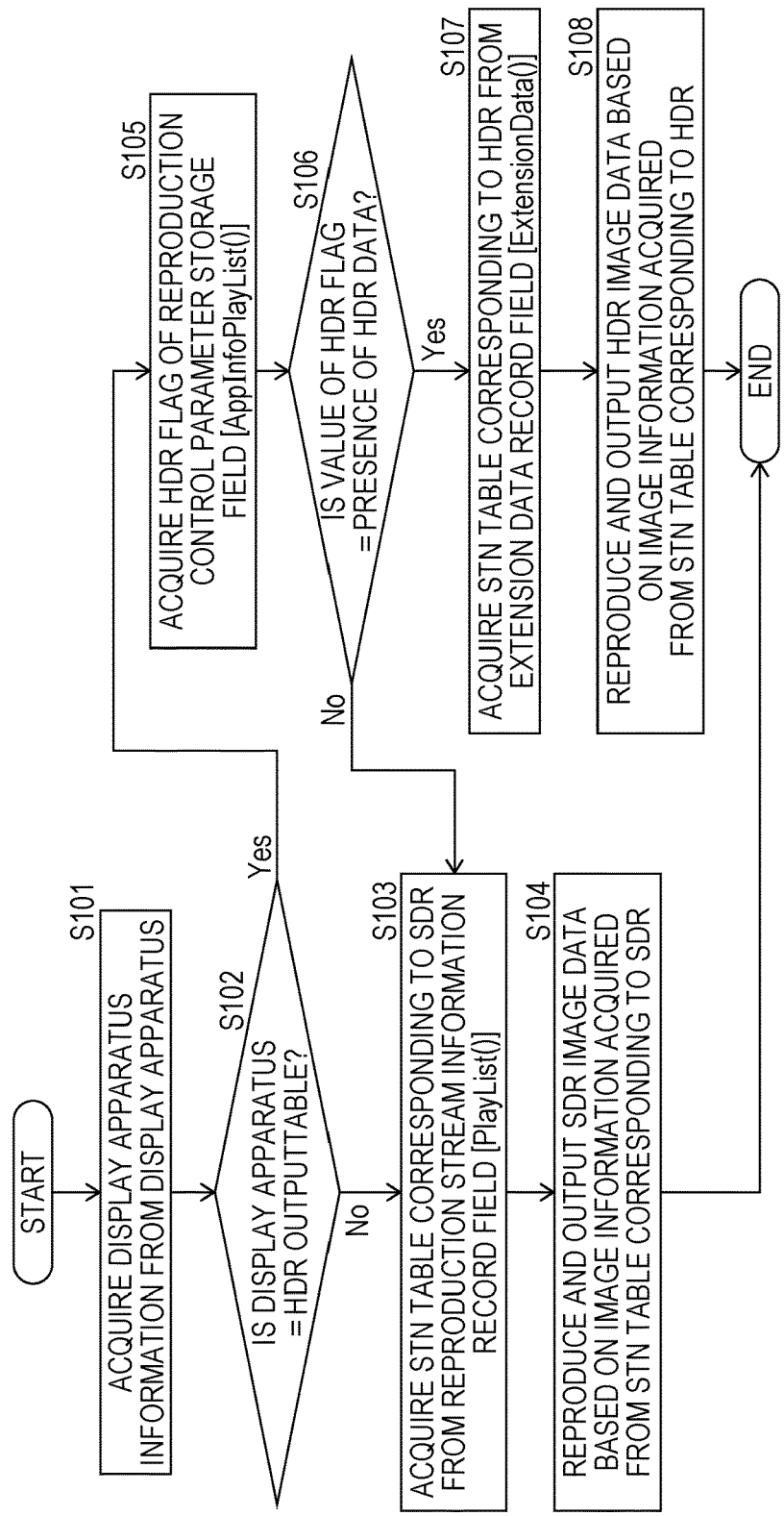

FIG. 21

| stream_attributes() | No. of bits | Mnemonic |
|---|---|---|
| ⋮ | | |
| stream_coding_type | 8 | bslbf |
| ⋮ | | |
| if(stream_coding_type == 0x21) { | | |
| video_format | 4 | bslbf |
| frame_rate | 4 | bslbf |
| aspect_ration | 4 | bslbf |
| reserved | 2 | bslbf |
| cc_flag | 1 | bslbf |
| HDR_type | 2 | bslbf |
| color_space | 2 | bslbf |
| reserved | 13 | bslbf |
| ISRC() | | |
| reserved | 32 | bslbf |
| } | | |

151 HEVC IMAGE INFORMATION RECORD FIELD

FIG. 23

| Syntax | No. of bits | Mnemonic |
|---|---|---|
| zzzzz. clpi{ | | |
|   type_Indicator | 8*4 | bslbf |
|   version_number | 8*4 | bslbf |
|   SequenceInfo_start_address | 32 | uimsbf |
|   ProgramInfo_start_address | 32 | uimsbf |
|   CPI_start_address | 32 | uimsbf |
|   ClipMark_start_address | 32 | uimsbf |
|   ExtensionData_start_address | 32 | uimsbf |
|   reserved | 96 | bslbf |
|   ClipInfo() | | |
|   for(i=0;i<N1;i++){ | | |
|     padding_word | 16 | bslbf |
|   } | | |
|   SequenceInfo() | | |
|   for(i=0;i<N2;i++){ | | |
|     padding_word | 16 | bslbf |
|   } | | |
|   ProgramInfo() | | |
|   for(i=0;i<N3;i++){ | | |
|     padding_word | 16 | bslbf |
|   } | | |
|   CPI() | | |
|   for(i=0;i<N4;i++){ | | |
|     padding_word | 16 | bslbf |
|   } | | |
|   ClipMark() | | |
|   for(i=0;i<N5;i++){ | | |
|     padding_word | 16 | bslbf |
|   } | | |
|   ExtensionData() | | |
|   for(i=0;i<N6;i++){ | | |
|     padding_word | 16 | bslbf |
|   } | | |
| } | | |

FIG. 24

| Syntax | No. of bits | Mnemonic |
|---|---|---|
| ClipInfo() { | | |
| length | 32 | uimsbf |
| reserved | 16 | bslbf |
| Clip_stream_type | 8 | bslbf |
| application_type | 8 | bslbf |
| reserved | 31 | |
| : | | |
| HDR_flag | 1 | bslbf |
| : | | |
| } | | |
| } | | |

| application_type | MEANING (Meaning) |
|---|---|
| 0 | Reserved |
| 1 | Main TS for a main-path of Movie |
| 2 | Main TS for a main-path of Time based slide show |
| 3 | Main TS for a main-path of Browsable slide show |
| ... | ... |
| 9 | Sub TS for a sub-path ... |
| 10 - 255 | reserved |

FIG. 26

| application_type | MEANING (Meaning) |
|---|---|
| 0 | Reserved |
| 1 | Main TS for a main-path of Movie |
| ... | ... |
| 10 | HEVC 1920x1080 BT.709 SDR |
| 11 | HEVC 1920x1080 BT.2020 SDR |
| 12 | HEVC 1920x1080 BT.2020 HDR |
| 13 | HEVC 3840x2160 BT.709 SDR |
| 14 | HEVC 3840x2160 BT.2020 SDR |
| 15 | HEVC 3840x2160 BT.2020 HDR |
| 16 - 255 | reserved |

FIG. 27

| Syntax | No. of bits | Mnemonic |
|---|---|---|
| ExtensionData() { | | |
|   length | 32 | uimsbf |
|   if(length !=0) { | | |
|     data_block_start_address | 32 | uimsbf |
|     reserved | 24 | bslbf |
|     number_of_ext_data_entries | 8 | uimsbf |
|     for (i=0;i<number_of_ext_data_entries;i++) { | | |
|       ext_data_entry() { | | |
|         ID1 | 16 | uimsbf |
|         ID2 | 16 | uimsbf |
|         ext_data_start_address | 32 | uimsbf |
|         ext_data_length | 32 | uimsbf |
|       } | | |
|     for (i=0<;i<L1;i++) { | | |
|       padding_word | 16 | bslbf |
|       padding_word | 16 | bslbf |
|     } | | |
|     data_block | 32+ 8 * (length− data_block_ start_address) | |
|   } | | |
| } | | |

*FIG. 28*

| ID1 | ID2 | Data |
|---|---|---|
| 0x0001 | 0x0001 | ... |
| 0x0002 | .. | .. |
| 0x0002 | 0x0001 | ... |
| 0x0002 | .. | .. |
| 0x0002 | 0x0006 | ... |
| 0x0003 | 0x0001 | STN_table_UHD |
| 0x0003 | 0x0002 | ProgramInfo_UHD |
| 0x0003 | 0x0003 | CPI_UHD |

| ProgramInfo_UHD() | No. of bits | Mnemonic |
|---|---|---|
| { | | |
| length | 32 | uimsbf |
| reserved | 8 | bslbf |
| number_of_program_sequences | 8 | uimsbf |
| for(i=0; i<number_of_program_secences; i++) { | | |
| SPN_program_secense_start[i] | 32 | uimsbf |
| program_pam_PID[i] | 16 | uimsbf |
| number_of_streams_in_ps[i] | 8 | uimsbf |
| reserved | 8 | bslbf |
| for(stream_index=0; stream_index<number_of_streams_in_ps[i] ; stream_index++) { | | |
| stream_PID[i][stream_index] | 16 | uimsbf |
| streamCodingInfo() | | |
| reserved | 32 | bslbf |
| } | | |
| } | | |
| for(i=0; I<N1; i++) { | | |
| padding_ward | 16 | bslbf |
| } | | |
| } | | |

| StreamCodingInfo_UHD() | No. of bits | Mnemonic |
|---|---|---|
| { | | |
| length | 8 | uimsbf |
| stream_coding_type | 8 | bslbf |
| UHD_video_coding_info() { | | |
| video_format | 4 | bslbf |
| frame_rate | 4 | bslbf |
| aspect_ratio | 4 | bslbf |
| reserved | 2 | bslbf |
| cc_flag | 1 | bslbf |
| reserved | 17 | |
| ISRC() | | |
| HDR_type | 2 | bslbf |
| color_space | 2 | bslbf |
| reserved | 28 | bslbf |
| } | | |

FIG. 31

(a) STREAM CODING INFORMATION

| STREAM CODING INFORMATION (stream_coding_type) | MEANING (Meaning) |
|---|---|
| 0x02 | MPEG-2 |
| 0x1B | AVC |
| .. | .. |
| 0x21 | HEVC |
| .. | .. |

(b) DYNAMIC RANGE SETTING INFORMATION

| DYNAMIC RANGE SETTING INFORMATION (HDR_type) | MEANING (Meaning) |
|---|---|
| 00 | SDR |
| 01 | HDR-TYPE 1 |
| 10 | HDR-TYPE 2 |
| 11 | HDR-TYPE 3 |

(c) COLOR GAMUT SETTING INFORMATION

| COLOR GAMUT SETTING INFORMATION (color_space) | MEANING (Meaning) |
|---|---|
| 00 | BT. 709 |
| 01 | BT. 2020 |
| 10 | reserved |
| 11 | reserved |

FIG. 32

| CPI_UHD() | No. of bits | Mnemonic |
|---|---|---|
| { | | |
| length | 32 | uimsbf |
| if(length != 0) { | | |
| reserved | 12 | bslbf |
| CPI_type | 4 | bslbf |
| EP_map_UHD() | | |
| } | | |
| for(i=0; I<N1; i++) { | | |
| padding_ward | 16 | bslbf |
| } | | |
| } | | |

(1) EP MAP FOR SDR

| EP_map for SDR | |
|---|---|
| PTS_EP_Start | SPN_EP_Start |
| PTS1 | X11(SDR) |
| PTS2 | X12(SDR) |
| PTS3 | X13(SDR) |
| ⋮ | ⋮ |

(2) EP MAP FOR HDR

| EP_map for HDR | |
|---|---|
| PTS_EP_Start | SPN_EP_Start |
| PTS1 | X21(HDR) |
| PTS2 | X22(HDR) |
| PTS3 | X23(HDR) |
| ⋮ | ⋮ |

FIG. 38

| Syntax | No. of bits | Mnemonic |
|---|---|---|
| ProgramInfo() { | | |
|   length | 32 | uimsbf |
|   reserved | 8 | bslbf |
|   number_of_program_sequences | 8 | uimsbf |
|   for(i=0; i<number_of_program_sequences; i++){ | | |
|     SPN_program_sequence_start[i] | 32 | uimsbf |
|     program_map_PID[i] | 16 | uimsbf |
|     number_of_streams_in_ps[i] | 8 | uimsbf |
|     reserved | 8 | bslbf |
|     for(stream_index=0; stream_index<number_of_streams_in_ps[i] stream_index++) { | | |
|       stream_PID[i][stream_index] | 16 | uimsbf |
|       streamCodingInfo[0, stream_index] | | |
|     } | | |
|   } | | |
| } | | |

| STREAM CODING INFORMATION (stream_coding_type) | MEANING (Meaning) |
|---|---|
| 0x02 | MPEG-2 |
| 0x1B | AVC |
| .. | .. |
| 0x21 | HEVC |
| .. | .. |

FIG. 41

| StreamCodingInfo() | No. of bits | Mnemonic |
|---|---|---|
| ... | | |
| stream_coding_type | 8 | bslbf |
| ... | | |
| if(stream_coding_type == 0x21) | | |
| video_format | 4 | bslbf |
| frame_rate | 4 | bslbf |
| aspect_ration | 4 | bslbf |
| reserved | 2 | bslbf |
| cc_flag | 1 | bslbf |
| HDR_type | 2 | bslbf |
| color_space | 2 | bslbf |
| reserved | 13 | bslbf |
| ISRC() | | |
| reserved | 32 | bslbf |
| } | | |

271 HEVC IMAGE INFORMATION RECORD FIELD

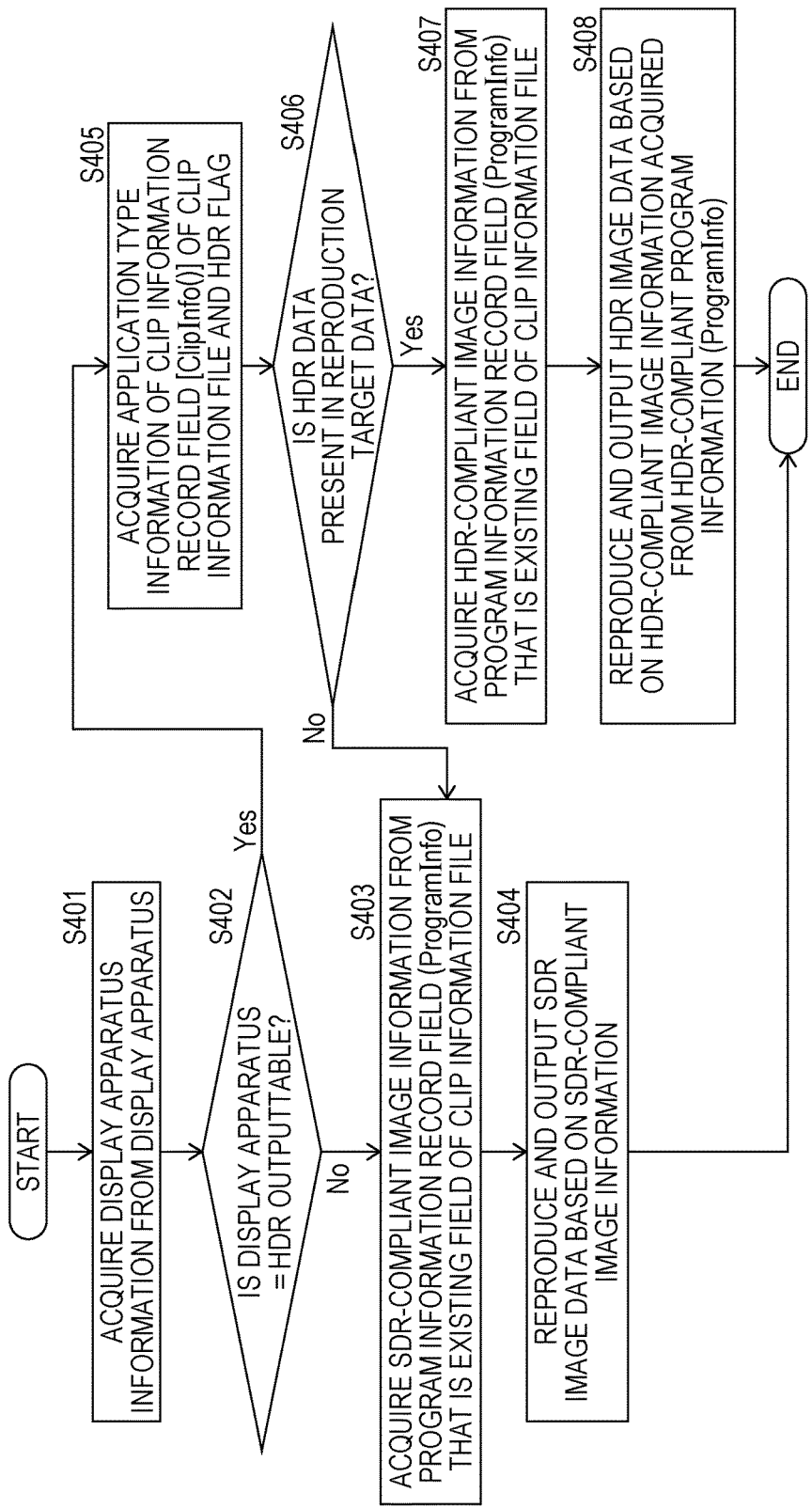

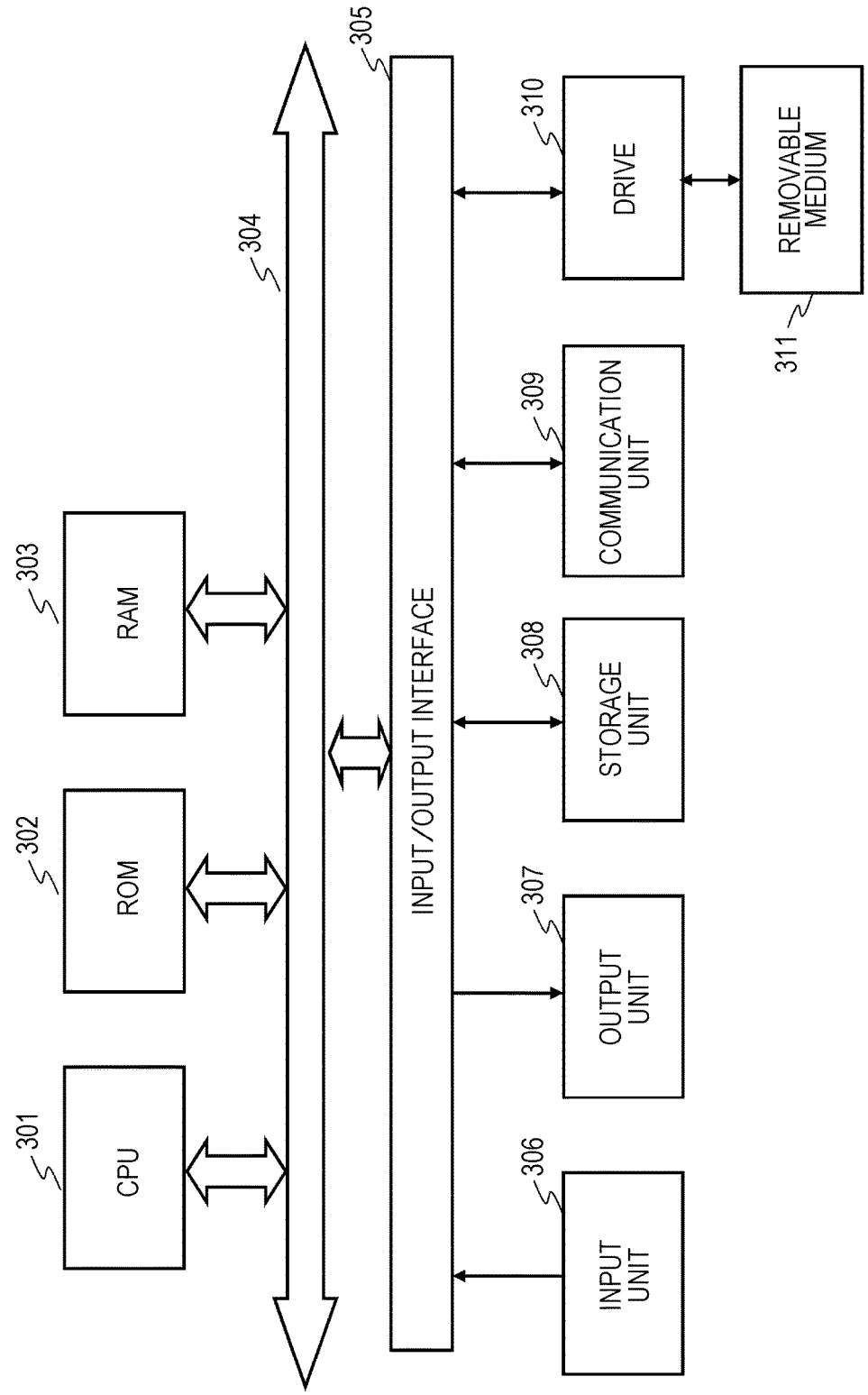

INFORMATION PROCESSING APPARATUS, INFORMATION RECORDING MEDIUM, INFORMATION PROCESSING METHOD, AND PROGRAM

CROSS REFERENCE TO PRIOR APPLICATION

This application is a continuation of U.S. patent application Ser. No. 14/916,450 (filed on Mar. 3, 2016), which is a National Stage Patent Application of PCT International Patent Application No. PCT/JP2015/071080 (filed on Jul. 24, 2015) under 35 U.S.C. § 371, which claims priority to Japanese Patent Application Nos. 2014-214198 (filed on Oct. 21, 2014) and 2014-181976 (filed on Sep. 8, 2014), which are all hereby incorporated by reference in their entirety.

TECHNICAL FIELD

The present disclosure relates to an information processing apparatus, an information recording medium, an information processing method, and a program, and more particularly, to an information processing apparatus, an information recording medium, an information processing method, and a program enabling execution of a reproduction process or the like corresponding to a data form for a medium such as a disc on which various kinds of data having coded forms, resolutions, used color gamuts, and the like that are different from each other are recorded.

BACKGROUND ART

As information recording media recording various kinds of contents such as movies and music, a digital versatile disc (DVD) and a Blu-ray (registered trademark) disc (BD) are frequently used.

In a BD-ROM that is a medium on which a content such as a movie is recorded in advance, for example, data of an audio, a subtitle, and the like is recorded together with an high definition (HD) image that is a high-quality image.

In a BD-ROM that is currently used, while mainly an HD image, a 2K image corresponding to a so-called high vision is frequently recorded, in the future, it is expected that the number of media on which 4K images, which are ultra-high definition (UHD) image, are recorded increases.

For example, a data recording/reproducing process using a BD and a 4K image are described in Patent Document 1 (Japanese Patent Application Laid-Open No. 2011-023071) and the like.

The recording form of data of an ultra-high definition image (UHD image) for a BD is currently standardized by Blu-ray (registered trademark) Disc Association (BDA) that is a standard establishment organization.

In the BDA, standards that are in consideration of not only correspondence to a 4K image but also correspondence to a high dynamic range (HDR) image extending the color gamut or the contrast ratio of an image output to a display are in the middle of establishment.

Compared to a standard dynamic range (SDR) image that is widely used for current 2K-compliant displays, the HDR image has a wide representable color gamut and a contrast ratio that can be set to be relatively high and enables an image representation close to the reality seen by the naked eyes.

However, currently, a large number of displays such as television sets that are generally used can output only an SDR image, and only a few thereof can output an HDR image.

In the future, it is considered that displays capable of outputting not only a 4K image but also an HDR image are gradually spread to be used.

An information recording medium such as a BD on which an HDR image content is recorded is considered to go on the market before the wide use of displays.

Thus, a medium on which an HDR image content is recorded needs to be considered to be reproduced by a non-HDR compliant display.

For example, in a case where an HDR image content recorded on a disc is output on a non-HDR compliant display that can output only an SDR image, a disc reproduction apparatus needs to perform some kind of a corresponding process such as a process of converting an HDR image into an SDR image and outputting the SDR image or a process of displaying a message notifying that a disc-stored content is an HDR image and cannot be normally output on a non-HDR compliant display.

In order to perform such a corresponding process, the reproduction apparatus, before the reproduction of a content from an information recording medium such as a BD on which an HDR image content is recorded, needs to check the kind of data stored on the information recording medium and perform a process corresponding to the acquired kind of the data.

CITATION LIST

Patent Document

Patent Document 1: Japanese Patent Application Laid-Open No. 2011-023071

SUMMARY OF THE INVENTION

Problems to be Solved by the Invention

An object of the present disclosure is to provide an information processing apparatus, an information recording medium, an information processing method, and a program enabling a reproduction apparatus reproducing data from an information recording medium such as a BD on which data of various mutually-different types such as an HDR image or an SDR image is recorded to check the type of medium-recorded data before starting to reproduce a content and to perform a process corresponding to a result of the checking process.

Solutions to Problems

A first aspect of the present disclosure lies in
an information processing apparatus including:
a data processing unit that performs a reproduction process of a disc recording data, wherein
the data processing unit
acquires a reproduction control information file corresponding to reproduction data recorded in a disc,
determines whether or not an ultra-high definition (UHD) image is recorded in the disc based on recording data of the acquired reproduction control information file, and
acquires image information of the ultra-high definition (UHD) image from the reproduction control information and controls output data for a display apparatus based on the acquired image information in a case where the ultra-high definition (UHD) image is recorded in the disc.

In addition, a second aspect of the present disclosure lies in an information processing apparatus including:

a data processing unit that performs a generation process of recording data for a medium, wherein the data processing unit, as a reproduction control information file corresponding to reproduction data, generates the reproduction control information file in which identification data representing whether or not an ultra-nigh definition (UHD) image is recorded as control target data based on the reproduction control information file, and in a case where ultra-high definition (UHD) is included as control target data based on the reproduction control information file, image information of the ultra-high definition (UHD) image are recorded.

In addition, a third aspect of the present disclosure lies in an information recording medium on which a reproduction data storage file and a reproduction control information file corresponding to the reproduction data storage file are recorded, wherein the reproduction control information file includes identification data representing whether or not an ultra-high definition (UHD) image is recorded as control target data based on the reproduction control information file, and image information of the ultra-high definition (UHD) image as recording data in a case where ultra-high definition (UHD) is included as the control target data based on the reproduction control information file, and wherein a reproduction apparatus reproducing the reproduction data has a configuration in which the image information of the ultra-nigh definition (UHD) image can be acquired by referring to the reproduction control information file.

In addition, a fourth aspect of the present disclosure lies in an information processing method executed in an information processing apparatus, the information processing apparatus including a data processing unit that performs a reproduction process of a disc recording data, the information processing method using the data processing unit including:

acquiring a reproduction control information file corresponding to reproduction data recorded in a disc;

determining whether or not an ultra-nigh definition (UHD) image is recorded in the disc based on recording data of the acquired reproduction control information file; and acquiring image information of the ultra-high definition (UHD) image from the reproduction control information and controlling output data for a display apparatus based on the acquired image information in a case where the ultra-high definition (UHD) image is recorded in the disc.

In addition, a fifth aspect of the present disclosure lies in a program causing an information processing apparatus to execute an information process, the information processing apparatus including a data processing unit that performs a reproduction process of a disc recording data, the program causing the data processing unit to execute:

acquiring a reproduction control information file corresponding to reproduction data recorded in a disc;

determining whether or not an ultra-high definition (UHD) image is recorded in the disc based on recording data of the acquired reproduction control information file; and acquiring image information of the ultra-high definition (UHD) image from the reproduction control information and controlling output data for a display apparatus based on the acquired image information in a case where the ultra-high definition (UHD) image is recorded in the disc.

A program of the present disclosure, for example, is a program that can be provided for an information processing apparatus or a computer system capable of executing various program codes using a storage medium or a communication medium in a computer-readable form. By providing such a program in a computer-readable form, a process according to the program is realized on the information processing apparatus or the computer system.

The other objects, features, and advantages of the present disclosure will be disclosed in detailed description that is based on embodiments of the present disclosure to be described later and accompanying drawings. In this specification, a system is a logical aggregated configuration of a plurality of apparatuses, but the apparatuses included in the configuration are not limited to be arranged inside the same casing.

Effects of the Invention

According to the configuration of one embodiment of the present disclosure, image information of an ultra-high definition (UHD) image can be acquired from a playlist file or a clip information file, and a configuration for performing image reproduction corresponding to a display apparatus is realized, More specifically, a data processing unit that performs a reproduction process of a disc recording data acquires a playlist file or a clip information file as a reproduction control information file corresponding to reproduction data recorded in a disc, determines whether or not an ultra-high definition (UHD) image is recorded in the disc based on recording data of such a file, and, in a case where the ultra-high definition (UHD) image is recorded in the disc, acquires image information of the ultra-high definition (UHD) image from the reproduction control information and controls output data for a display apparatus based on the acquired image information.

According to this configuration, image reproduction according to a display apparatus is realized by acquiring image information of an ultra-high definition (UHD) image from a playlist file or a clip information file.

The effects described in this specification are merely examples but are not for the purposes of limitation, and any additional effect may be present.

BRIEF DESCRIPTION OF DRAWINGS

FIG. 2 is a diagram that illustrates an example of recording data for a Blu-ray (registered trademark) disc (BD).

FIG. 7 is a diagram that illustrates an example of the configuration of data of a playlist file.

FIG. 8 is a diagram that illustrates an example of the configuration of data of an extension data record field [ExtensionData( )] of a playlist file.

FIG. 9 is a diagram that illustrates identification information representing the type of extension data recorded in the extension data record field [ExtensionData( )].

FIG. 10 is a diagram that illustrates an example of the configuration of data of an STN table [STN_table_UHD] that is compliant to an ultra-high definition [UHD] image recorded in the extension data record field [ExtensionDate( )] of a playlist file.

FIG. 11 is a diagram that illustrates an example of the detailed configuration of a stream attribute information record field [Stream_attribute_UHD( )].

FIG. 12 is a diagram that illustrates an example of setting data in a stream coding information record field.

FIG. 13 is a diagram that illustrates an example of setting data in a dynamic range setting information record field.

FIG. 14 is a diagram that illustrates an example of setting data in a color gamut setting information record field.

FIG. 15 is a diagram that illustrates an example of the detailed configuration of a stream attribute information record field [Stream_attribute_UHD( )].

FIG. 16 is a diagram that illustrates an example of setting data in the dynamic range setting information record field.

FIG. 17 is a diagram, that illustrates an example of the detailed configuration of a stream attribute information record field [Stream_attribute_UHD( )].

FIG. 18 is a diagram that illustrates an example of setting data in the dynamic range setting information record field.

FIG. 19 is a diagram that illustrates a flowchart of a reproduction sequence of an information processing apparatus (reproduction apparatus) reproducing data using a playlist file.

FIG. 21 is a diagram that illustrates an example of the detailed configuration of an HEVC image information record field.

FIG. 23 is a diagram that illustrates an example of the configuration of data of a clip information file.

FIG. 24 is a diagram that illustrates an example of the configuration of data of a clip information record field [ClipInfo( )] of a clip information file.

FIG. 25 is a diagram that illustrates an example of setting data of an application type information record field.

FIG. 26 is a diagram that illustrates an example of setting the value of an extended application type.

FIG. 27 is a diagram that illustrates an example of the configuration of data of an extension data record field [ExtensionData( )] of a clip information file.

FIG. 28 is a diagram that illustrates an example of setting an identifier corresponding to the type of extension data recorded in the extension data record field [ExtensionData( )].

FIG. 29 is a diagram that illustrates an example of the configuration of data of program information [ProgramInfo_UHD] compliant to an ultra-high definition [UHD]image recorded in the extension data record field [ExtensionDate( )] of a clip information file.

FIG. 30 is a diagram that illustrates an example of the detailed configuration of a stream coding information record field [StreamCodingInfo( )].

FIG. 31 is a diagram that illustrates an example of setting a value of image information.

FIG. 32 is a diagram that illustrates CPI information [CPI_UHD] compliant to an ultra-high definition [UHD] image recorded in a data block of the extension data record field of the clip information file.

FIG. 36 is a diagram that illustrates an SDR-compliant EP map and an HDR-compliant EP map.

FIG. 38 is a diagram that illustrates an example of the configuration of data of a program information record field [ProgramInfo( )] included in a clip information file.

FIG. 40 is a diagram that illustrates an example of a code setting value representing a stream coding type [Stream_coding_type].

FIG. 41 is a diagram that illustrates an example of the detailed configuration of a stream coding information record field [StreamCodingInfo( )] arranged inside a clip information file.

FIG. 42 is a diagram that illustrates a flowchart illustrating a reproduction sequence of an information processing apparatus (reproduction apparatus) reproducing data using a clip information file.

FIG. 43 is a diagram that illustrates an example of the hardware configuration of an information processing apparatus applied to the process of the present disclosure.

MODE FOR CARRYING OUT THE INVENTION

Hereinafter, an information processing apparatus, an information recording medium, an information processing method, and a program according to the present disclosure will be described in detail with reference to the drawings. The description will be presented according to the following items.

1. Type of Disc Recording Content and Overview of Process of Reproducing Disc Recording Content
2. Data Recording Configuration of Disc and Overview of Reproduction Process
3. Embodiment in Which Image Information Is Recorded In Playlist File
3-1. (Embodiment 1-1) Embodiment in Which Image Information Is Recorded in Extension Data Record Field [ExtensionData( )] of Playlist File
3-2. (Embodiment 1-2) Embodiment in Which Image Information Is Recorded in Reproduction Stream Information Record Field [PlayList( )] of Playlist File
4. Embodiment in Which Image Information Is Recorded In Clip Information File
4-1. (Embodiment 2-1) Embodiment in Which Image Information Is Recorded in Extension Data Record Field [ExtensionData( )] of Clip Information File
4-2. (Embodiment 2-2) Embodiment in Which Image Information Is Recorded in Program Information Record Field [ProgramInfo( )] of Clip Information File
5. Generation (Authoring) of Recording Data for Medium and Data Recording Process
6. Example of Configuration of Information Processing Apparatus 7. Summary of Configuration According to Present Disclosure

[1. Type of Disc Recording Content and Overview of Process of Reproducing Disc Recording Content]

First, the type of disc recording content and an overview of a process of reproducing a disc recording content will be described.

As described above, the recording form of an ultra-high definition image [ultra-high definition (UHD) image] data recorded in a Blu-ray (registered trademark) disc (BD) is currently standardized by the Blu-ray (registered trademark) Disc Association (BDA).

In the BDA, BD standards using not only a 4K image acquired by increasing the number of pixels but also a high dynamic range (HDR) image acquired by extending the color gamut or the contrast ratio that can be output as recording reproduction data using a BD are in the middle of establishment.

However, as described above, a large number of currently-used displays such as television sets are non-HDR compliant displays that have no function for displaying an HDR image and can output only a standard dynamic range (SDR) image.

In the future, while it is considered that the number of HDR-compliant displays gradually spread to be widely used, for the time being, it is assumed that non-HDR compliant displays and HDR compliant displays are used together.

Figure 1:
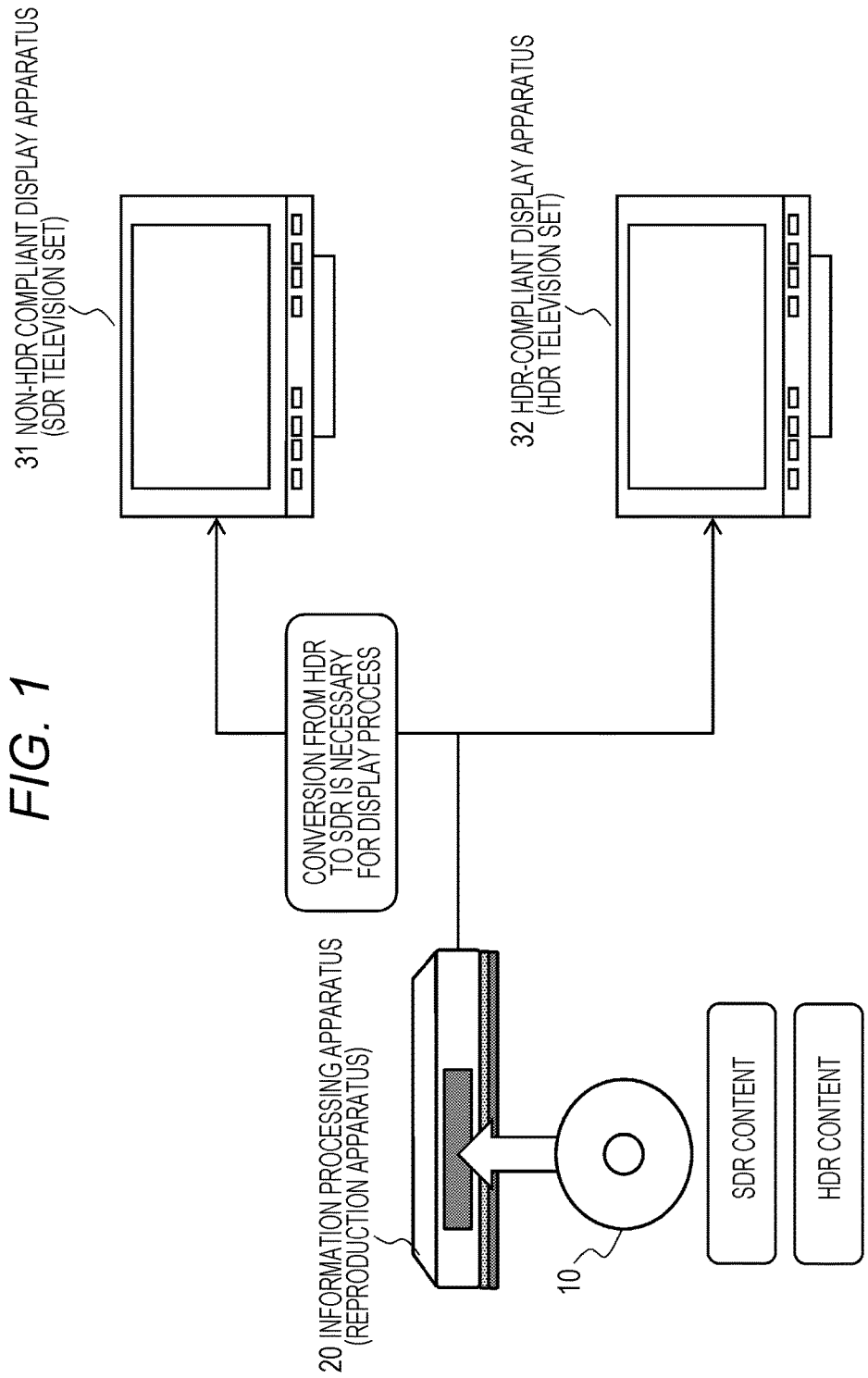
FIG. 1 is a diagram that illustrates an example of a process of reproducing an SDR content and an HDR content.

In such a case, as illustrated in FIG. 1, an information processing apparatus (reproduction apparatus) 20 that reproduces and outputs an HDR image content recorded on an information recording medium (disc) 10 such as a BD is requested to perform a process considering outputting reproduction data to an non-HDR compliant display apparatus (SDR television set) 31, an HDR-compliant display apparatus (HDR television set) 32, or these two mutually-different display apparatuses.

For example, in a case where the information processing apparatus (reproduction apparatus) 20 is connected to the non-HDR compliant display apparatus (SDR television set) 31, in a case where an HDR image content recorded in the information recording medium (disc) 10 such as a BD is reproduced and output, a process of converting an HDR image into an SDR image and outputting the SDR image, and the like are necessary. Alternatively, a countermeasure of displaying a message representing that a content recorded on the information recording medium (disc) 10 is an HDR image and thus cannot be output on the non-HDR compliant display apparatus (SDR television) 31 is necessary.

FIG. 2 illustrates an example of data to be allowed as record data of a Blu-ray (registered trademark) disc (BD) by the Blu-ray (registered trademark) Disc Association (BDA).

FIG. 2 illustrates seven types of data.

FIG. 2 illustrates the following elements of seven types of data.

(A) Codec (coding format)
(B) Resolution (pixel configuration)
(C) Outputtable Color Gamut
(D) Dynamic Range As the codec, one of two types of AVC and HEVC is allowed.

The resolution is 2K (1920×1080) or 4K (3840×2160).

As the output color gamut, one of BT.709 or BT.2020 is allowed.

BT.2020 has a color gamut broader than BT.707 and can represent colors closer to real colors.

As the dynamic range, two ranges of the HDR and the SDR are allowed.

As an HDR image, an image having a contrast ratio much higher than an SDR image can be output. As the HDR image, an image having a contrast rate over 100000:1 can be output, and a dark area and a bright area can be clearly reproduced without causing an occurrence of a black defect or halation.

In a BD, as illustrated in FIG. 2, various types of data are recorded.

Meanwhile, as a display apparatus connected to a disc reproduction apparatus, as illustrated in FIG. 1, various display apparatuses such as a non-HDR compliant display apparatus (SDR television set) 31 and an HDR-compliant display apparatus (HDR television set) 32 are considered to be used.

The information processing apparatus 20 that is a disc reproduction apparatus and the display apparatuses 31 and 32 are connected to each other, for example, using an HDMI (registered trademark) cable, and the information processing apparatus 20 can detect whether a display apparatus connected through the HDMI (registered trademark) cable is HDR compliant or non-HDR compliant.

Based on such detection information, the information processing apparatus 20 can perform a different process between a case where the connected display apparatus is the non-HDR compliant display apparatus (SDR television set) 31 and a case where the connected display apparatus is the HDR-compliant display apparatus ( HDR television set) 32.

In other words, a process corresponding to the connected display apparatus is performed.

More specifically, for example, the following process is performed.

(A) In a case where an image stored in the information recording medium (disc) 10 is only an HDR image (a1) In a case where the connected display apparatus is an HDR television set An HDR image reproduced from a disc is directly output.

(a2) In a case where the connected display apparatus is an SDR television set

The HDR image reproduced from a disc is converted into an SDR image, and the SDR image is output. Alternatively, a message indicating non-reproducibility is displayed.

(B) In a case where an image stored in the information recording medium (disc) 10 is only an SDR image (a1) In a case where the connected display apparatus is an HDR television set An SDR image reproduced from the disc is directly output.

(a2) In a case where the connected display apparatus is an SDR television set

An SDR image reproduced from the disc is directly output.

In addition, the HDR television set can output an SDR image as well.

(C) In a case where an HDR image and an SDR image are stored in the information recording medium (disc) 10

(a1) In a case where the connected display apparatus is an HDR television set

An HDR image is selected from the disc and is reproduced and output.

(a2) In a case where the connected display apparatus is an SDR television set

An SDR image is selected from the disc and is reproduced and output.

In addition, in the present situation in which an HDR-compliant display and a non-HDR compliant display are present together, there is a high possibility of employing a content providing configuration in which a same content is produced as two types of data including an HDR image and an SDR image, is recorded on one disc or two discs, and is provided for a user.

Thus, for some time, it is considered that an HDR content acquired by recording an HDR image and an SDR content acquired by recording an SDR image are present together as disc recording contents.

In the present situation, as a content storing disc provided for a user, for example, a disc such as a BD-ROM, there is a nigh possibility of using a plurality of forms (types ) of discs together.

Examples of the data recording configuration for a disc will be described with reference to FIGS. 3 and 4.

Figure 3:
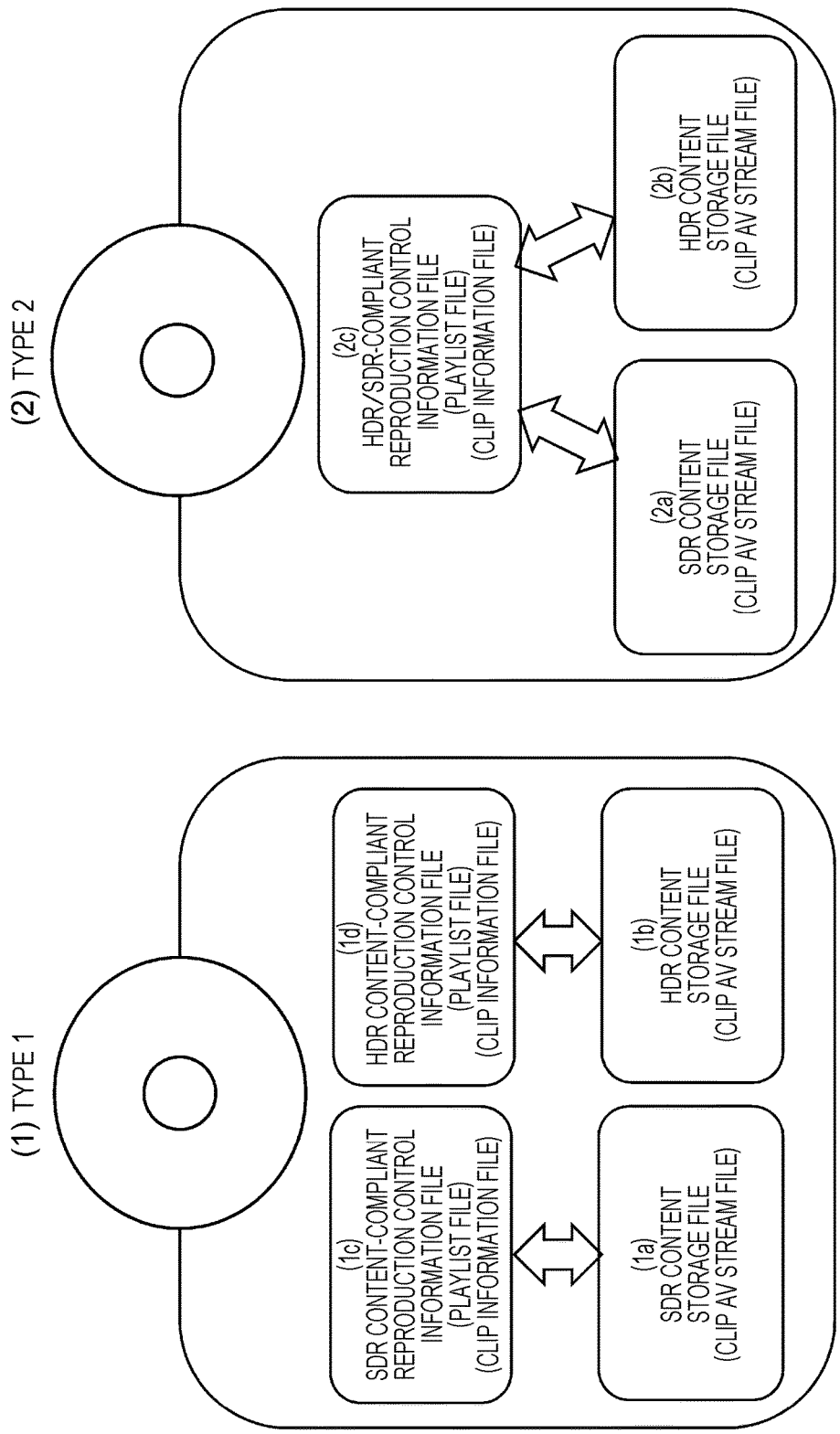
FIG. 3 is a diagram that illustrates an example of recording data in a disc and a reproduction process executed by a reproduction apparatus.
Figure 4:
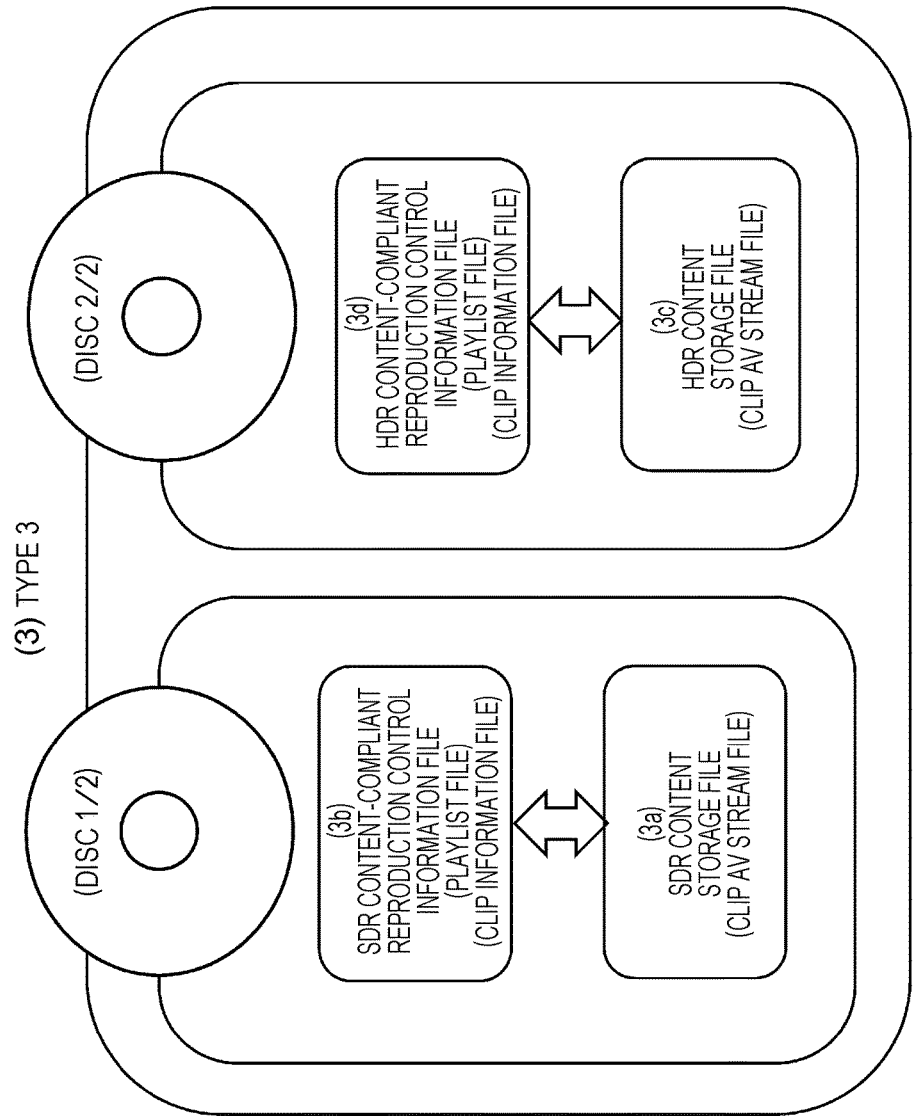
FIG. 4 is a diagram that illustrates an example of recording data in a disc and a reproduction process executed by a reproduction apparatus.

FIGS. 3 and 4 illustrate examples of three types of content storing disc (BD-ROM).

A disc of "(1) Type 1" illustrated in FIG. 3 stores the following recording data in one disc.

(1a) a clip AV stream file storing an SDR content
(1b) a clip AV stream file storing an HDR content
(1c) an SDR-compliant playlist file and an SDR-compliant clip information file that are reproduction control information files of an SDR content
(1d) an HDR-compliant playlist file and an HDR-compliant clip information file that, are reproduction control information files of an HDR content The clip AV stream file is a file in which reproduction data is stored in an MPEG-2 TS (transport stream) format that is defined as a format of recording data for a BD.

The playlist file and the clip information file are files in which reproduction control information used by a reproduction apparatus when data stored in the clip AV stream file is reproduced is stored.

Such files will be described in detail in the latter part.

The setting of "(1) Type 1 illustrated in FIG. 3 has a configuration in which a clip AV stream file in which SDR image data is stored and a clip AV stream file in which HDR image data is stored are individually set.

In other words, the following two clip AV stream files are recorded in a disc.

(1a) a clip AV stream file in which an SDR content is stored
(1b) a clip AV stream file in which an HDR content is stored These are contents, for example, of one same movie and are two units of image data of which the settings of dynamic ranges are different from each other.

In addition, for each of the two clip AV stream files described above, the playlist file and the clip information file that are individual reproduction control information files are recorded in a disc.

In other words, the files are the following reproduction control information files.

(1c) an SDR-compliant playlist file and an SDR-compliant clip information file that are reproduction control information files of the SDR content
(1d) an HDR-compliant playlist file and an HDR-compliant clip information file that are reproduction control information files of the HDR content A reproduction apparatus in which a disc is mounted, in a case where a display apparatus connected to the reproduction apparatus is a non-HDR compliant display (an SDR television set), selects a combination of the following data files and performs a reproduction process.

(1a) a clip AV stream file in which an SDR content is stored
(1c) an SDR-compliant playlist file and an SDR-compliant clip information file that are reproduction control information files of an SDR content In a case where a display apparatus connected to the reproduction apparatus is an HDR compliant display (an HDR television set), a combination of the following data files is selected, and a reproduction process is performed.

(1b) a clip AV stream file in which an HDR content is stored
(1d) an HDR-compliant playlist file and an HDR-compliant clip information file that are reproduction control information files of an HDR content In this way, the reproduction apparatus needs to select reproduction control information files (a playlist file and a clip information file) and clip AV stream file based on a display apparatus connected to the reproduction apparatus and perform a reproduction process.

Accordingly, before the start of the reproduction process, files to be selected need to be determined using a certain method.

A configuration in which information required for the process of the reproduction apparatus is recorded in the playlist file or the clip information file so as to be used will be described in the latter part.

A disc of "(2) Type 2" illustrated in FIG. 3 includes the following recording data in one disc.

(2a) a clip AV stream file storing an SDR content
(2b) a clip AV stream file storing an HDR content
(2c) an SDR/HDR-compliant playlist file and an SDR/HDR-compliant clip information file that are reproduction control information files commonly applicable to an SDR content and an HDR content The setting of "(2) Type2 illustrated in FIG. 3, similarly to Type 1, has a configuration in which a clip AV stream file in which SDR image data is stored and a clip AV stream file in which HDR image data is stored are individually set.

In other words, the following two clip AV stream files are recorded in a disc.

(2a) a clip AV stream file in which an SDR content is stored
(2b) a clip AV stream file in which an HDR content is stored These are contents, for example, of one same movie and are two units of image data of which the settings of dynamic ranges are different from each other.

However, in (2) Type2, the playlist file and the clip information file each being one individual reproduction control information file that is commonly used for the two clip AV stream files described above are recorded in a disc.

In other words, the files are the following reproduction control information files.

(2c) an SDR/HDR-compliant playlist file and an SDR/HDR-compliant clip information file that are reproduction control information files commonly applicable to an SDR content and an HDR content A reproduction apparatus in which a disc is mounted, in a case where a display apparatus connected to the reproduction apparatus is a non-HDR compliant display (an SDR television set), selects a combination of the following data files and performs a reproduction process.

(2a) a clip AV stream file storing an SDR content
(2c) an SDR/HDR-compliant playlist file and an SDR/HDR-compliant clip information file that are reproduction control information files commonly applicable to an SDR content and an HDR content In a case where a display apparatus connected to the reproduction apparatus is an HDR compliant display (an HDR television set), a combination of the following data files is selected, and a reproduction process is performed.

(2b) a clip AV stream file in which an HDR content is stored (2c) an SDR/HDR-compliant playlist file and an SDR/HDR-compliant clip information file that are reproduction control information files commonly applicable to an SDR content and an HDR content However, in such a case, the reproduction apparatus needs to select data selected and reproduced according to the SDR/HDR-compliant playlist file and the SDR/HDR-compliant clip information file from one of the following two clip AV stream files.

(2a) a clip AV stream file storing an SDR content (2b) a clip AV stream file storing an HDR content The reproduction apparatus needs to acquire the information used for performing the selection process.

In embodiments to be described in the latter part, a configuration in which such information is recorded in the SDR/HDR-compliant playlist file or the SDR/HDR-compliant clip information file and the process executed by the reproduction apparatus will be described.

A disc of "(3) Type 3" illustrated in FIG. 4 is set to be provided for a user as a set of two discs.

The following recording data is included in a disc (1/2).

(3a) a clip AV stream file in which an SDR content is stored (3b) an SDR-compliant playlist file and an SDR-compliant clip information file that are reproduction control information files of an SDR content In addition, the following recording data is included in a disc (2/2).

(3c) a clip AV stream file in which an HDR content is stored (3d) an HDR-compliant playlist file and an HDR-compliant clip information file that are reproduction control information files of an HDR content In the setting of "(3) Type 3" illustrated in FIG. 4, two discs including a disc (1/2) in which a clip AV stream file storing SDR image data and reproduction control information corresponding to an SDR content are stored and a disc (2/2) in which a clip AV stream file storing HDR image data and reproduction control information corresponding to an HDR content are stored are provided for a user as a set.

The contents stored in the discs, for example, are contents of one same movie, and two units of image data of which the settings of dynamic ranges are different from each other are recorded therein.

A reproduction apparatus in which the disc (1/2) recording an SDR content therein is mounted, in a case where a display apparatus connected to the reproduction apparatus is a non-HDR compliant display (an SDR television set), reproduces a content using data recorded in the disc (1/2), in other words, data of:

(3a) a clip AV stream file in which an SDR content is stored; and (3b) an SDR-compliant playlist file and an SDR-compliant clip information file that are reproduction control information files of an SDR content.

However, in a case where a display apparatus connected to the reproduction apparatus in which the disc (1/2) recording an SDR content therein is mounted is an HDR-compliant display (an HDR television set), it is preferable to perform a process of outputting a message urging the user to change the disc to the other disc (2/2) or the like to the HDR-compliant display (HDR television set).

In addition, a reproduction apparatus in which the disc (2/2) recording an HDR content therein is mounted, in a case where a display apparatus connected to the reproduction apparatus is an HDR-compliant display (an HDR television set), reproduces a content using data recorded in the disc (2/2), in other words, data of:

(3c) a clip AV stream file in which an HDR content is stored; and (3d) an HDR-compliant playlist file and an HDR-compliant clip information file that are reproduction control information files of an HDR content.

However, in a case where a display apparatus connected to the reproduction apparatus in which the disc (2/2) recording an HDR content therein is mounted is a non-HDR compliant display (an SDR television set), it is preferable to perform a process of outputting a message urging the user to change the disc to the other disc (1/2) or the like to the SDR-compliant display (SDR television set) or to convert the HDR data into SDR data and output the SDR data.

The reproduction apparatus needs to acquire information used for performing such a process.

In Embodiments to be described in the latter part, a configuration in which such information is recorded in the playlist file or the clip information file and the process executed by the reproduction apparatus will be described.

In the description of the example of the setting of the input data of the disc illustrated in FIGS. 3 and 4, while a classification example of the SDR content and the HDR content has been presented, that is merely an example. Thus, for example, the content storage forms described with reference to FIGS. 3 and 4 are applicable also to a case where discs storing contents of which the following settings are different from each other are provided.

(1) an AVC content and an HEVC content (2) a 2K content (1920×1080 pixels) and a 4K content (3840×2160 pixels)

(3) a content having a color gamut=BT.707 and a content having a color gamut=Bt.2020.

In other words, in a case where one set of contents having a difference in one element among the coding format, the resolution, the color gamut, and the dynamic range described with reference to FIG. 2 are produced, it is considered to produce discs having one of the settings of Types 1 to 3 described with reference to FIGS. 3 and 4 and to provide the discs for the user.

[2. Data Recording Configuration of Disc and Overview of Reproduction Process]

For example, a recording format (BDMV format) of a case where a content such as a movie is recorded in a Blu-ray (registered trademark) disc (BD) and an overview of a reproduction process executed by a reproduction apparatus will be described.

In the BDMV format, data of a video, an audio, a subtitle, and the like that is a reproduction target data is stored in a clip AV stream file so as to be recorded therein.

The clip AV stream file is a file in which a transport stream (TS) packet of 188 bytes is set as a constituent element. The transport stream packet, in other words, the TS packet is arranged according to an MPEG-2 transport stream (TS) format.

The MPEG-2 TS format is a format that is standardized in ISO 13818-1 and for example, is used for data recording for a Blu-ray (registered trademark) disc (BD), digital broadcast, and the like.

The coding data of an image, an audio, a still image that is allowed to be stored according to the MPEG-2 TS format, for example, is the following coding data.

Image: MPEG-1, MPEG-2, AVC (MPEG-4 AVC), or HEVC (MPEG-4 HEVC)
Audio: MP1, MP2, MP3, linear PCM, or DTS
Still Image: JPEG For example, each coding data described above is stored in transport stream (TS) packets defined in the MPEG-2 TS in a distributed manner.

Figure 5:
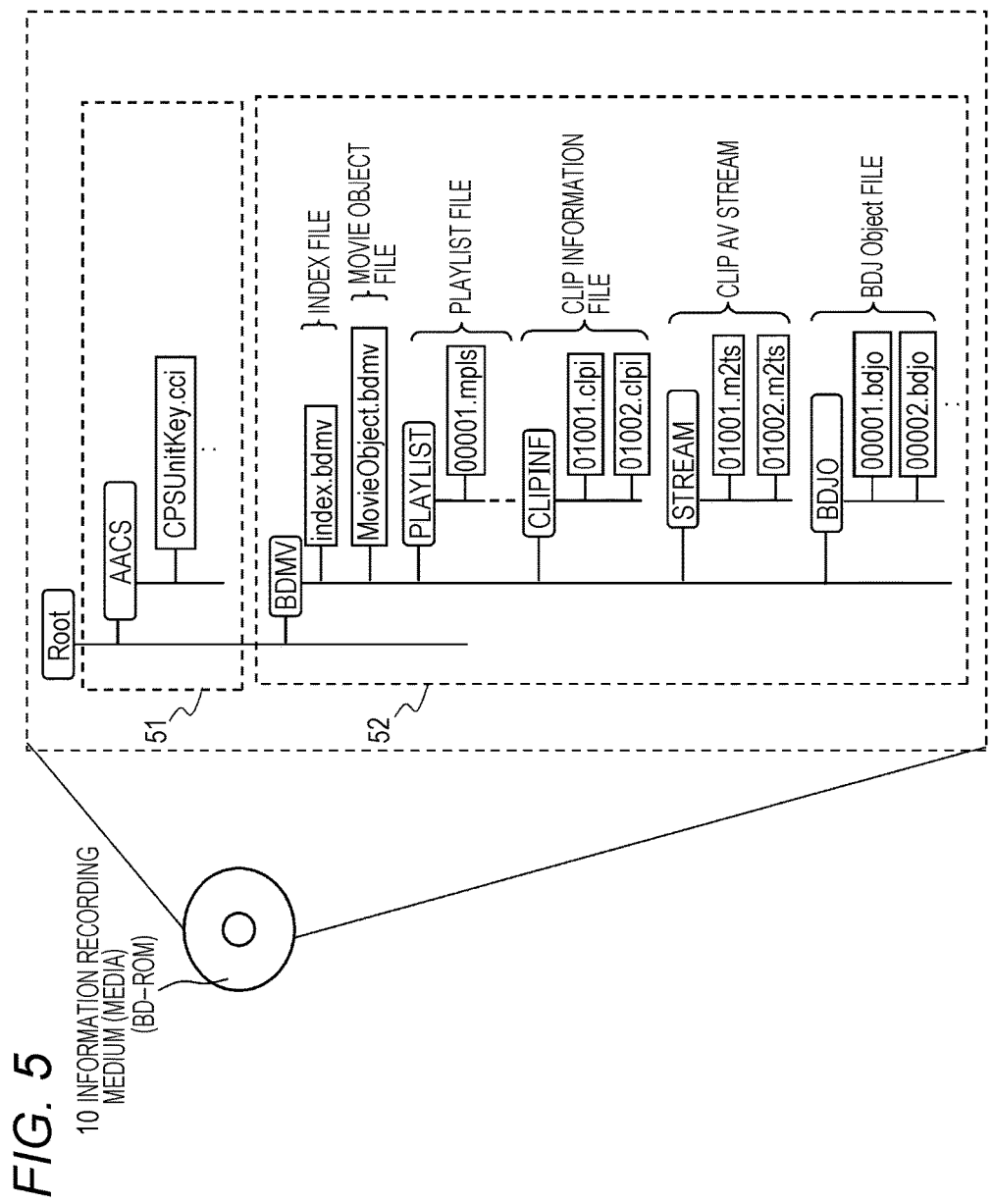
FIG. 5 is a diagram that illustrates an example of the configuration of a directory of data recorded on a medium according to a BDMV format.

FIG. 5 is a diagram that illustrates a directory of recording data according to the BDMV format recorded in an information recording medium 10, for example, that is a ROM-type Blu-ray (registered trademark) Disc (BD).

The directory, as illustrated in FIG. 5, is separated into a management information setting section 51 (AACS directory) and a data section 52 (BDMV directory).

In the management information setting section 51 (AACS directory), a CPS unit key file that is an encryption key of data, a use control information file, and the like are stored.

In the CPS unit key file, a CPS unit key applied for decoding encrypted data that is a reproduction target data stored in the clip AV stream file is stored as encryption key data.

The reproduction apparatus acquires a CPS unit key from the CPS unit key file through a process to which a device key stored in the reproduction apparatus or data stored in the disc is applied, decodes encrypted data stored in the clip AV stream file by applying the acquired CPS unit key, and performs a reproduction process.

Under the BDMV directory of the data section 52, for example, files such as an index file, a playlist file, a clip information file, a clip AV stream file, a BDJO file are recorded.

In the index file, title information as index information applied to a reproduction process is stored.

The playlist file is a file defining the reproduction sequence of contents and the like in accordance with program information of a reproduction program designated by the title and, for example, includes designation information of a clip information file in which reproduction position information and the like are recorded and the like.

The clip information file is a file designated by the playlist file and includes reproduction position information of a clip AV stream file and the like.

The clip AV stream file is a file in which AV stream data that is a reproduction target is stored.

The BDJO file is a file in which execution control information of a file storing a JAVA (registered trademark) program, a command, and the like therein is stored.

The sequence in which a content recorded in an information recording medium is reproduced by the information processing apparatus is as below.

(a) First, a specific title is designated based on an index file by using a reproduction application.

(b) A reproduction program associated with the designated title is selected.

(c) A playlist defining the reproduction sequence of the content and the like is selected based on program information of the selected reproduction program.

(d) An AV stream as content actual data or a command is read based on clip information defined in the selected playlist, and the reproduction of the AV stream or the process of executing the command is performed.

Figure 6:
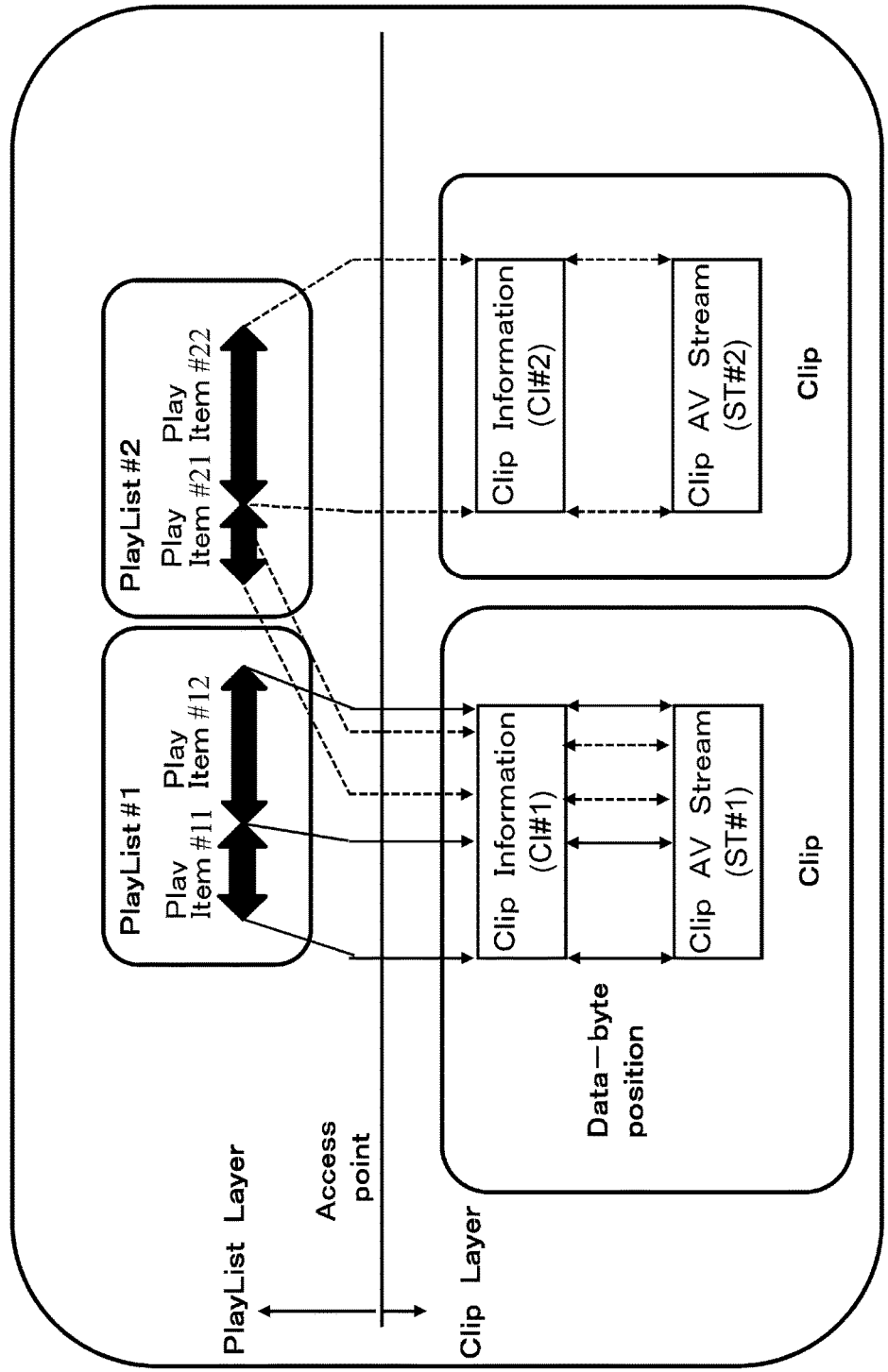
FIG. 6 is a diagram that illustrates correspondence between a playlist defined in a BDMV format and reproduction

FIG. 6 is a diagram that illustrates the correspondence relation of data recorded in the information recording medium 10, in other words, data of a playlist file, a clip information file, and a clip AV stream file.

An AV stream configured by image data and audio data that are actual reproduction target data is recorded as a clip AV stream file, and management information of the AV stream and a playlist file and a clip information file as reproduction control in formation files a redefined.

A plurality of these category files, as illustrated in FIG. 6, can be divided into two layers including a playlist layer including a playlist file and a clip layer configured by a clip AV stream file and a clip information file.

In addition, one clip information file is associated with one clip AV stream file, and a pair thereof is assumed as one object, and these are called altogether as a clip or a clip file.

Detailed information of data included in the clip AV stream file, for example, management information of an EP map in which the position information of I pictures of MPEG data and the like are recorded and the like is recorded in the clip information file.

The clip AV stream file stores data in which MPEG-2 transport stream (TS) is arranged according to the defined structure of the BDMV format.

In addition, the clip information file, for example, stores management information used for acquiring a reproduction start position of input data of the clip AV stream, file and the like such as correspondence data between a data position of byte string data of the clip AV stream file and a reproduction time position such as an entry point (EP), which is a reproduction start point in case of development on the time axis, or the like.

The playlist includes information indicating access points corresponding to a reproduction start position and a reproduction end position of a clip using a time stamp that is information on the time axis.

For example, by referring to the clip information file based on a time stamp representing a reproduction time elapse position from the start, point of a content, a data reading position of a clip AV stream file, in other words, an address as a reproduction start point can be acquired.

The clip information file is used for finding address information at which decoding of a stream included in the clip AV stream file is to be started from the time stamp.

In this way, the playlist file includes designation information of a reproduction section for reproducible data included in a clip (=clip information file+clip AV stream file) layer.

In the playlist file, one or more play items are set, and each play item includes designation information of a reproduction section for reproducible data included in the clip (=clip information file+clip AV stream, file) layer.

[3. Embodiment in which Image Information is Recorded in Playlist File]

First, as described with reference to FIGS. 3 and 4, as the configuration of a disc (BD-ROM), in which a content such as a movie is stored, provided for a user, various types are considered.

However, in any type, a reproduction apparatus needs to perform various processes corresponding to the image output function of a display apparatus connected to the reproduction apparatus.

For example, the processes are the following processes.

(a) Process of Selecting Reproduction Content (b) Image Converting Process, for example, Process of Converting HDR Image into SDR Image (c) Process of Displaying Message Indicating That No image Can Be Output In this way, the reproduction apparatus needs to perform a process corresponding to the image output function of a display apparatus connected to the reproduction apparatus, for example, the function of the display apparatus of HDR compliance or non-HDR compliance, compliance of the color gamut to BT.709 or the compliance thereof to BT.2020, and the like.

In addition, the reproduction apparatus is connected to the display apparatus, for example, using an HDMI (registered trademark) cable or the like and can acquire the function information of the display apparatus by receiving the information through the HDMI (registered trademark) cable.

In order for the reproduction apparatus to perform, for example, the processes of (a) to (c) described above based on the image output function of the display apparatus connected to the reproduction apparatus, it is necessary to acquire information of a content stored in a disc, more specifically, information of an image stored in a clip AV stream file that is a reproduction target, for example, image information of an SDR image or an HDR image, BT.709 or BT.2020 of the used color gamut, and the like, Hereinafter, embodiments in which image information of a content recorded in this disc is recorded in a playlist file and a clip information file that are reproduction control information files will be sequentially described.

By recording image information of a content in the playlist file and the clip information file that are reproduction control information files, the reproduction apparatus can acquire image information representing whether an image recorded in a clip AV stream file that is a reproduction target is an SDR image or an HDR image, whether the used color gamut is BT.709 or BT.2020, and the like from the playlist file or the clip information file.

Based on the acquired information and the image output function of the display apparatus connected to the reproduction apparatus, the reproduction apparatus can perform the processes (a) to (c) described above, in other words, selection of a reproduction content, a conversion of a reproduction image, message display, and the like.

Hereinafter, two embodiments will be sequentially described. The embodiments to be described are the following two embodiments.

(Embodiment 1) Embodiment in which Image Information is Recorded in Playlist File (Embodiment 2) Embodiment in which Image Information is Recorded in Clip Information File First, an embodiment in which image information is recorded in the playlist file will be described as Embodiment 1.

First, as described with reference to FIGS. 5 and 6, the playlist file is a file in which content reproduction control information such as the reproduction sequence of contents is stored and includes various kinds of reproduction control information, for example, designation information of a clip information file in which reproduction position information and the like are recorded.

FIG. 7 is syntax that illustrates the data configuration of one playlist file.

As illustrated in FIG. 7, in the playlist file, type information [type_indicator] representing a file type is recorded, after that, start address information [PlayList_start_address] to [ExtensionData_start_address] of each actual data is recorded, and, after that, a record field of substantive data recorded in the playlist file is arranged.

In the record field of actual data, the following fields are set.

(1) [AppInfoPlayList( )] that is a reproduction control parameter storage field in which a reproduction control parameter and the like are stored (2) [PlayList( )] that is a reproduction stream information record field in which stream information of reproduction target data in units of play items included in the playlist and the like are recorded (3) [PlayListMark( )] that is a mark information record field in which reproduction start position information such as an entry mark or the like, for example, used for a magazine search or the like is recorded (4) [ExtensionData( )] that is an extension data record field in which various kinds of extension data can be recorded As embodiments in which image information is recorded in the playlist file, examples of recording the image information using the following two fields will be sequentially described.

(Embodiment 1-1) Embodiment in which Image Information is Recorded in Extension Data Record Field [Extension Data ( ) ] of Playlist File)

(Embodiment 1-2) Embodiment in which Image Information is Recorded in Reproduction Stream Information Record Field [PlayList( )] of Playlist File 3-1. (Embodiment 1-1) Embodiment in which Image Information is Recorded in Extension Data Record Field [ExtensionData( )] of Playlist File]

First, an embodiment in which image information is recorded in the extension data record field [ExtensionData( )] of the playlist file will be described.

In the extension data record field [ExtensionData( )] of the playlist file, a stream number table (STN table) can be recorded as extension data.

In the stream number table (STN table), stream information of an image, an audio, and a subtitle reproduced by play items included in the playlist is recorded. The stream information is a table in which a stream number, a packet ID (PID), the kind of language, a channel number, codec information, and the like are included.

This stream number table (STN table), basically, is recorded in [PlayList( )] that is a reproduction stream information record field of the playlist.

This Embodiment 1-1 is an embodiment in which, in addition to the STN table recorded in [PlayList( )] that is the reproduction stream information record field of the playlist, an additional STN table is recorded in the extension data record field [ExtensionData( )].

This Embodiment 1-1, more specifically, for example, as illustrated in "(2) Type2" illustrated in FIG. 3, can be applied to a configuration in which the following two different clip AV stream files need to be selected and reproduced according to one playlist file.

(a) First Clip AV Stream File in Which SDR Content Is Stored (b) Second Clip AV Stream File in Which HDR Content Is Stored The image stream information relating to the SDR content of (a) described above is recorded in the STN table of the reproduction stream information record field [PlayList( )] of the playlist.

In addition, the image stream information relating to the HDR content of (b) described above is recorded in the STN table that is additionally recorded in the extension data record field [ExtensionData( )] of the playlist.

In this way, two STN tables including the STN table in which the stream information of the SDR content is recorded and the STN table in which the stream information of the HDR content is recorded are recorded in one playlist file.

By referring to the recording information of these two STN tables recorded in this one playlist file, the reproduction apparatus can check specific image information of each of the SDR content and the HDR content stored in the clip AV stream file stored in the disc.

The configuration of additional recording of the STN table in the extension data record field [ExtensionData( )] of the playlist file will be described with reference to FIG. 8 and subsequent drawings.

FIG. 8 is syntax that illustrates the data configuration of the extension data record field [ExtensionData( )] of a playlist file.

In this extension data record field [ExtensionData( )], various kinds of extension data that are difficult to describe in the other fields of the playlist file can be recorded.

In addition, in the extension data record field [ExtensionData( )], in order to record various kinds of extension data, an extension data identification data field 101 recording identification information of the extension data is set.

The extension data defined by identifiers ID1 and ID2recorded in this extension data identification data field 101 is recorded in a data block 102.

In this embodiment, the extension data recorded in the data block 102, for example, is the STN table in which the image stream information relating to the HDR content is recorded.

In other words, the extension data is the STN table corresponding to an ultra-high definition (UHD) image.

An example of identifiers set in the extension data identification data field 101 recording the identification information of extension data is illustrated in FIG. 9. As illustrated in FIG. 9, as the extension data recorded in the extension data record field [ExtensionData( )], an identifier corresponding to the data type is set.

As identification information representing an STN table [STN_table_UHD] corresponding to an ultra-high definition [UHD] image, similarly to an entry 111 illustrated in FIG. 9, the following IDs are defined.
ID1=0x0003
ID2=0x0001

In addition, as a combination of extension data identifiers (ID1, ID2) defining the type of extension data, for identifiers (ID1, ID2) including (ID1, ID2)=(0x0001, 0x0001) to (0x0001, 0x0002) and (ID1, ID2)=(0x0002, 0x0001) to (0x0002, 0x0006), extension data has already been defined.
ID1=0x0003
ID2=0x0001

At the current time point, a combination of these IDs is not defined, and this identification information (ID1, ID2) is defined as extension data identification information representing that the extension data is an STN table [STN_table_UHD] corresponding to an ultra-high definition (UHD) image.

A specific example of the STN table [STN_table_UHD] corresponding to an ultra-high definition [UHD] image recorded in the data block 102 will be described with reference to FIG. 10 and subsequent drawings.

FIG. 10 is syntax diagram that illustrates the data configuration of the STN table [STN_table_UHD] corresponding to an ultra-high definition [UHD] image recorded in the extension data record field [ExtensionDate( )] of the playlist file.

This STN table is a table that is additionally recorded in the playlist file as the STN table corresponding to an ultra-high definition [UHD] image.

In the STN table, image information relating to an ultra-high definition [UHD] image is recorded.

In a stream entry record field [Stream_entry( )] 121 illustrated in FIG. 10, a packet identifier (PID) of a TS packet storing an image stream is recorded.

In addition, in a stream attribute information record field [Stream_attribute_UHD( )] 122, image information relating to the ultra-high definition [UHD] image is recorded.

A detailed configuration of the stream attribute information record field [Stream_attribute_UHD( )] 122 is illustrated in FIG. 11.

In the stream attribute information record field [Stream_attribute_UHD( )] 122, the following information is recorded.
(1) Stream Coding Information [Stream_coding_type]
(2) Dynamic Range Setting Information [HDR_type]
(3) Color Gamut Setting Information [color_space]
(1) The stream coding information [Stream_coding_type] is a field in which data representing a coding form of image data stored in a clip AV stream file reproduced using the playlist is recorded.

FIG. 12 illustrates an example of a data setting for this stream coding information record field.

As illustrated in FIG. 12, for example, a setting value=0×02 represents that coding image data according to the MPEG-2 is stored in the clip AV stream file.

In addition, a setting value=0×1B represents that coding image data according to the AVC is stored in the clip AV stream file.

Furthermore, a setting value=0×21 represents that coding image data according to the HEVC is stored in the clip AV stream file.

The reproduction apparatus, by referring to this stream coding information record field, can check the coding form of image data stored in the clip AV stream file selected as a reproduction target using the playlist.

In addition, dynamic range setting information [HDR_type] record field of the stream attribute information record field [Stream_attribute_UHD( )] included in the STN table illustrated in FIG. 11 is a field for recording data representing the dynamic range setting information of image data stored in the clip AV stream file reproduced using the playlist.

FIG. 13 illustrates an example of a data setting for the dynamic range setting information record field.

As illustrated in FIG. 13, for example, a setting value=00 represents that, an image stored, in the clip AV stream file is an SDR image.

In addition, a setting value=01 represents that an image stored in the clip AV stream file is an HDR-Type 1 image.

In an HDR image, a plurality of types having mutually-different setting forms of the dynamic range are defined, and there are HDR images of different types including Type 1 to Type 3.

Furthermore, a setting value=10 represents that an image stored in the clip AV stream file is an HDR-Type2 image.

In addition, a setting value=11 represents that an image stored in the clip AV stream file is an HDR-Type 3 image.

The reproduction apparatus, by referring to this dynamic range setting information record field, can check the setting form of the dynamic range of image data stored in the clip AV stream file selected as a reproduction target according to the playlist.

The color gamut selling information [color_space] record field of the stream attribute information record field [Stream_attribute_UHD( )] included in the STN table illustrated in FIG. 11 is a field for recording data representing the color gamut setting information of image data stored in the clip AV stream file reproduced using the playlist.

FIG. 14 illustrates an example of a data setting for the color gamut setting information record field.

As illustrated in FIG. 14, for example, a setting value=00 represents that the color gamut setting of an image stored in the clip AV stream file is a color gamut setting that enables the output of color values corresponding to a color space defined in the color space BT.707.

In addition, a setting value=01 represents that the color gamut setting of an image stored in the clip AV stream file is a color gamut setting that enables the output of color values corresponding to a color space defined in the color space BT.2020.

Furthermore, setting values=10 and 11 are set as reserved areas and can be used in the future in a case where another color space is used.

The reproduction apparatus, by referring to the color gamut setting information record field, can check the color gamut setting form of image data stored in the clip AV stream file selected as a reproduction target using the playlist.

The information setting example for the stream attribute information record field [Stream_attribute_UHD( )] 122 described with reference to FIGS. 11 to 14 is merely an example, and various settings other than that can be made.

Hereinafter, an embodiment in which information of another form for the dynamic range setting information [HDR_type] is set will be described with reference to FIG. 15 and subsequent drawings.

FIG. 10 described above is a syntax diagram that illustrates the data configuration of an STN table [STN_table_UHD] corresponding to an ultra-high definition [UHD] image recorded in the extension data record field [ExtensionData( )] of the playlist file illustrated in FIG. 8.

As described above, in the STN table [STN_table_UHD] corresponding to an ultra-high definition [UHD] image illustrated in FIG. 10, image information relating to the ultra-high definition [UHD] image is recorded.

In the stream entry record field [Stream_entry( )] 121 illustrated in FIG. 10, a packet identifier (PID) of a TS packet storing the image stream is recorded.

In addition, in the stream attribute information record field [Stream_attribute_UHD( )] 122, image information relating to the ultra-high definition [UHD] image is recorded.

As described with reference to FIG. 11 as above, in the stream attribute information record field [Stream_attribute_UHD( )] 122, the dynamic range setting information [HDR_type] record field is set.

An embodiment described below is an example in which three bit data is set to be recorded in the dynamic range setting information [HDR_type].

A detailed configuration example of the stream attribute information record field [Stream_attribute_UHD( )] 122 according to this embodiment will be illustrated in FIG. 15.

In the stream attribute information record field [Stream_attribute_UHD( )] 122, similarly to the example described with reference to FIG. 11 as above, the following information is recorded.

(1) Stream Coding Information [Stream_coding_type]
(2) Dynamic Range Setting Information [HDR_type]
(3) Color Gamut Setting Information [color_space]

(1) The stream coding information [Stream_coding_type], as described with reference to FIG. 12 as above, is a field in which data representing a coding form of image data stored in a clip AV stream file reproduced using the playlist is recorded.

(3) The color gamut setting information [color_space], as described with reference to FIG. 14 as above, is a field for recording data representing the color gamut setting information of image data stored in a clip AV stream file reproduced using the playlist.

Such data is similar to the data described with reference to FIGS. 11 to 14.

(2) In the dynamic range setting information [HDR_type], data representing the dynamic range setting information of image data stored in the clip AV stream file reproduced using the playlist is recorded.

In the setting example of the stream attribute information record field [Stream_attribute_UHD( )] 122 described with reference to FIG. 11, while the dynamic range selling information [HDR_type] has a configuration for storing two bits, in this embodiment, a setting in which three bit data can be stored is made.

An example of a data setting for the dynamic range setting information [HDR_type] record field according to this embodiment will be described with reference to FIG. 16.

As illustrated in FIG. 16, the three-bit data set in the dynamic range setting information [HDR_type] record field is data representing the following dynamic range setting information.

A setting value=000 represents that an image stored in the clip AV stream file is an SDR image.

A setting value=001 represents that an image stored in the clip AV stream file is an HDR-Type 1 image.

As described above, as the HDR image, a plurality of types of which the setting forms of the dynamic ranges are different from each other are defined, and there are HDR images of different types including Type 1 to Type 3.

A setting value=010 represents that an image stored in the clip AV stream file is an HDR-Type2 image.

A setting value=011 represents that images stored in the clip AV stream file are configured by an HDR-Type 1 image and an HDR-Type2 image.

A setting value=100 represents that an image stored in the clip AV stream file is an HDR-Type 3 image.

A setting value=101 represents that images stored in the clip AV stream file are configured by an HDR-Type 1 image and an HDR-Type 3 image.

A setting value=110 represents that images stored in the clip AV stream file are configured by an HDR-Type2 image and an HDR-Type 3 image.

A setting value=111 represents that images stored in the clip AV stream file are configured by an HDR-Type 1 image, an HDR-Type2 image, and an HDR-Type 3 image.

The reproduction apparatus, by referring to the dynamic range setting information record field, can check the setting form of the dynamic range of image data stored in the clip AV stream file selected as a reproduction target using the playlist.

Next, with reference to FIGS. 17 to 18, an example of data recording in which one of the dynamic range setting information [HDR_type] for the stream, attribute information record field [Stream_attribute_UHD( )] is different will be described.

FIG. 17 illustrates an example of the configuration of the stream attribute information record field [Stream_attribute_UHD( )] 122 according to this embodiment.

In other words, FIG. 17 is a diagram that illustrates an example of the configuration of the stream attribute information record field [Stream_attribute_UHD( )] 122 of the STN table [STN_table_UHD] (FIG. 10) corresponding to an ultra-nigh definition [UHD] image recorded in the extension data record field [ExtensionData( )] of the playlist file illustrated in FIG. 8.

In the stream attribute information record field [Stream_attribute_UHD( )] 122, like the examples described above with reference to FIGS. 11 and 15, the following information is recorded.

(1) Stream Coding Information [Stream_coding_type]
(2) Dynamic Range Setting Information [HDR_type]
(3) Color Gamut Setting Information [color_space]

(1) The stream coding information [Stream_coding_type], as described with reference to FIG. 12 as above, is a field in which data representing a coding form of image data stored in a clip AV stream file reproduced using the playlist is recorded.

(3) The color gamut setting information [color_space], as described with reference to FIG. 14 as above, is a field for recording data representing the color gamut setting information of image data stored in a clip AV stream file reproduced using the playlist.

Such data is similar to the data described with reference to FIGS. 11 to 14.

(2) In the dynamic range setting information [HDR_type], data representing the dynamic range setting information of image data stored in the clip AV stream file reproduced using the playlist is recorded.

The dynamic range setting information [HDR_type] record field according to this embodiment is configured by the following three one-bit record data fields.

HDR-Type 1 flag [HDR_type_1_flag] record field
HDR-Type 2 flag [HDR_type_2_flag] record field
HDR-Type 3 flag [HDR_type_3_flag] record field A bit setting for each of such fields and the meaning thereof will be described with reference to FIG. 18.

As illustrated in FIG. 18, bit values set to the three flag setting fields configured as the dynamic range setting information [HDR_type] record fields represent data that represents the following meanings.

HDR-Type 1 Flag [HDR_type_1_flag]=0
This flag setting value represents that an HDR-Type 1 image is not included in the image stored in the clip AV stream file.

HDR-Type 1 Flag [HDR_type_1_flag]=1
This flag setting value represents that an HDR-Type 1 image is included in the image stored in the clip AV stream file.

HDR-Type2 Flag [HDR_type_2_flag]=0
This flag setting value represents that an HDR-Type2 image is not included in the image stored in the clip AV stream file.

HDR-Type2 Flag [HDR_type_2_flag]=1
This flag setting value represents that an HDR-Type2 image is included in the image stored in the clip AV stream file.

HDR-Type 3 Flag [HDR_type_3_flag]=0
This flag setting value represents that an HDR-Type 3 image is not included in the image stored in the clip AV stream file.

HDR-Type 3 Flag [HDR_type_3_flag]=1
This flag setting value represents that an HDR-Type 3 image is included in the image stored in the clip AV stream file.

In addition, in case of a setting in which all the flags of the HDR-Types 1 to 3 are set to zero, it represents that an image stored in the clip AV stream file is an SDR image.

In case of a setting in which all the flags of the HDR-Types 1 to 3 are set to one, it represents that images of the HDR-Types 1 to 3 are included in images stored in the clip AV stream file.

The reproduction apparatus, by referring to this dynamic range setting information record field, can check the setting form of the dynamic range of image data stored in the clip AV stream file selected as a reproduction target according to the playlist.

Next, the reproduction sequence of the information processing apparatus (reproduction apparatus) performing data reproduction using the playlist file from a disc in which the playlist file described in Embodiment 1-1 is recorded will be described with reference to a flowchart illustrated FIG. 19.

The flowchart illustrated in FIG. 19 is a flowchart that illustrates the use sequence of a playlist file at the time of reproducing data.

In this Embodiment 1-1, a configuration is formed in which an STN table [STN_table_UHD] corresponding to an ultra-high definition [UHD] image is additionally recorded in the playlist recorded in the disc.

In other words, in this embodiment, in addition to the STN table recorded in [PlayList( )] that is a reproduction stream information record field of the playlist file, an additional STN table is recorded in the extension data record field [ExtensionData( )].

A data processing unit of the reproduction apparatus performs a process according to the flowchart illustrated in FIG. 19.

The data processing unit of the reproduction apparatus includes a data processing unit that includes a CPU having a program execution function and the like and performs the process according to the flow illustrated in FIG. 19 based on a program stored in a storage unit in advance. The process of each step of the flow illustrated in FIG. 19 will be sequentially described.

(Step S101)
First, the reproduction apparatus acquires display apparatus information from a display apparatus connected to the reproduction apparatus. For example, the reproduction apparatus acquires the display apparatus information including dynamic range information (HDR compliance, non-HDR compliance, or the like) displayable using the display apparatus, outputtable color gamut information (BT.707 compliance, BT.2020 compliance, or the like), and the like by performing communication through an HDMI (registered trademark) cable or the like.

(Step S102)
In step S102, the reproduction apparatus determines whether or not the display apparatus is HDR-compliant based on the display apparatus information acquired from the display apparatus in step S101.

In case of a non-HDR compliant display apparatus such as an SDR television set or the like, the determination made in step S102 is No, and the process proceeds to step S103.

On the other hand, in a case where it is checked that the connected display apparatus is an HDR-compliant display apparatus such as an HDR television set or the like, the determination made in step S102 is Yes, and the process proceeds to step S105.

(Step S103)
In step S102, in a case where the display apparatus connected to the reproduction apparatus is checked to be a non-HDR compliant display apparatus, in step S103, an STN table corresponding to an SDR is acquired from the reproduction stream information record field [PlayList( )] of the playlist file.

In this STN table, image information relating to an SDR image included in the clip AV stream file, in which an SDR image to be reproduced according to the playlist file is stored, is recorded The image information recorded in the STN table, as described above with reference to FIGS. 11 to 18 is information such as the stream coding information, the dynamic range setting information, and the color gamut setting information.

(Step S104)

The reproduction apparatus reproduces an SDR image acquired from the clip AV stream file and outputs the SDR image to the display apparatus based on the image information recorded in the STN table corresponding to an SDR acquired from the reproduction stream information record field [PlayList( )] of the playlist file in step S103.

A process according to a series of steps including steps S102 (No) and S103 to S104 is performed as a process of outputting an SDR image to a non-HDR compliant display apparatus such as an SDR television set connected to the reproduction apparatus.

In other words, the output of an SDR image according to the display function of the display apparatus such as an SDR television set is performed, and image output that is appropriate for the display apparatus is performed.

(Step S105)

On the other hand, in a case where the display apparatus connected to the reproduction apparatus is checked to be an HDR-compliant display apparatus in step S102, the reproduction apparatus performs the process of step S105, In step S105, the reproduction apparatus acquires a setting value of the HDR flag set in the reproduction control parameter storage field [AppInfoPlayList( )] of the playlist file.

In addition, in the reproduction control parameter storage field [AppInfoPlayList( )] of the playlist file, a flag (HDR flag) representing whether or not an HDR image is included in the reproduction target data according to the playlist is recorded.

For example, the following setting flag is set. Flag Setting Value=1: An HDR image is included in the reproduction target data according to the playlist.

Flag Setting Value=0: An HDR image is not included in the reproduction target data according to the playlist.

The data processing unit of the reproduction apparatus checks the setting value of this flag and can determine whether or not an HDR image is included in the reproduction target data according to the playlist.

(Step S106)

The reproduction apparatus determines whether the setting value of the HDR flag acquired in step S105 is a value representing inclusion of an HDR image in the reproduction target data according to the playlist or a value representing no inclusion thereof.

In a case where the setting value of the flag is a value representing the inclusion of an HDR image in the reproduction target data according to the playlist, the process proceeds to step S107.

On the other hand, in a case where the setting value of the flag is a value representing no inclusion of an HDR image in the reproduction target data according to the playlist, the process proceeds to step S103.

In a case where the setting value of the flag is a value representing no inclusion of an HDR image in the reproduction target data according to the playlist, and the process proceeds to step S103, the process of steps S103 to S104 is performed.

In other words, the STN table corresponding to an SDR is acquired from the reproduction stream information record field [PlayList( )] of the playlist file, and an SDR image is reproduced and output according to the acquired STN table corresponding to an SDR.

(Step S107)

In the process of checking the setting value of the HDR flag in step S106, in a case where the setting value of the flag is a value representing the inclusion of an HDR image in the reproduction target data according to the playlist, the process proceeds to step S107.

In step S107, the reproduction apparatus acquires the STN table corresponding to an HDR from the extension data record field [ExtensionData( )] of the playlist file.

In this STN table, image information relating to an HDR image included in the clip AV stream file, in which an HDR image to be reproduced according to the playlist file is stored, is recorded.

The image information recorded in the STN table, as described above with reference to FIGS. 11 to 18, for example, is information such as the stream coding information, the dynamic range setting information, and the color gamut setting information.

(Step S108)

The reproduction apparatus reproduces the HDR image acquired from the clip AV stream file and outputs the HDR image to the display apparatus based on the image information recorded in the STN table corresponding to an HDR acquired from the extension data record field [ExtensionData( )] of the playlist file in step S107.

A process according to a series of steps including steps S102 (Yes) to S105, S106 (Yes) to S107, and S108 is performed as a process of outputting an HDR image to an HDR-compliant display apparatus such as an HDR television set connected to the reproduction apparatus.

In other words, the output of an HDR image according to the display function of the display apparatus such as an HDR television set is performed, and image output that is appropriate for the display apparatus is performed.

In the flowchart illustrated in FIG. 19, while one of the HDR content and the SDR content is set to be output to the display apparatus, for example, in a case where a content recorded in the disc is only an HDR content, and the display apparatus connected to the reproduction apparatus is non-HDR compliant (an SDR television set or the like), the reproduction apparatus may perform a process of converting the HDR content into an SDR content and outputting the SDR content. Alternatively, a setting for generating a message indicating that normal output cannot be performed and outputting the generated message may be used.

In the flowchart illustrated in FIG. 19, while an example of performing a selective reproduction process of an SDR content and an HDR content is described, it is merely an example, and, for example, a selective reproduction process of contents having different settings as below also can be performed according to the flow illustrated in FIG. 19.

(1) an AVC content and an HEVC content (2) a 2K content (1920×1080 pixels) and a 4K content (3840×2160 pixels)

(3) a content of color gamut=BT.707 and a content of color gamut=BT.2020

In such a case, a process acquired by replacing "SDR" and "HDR" described in the flow illustrated in FIG. 19 as below maybe performed.

(1) "SDR"→"AVC" and "HDR"→"HEVC"

(2) "SDR"→"2K" and "HDR"→"4K"

(3) "SDR"→"BT.707" and "HDR"→"BT.2020"

[3-2. (Embodiment 1-2) Embodiment in which Image Information is Recorded in Reproduction Stream Information Record Field [PlayList( )] of Playlist File]

Next, as Embodiment 1-2, an embodiment in which image information is recorded in the reproduction stream information record field [PlayList( )] of the playlist file will be described.

As described above with reference to FIG. 7, in the playlist file, the following four actual data record fields are set.

(1) [AppInfoPlayList( )] that is a reproduction control parameter storage field in which a reproduction control parameter and the like are stored (2) [PlayList( )] that is a reproduction stream information record field [PlayList( )] in which stream information of the reproduction target data in units of play items included in the playlist and the like are recorded (3) [PlayListMark( )] that is a mark information record field in which reproduction start position information such as an entry mark, for example, used for a magazine search and the like are recorded (4) [ExtensionData( )] that is an extension data record field in which various kinds of extension data can be recorded Embodiment 1-2 described below is an embodiment in which image information corresponding to an ultra-high definition [UHD] image is recorded in the reproduction stream information record field [PlayList( )] in which stream information of the reproduction target data in units of play items included in the playlist and the like are recorded.

A configuration for recording image information according to this embodiment will be described with reference to FIGS. 20 and 21.

Figure 20:
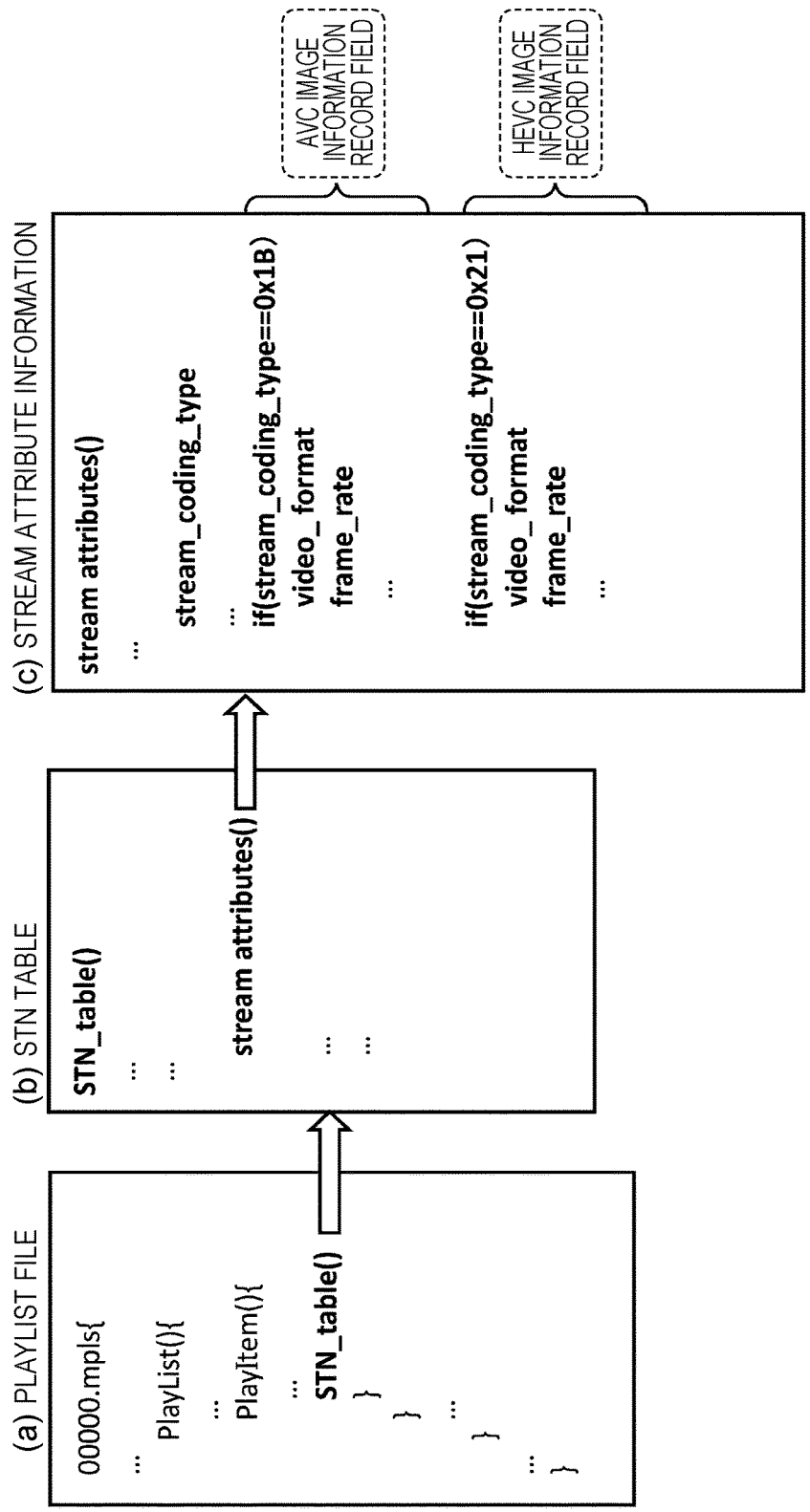
FIG. 20 is a diagram that illustrates an example of recording image information in a playlist file.

In FIG. 20, the following diagrams are illustrated.

(a) playlist file (b) STN table recorded in the reproduction stream information record field [PlayList( )] included in the playlist file (c) stream attribute information record field [stream_attributes( )] that is a field in which image attribute information in units of stream coding forms [Stream_coding_type] recorded in the STN table is recorded In this embodiment, image information corresponding to an ultra-high definition [UHD] image is recorded in the stream attribute information record field [stream_attributes( )] that is a field in which image attribute information in units of stream coding forms [Stream_coding_type] recorded in the STN table illustrated in FIG. 20(c) is recorded.

An AVC image information record field recorded in the stream attribute information illustrated in FIG. 20(c), for example, is an area in which image information corresponding to an SDR image recorded in a conventional STN table is recorded.

In the AVC image information record field illustrated in FIG. 20(c), the stream coding form [Stream_coding_type]=0×1B, in other words, as described with reference to FIG. 12, a value [0×1B] representing that the stream coding form is the AVC is recorded. After the record field of this stream coding form [Stream_coding_type]=0×1B, image information (a video format, a frame rate, and the like) relating to the AVC image data is recorded.

The AVC image information record field illustrated in FIG. 20(c) is an existing image information record field recorded in the STN table.

In this Embodiment 1-2, inside the same STN table, image information corresponding to an ultra-high definition [UHD] image is newly recorded.

In FIG. 20(c), an HEVC image information record field is illustrated.

In the HEVC image information record field illustrated in FIG. 20(c), the stream coding form [Stream_coding_type]=0×21, in other words, as described with reference to FIG. 12, a value [0×21] representing that the stream coding form is the HEVC is recorded. After the record field of this stream coding form [Stream_coding_type]=0×21, image information (a video format, a frame rate, and the like) relating to the HEVC image data is recorded.

An example of the detailed configuration of the HEVC image information record field recorded in the reproduction stream information record field [PlayList( )] included in the playlist file is illustrated in FIG. 21.

FIG. 21 is syntax that illustrates the HEVC image information record field illustrated in FIG. 20(c) in detail.

In the HEVC image information record field 151 illustrated in FIG. 21, image information of an ultra-high definition [UHD] image that can be reproduced by applying the playlist file is recorded.

More specifically, the following image information is recorded.

(1) video format (video_format)
(2) frame rate (frame_rate)
(3) aspect ratio (aspect_ratio)
(4) closed caption flag (cc_flag)
(5) dynamic range setting information (HDR_type)
(6) color gamut setting information (color_space)
(7) content production information (ISRC( ))

(1) In the video format (video_format), resolution information, for example, resolution information such as a 2K image of 1920×1080 or a 4K image of 3840×2160 is recorded.

(2) In the frame rate (frame_rate), the frame rate information of the video is recorded.

(3) In the aspect ratio (aspect_ratio), the aspect ratio of an output image, for example, an aspect ratio such as 16:9 or 4:3 is recorded.

(4) The closed caption flag (cc_flag) is a record field of subtitle-related information.

(5) In the dynamic range setting information (HDR_type), information similar to the dynamic range information described above with reference to FIG. 13 is recorded. For example, the following values are recorded.

Setting value=00 represents that an image stored in the clip AV stream file storing a reproduction target image according to the playlist file is an SDR image.

Setting value=01 represents that an image stored in the clip AV stream file storing a reproduction target image according to the playlist file is an HDR-Type 1 image.

Setting value=10 represents that an image stored in the clip AV stream file storing a reproduction target image according to the playlist file is an HDR-Type2 image.

Setting value=11 represents that an image stored in the clip AV stream file storing a reproduction target image according to the playlist file is an HDR-Type 3 image.

Alternatively, as a configuration in which three-bit data can be stored in the dynamic range setting information (HDR_type) record field, a configuration in which the bit information described above with reference to FIG. 16 or FIG. 18 is set may be employed.

(6) In the color gamut setting information (color_space), information similar to the color gamut, setting information described above with reference to FIG. 14 is recorded. For example, the following values are recorded.

A setting value=00 represents that a color gamut setting of an image stored in the clip AV stream file storing a reproduction target image according to the playlist file is a color gamut setting enabling output of color values corresponding to a color space defined in the color space BT.707.

A setting value=01 represents that a color gamut setting of an image stored in the clip AV stream file storing a reproduction target image according to the playlist file is a color gamut setting enabling output of color values corresponding to a color space defined in the color space BT.2020.

(7) In the content production information (ISRC( )), content production-related information such as a nation, an organization, date and time, and the like of the production of a reproduction target content according to the playlist file is recorded.

In this way, in Embodiment 1-2, image information corresponding to an ultra-high definition [UHD] image is recorded in the reproduction stream information record field [PlayList( )] in which stream information of the reproduction target data in units of play items included in the playlist and the like are recorded.

The reproduction apparatus determines whether or not the image is an image adapted to the display apparatus connected to the reproduction apparatus by referring to this image information and can perform a process of selecting and reproducing the image adapted to the connected display apparatus, a process of converting the image into image data outputtable to the connected reproduction apparatus and outputting the converted image data, or the like.

Next, the reproduction sequence of the information processing apparatus (reproduction apparatus) reproducing data using the playlist file from a disc in which the playlist file described in this Embodiment 1-2 is recorded will be described with reference to a flowchart illustrated in FIG. 22.

Figure 22:
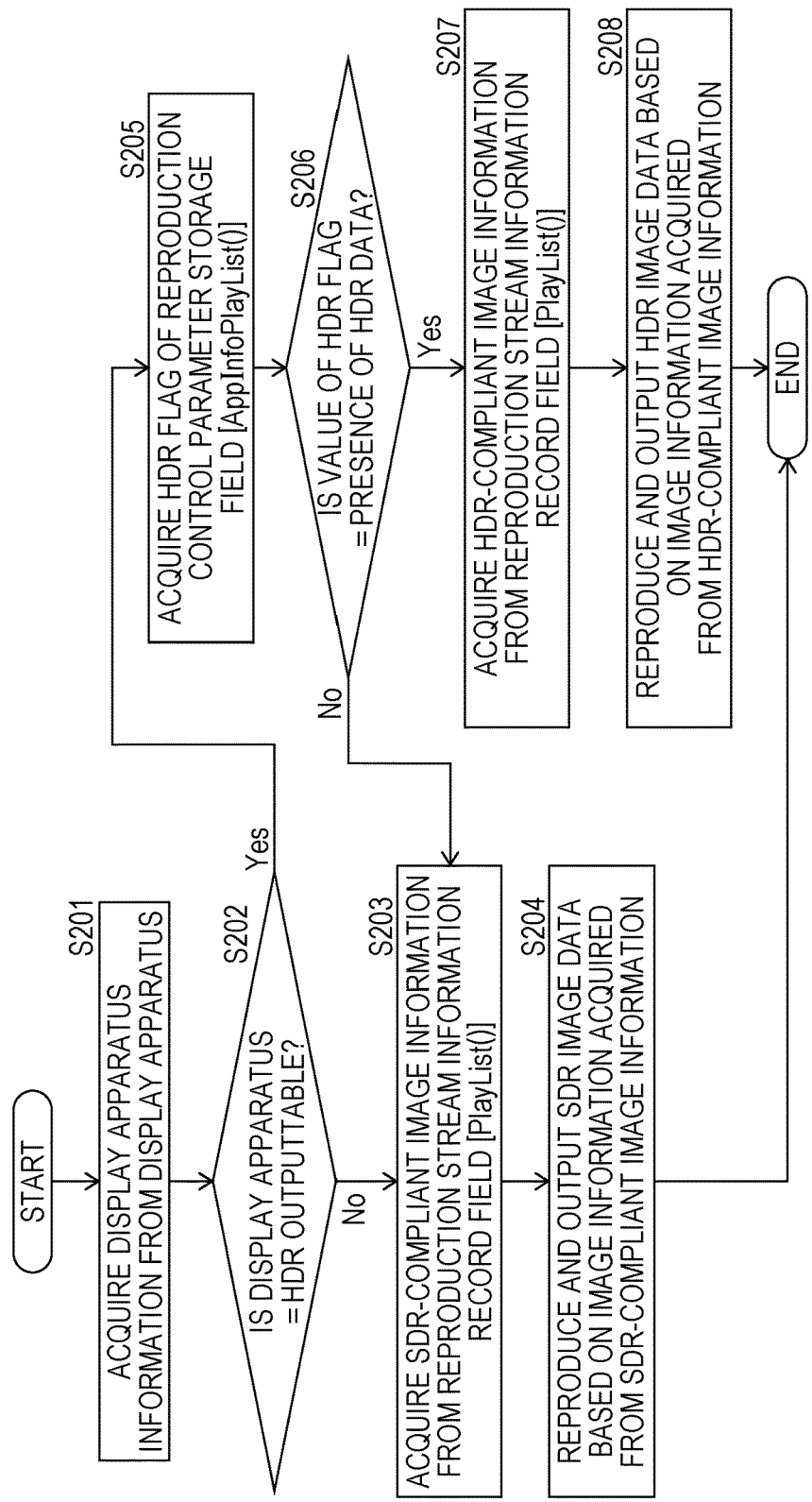
FIG. 22 is a diagram that illustrates a flowchart of a reproduction sequence of an information processing apparatus (reproduction apparatus) reproducing data using a playlist file.

The flowchart illustrated in FIG. 22 is a flowchart that illustrates the use sequence of a playlist file at the time of reproducing data.

In this Embodiment 1-2, a configuration is employed in which image information corresponding to an ultra-high definition [UHD] image is recorded in the reproduction stream information record field [PlayList( )] of the playlist recorded in the disc.

The data processing unit of the reproduction apparatus performs a process according to the flowchart illustrated in FIG. 22.

The data processing unit of the reproduction apparatus includes a data processing unit that includes a CPU having a program execution function and the like and performs the process according to the flow illustrated in FIG. 22 based on a program stored in a storage unit in advance. The process of each step of the flow illustrated in FIG. 22 will be sequentially described.

(Step S201)

First, the reproduction apparatus acquires display apparatus information from a display apparatus connected to the reproduction apparatus. For example, the reproduction apparatus acquires the display apparatus information including dynamic range information (HDR compliance, non-HDR compliance, or the like) displayable using the display apparatus, outputtable color gamut information (BT.707 compliance, BT.2020 compliance, or the like), and the like by performing communication through an HDMI (registered trademark) cable or the like.

(Step S202)

In step S202, the reproduction apparatus determines whether or not the display apparatus is HDR-compliant based on the display apparatus information acquired from the display apparatus in step S201.

In case of a non-HDR compliant display apparatus such as an SDR television set or the like, the determination made in step S202 is No, and the process proceeds to step S203.

On the other hand, in a case where it is checked that the connected display apparatus is an HDR-compliant display apparatus such as an HDR television set or the like, the determination made in step S202 is Yes, and the process proceeds to step S205.

(Step S203)

In step S202, in a case where the display apparatus connected to the reproduction apparatus is checked to be a non-HDR compliant display apparatus, in step S203, image information corresponding to an SDR is acquired from the reproduction stream information record field [PlayList( )] of the playlist file. This image information is acquired from the STN table of the reproduction stream information record field [PlayList( )] of the playlist file.

For example, the image information is the information recorded in the AVC image information record field illustrated in FIG. 20(c).

In the AVC image information record field illustrated in FIG. 20(c), image information relating to an SDR image stored in the clip AV stream file storing an SDR image to be reproduced according to the playlist file is recorded.

In the image information, as described above with reference to FIG. 21, the following information is included.

(1) video format (video_format)
(2) frame rate (frame_rate)
(3) aspect ratio (aspect_ratio)
(4) closed caption flag (cc_flag)
(5) dynamic range setting information (HDR_type)
(6) color gamut setting information (color_space)
(7) content production information (ISRC( ))

(Step S204)

The reproduction apparatus reproduces an SDR image acquired from the clip AV stream file and outputs the SDR image to the display apparatus based on the image information corresponding to an SDR acquired from the reproduction stream information record field [PlayList( )] of the playlist file in step S203.

A process according to a series of steps including steps S202 (No) and steps S203 to S204 is performed as a process of outputting an SDR image to a non-HDR compliant display apparatus such as an SDR television set connected to the reproduction apparatus.

In other words, the output of an SDR image according to the display function of the display apparatus such as an SDR television set is performed, and image output that is appropriate for the display apparatus is performed.

(Step S205)

On the other hand, in a case where the display apparatus connected to the reproduction apparatus is checked to be an HDR-compliant display apparatus in step S202, the reproduction apparatus performs the process of step S205.

In step S205, the reproduction apparatus acquires a setting value of the HDR flag set in the reproduction control parameter storage field [AppInfoPlayList( )] of the playlist file.

In addition, in the reproduction control parameter storage field [AppInfoPlayList( )] of the playlist file, a flag (HDR flag) representing whether or not an HDR image is included in the reproduction target data according to the playlist is recorded.

For example, the following setting flag is set.

Flag Setting Value=1: An HDR image is included in the reproduction target data according to the playlist.

Flag Setting Value=0: An HDR image is not included in the reproduction target data according to the playlist.

The data processing unit of the reproduction apparatus checks the setting value of this flag and can determine whether or not an HDR image is included in the reproduction target data according to the playlist.

The reproduction apparatus determines whether the setting value of the HDR flag acquired in step S205 is a value representing inclusion of an HDR image in the reproduction target data according to the playlist or a value representing no inclusion thereof.

In a case where the setting value of the flag is a value representing the inclusion of an HDR image in the reproduction target data according to the playlist, the process proceeds to step S207.

On the other hand, in a case where the setting value of the flag is a value representing no inclusion of an HDR image in the reproduction target data according to the playlist, the process proceeds to step S203.

In a case where the setting value of the flag is a value representing no inclusion of an HDR image in the reproduction target data according to the playlist, and the process proceeds to step S203, the process of steps S203 to S204 is performed.

In other words, the image information corresponding to an SDR is acquired from the reproduction stream information record field [PlayList( )] of the playlist file, and an SDR image is reproduced and output according to the acquired image information corresponding to an SDR image.

(Step S207)

In the process of checking the setting value of the HDR flag in step S206, in a case where the setting value of the flag is a value representing the inclusion of an HDR image in the reproduction target data according to the playlist, the process proceeds to step S207.

In step S207, the reproduction apparatus acquires the image information corresponding to an HDR from the reproduction stream information record field [PlayList( )] of the playlist file. This image information is acquired from the STN table of the reproduction stream information record field [PlayList( )] of the playlist file.

For example, the image information is the information recorded in the HEVC image information record field illustrated in FIGS. 20(c) and 21.

As described with reference to FIG. 21, in the HEVC image information record field, the following information is recorded as the image information relating to an HDR image stored inside the clip AV stream file storing the HDR image to be reproduced according to the playlist file.

(1) video format (video_format)
(2) frame rate (frame_rate)
(3) aspect ratio (aspect_ratio)
(4) closed caption flag (cc_flag)
(5) dynamic range setting information (HDR_type)
(6) color gamut setting information (color_space)
(7) content production information (ISRC( ))

(Step S208)

The reproduction apparatus reproduces an HDR image acquired from the clip AV stream file and outputs the HDR image to the display apparatus based on the image information corresponding to an HDR acquired from the reproduction stream information record field [PlayList( )] of the playlist file in step S207.

A process according to a series of steps including Steps S202 (No) to S205, S206 (Yes), S207, and S208 is performed as a process of outputting an HDR image to an HDR-compliant display apparatus such as an HDR television set connected to the reproduction apparatus.

In other words, the output of an HDR image according to the display function of the display apparatus such as an HDR television set is performed, and image output that is appropriate for the display apparatus is performed.

In the flowchart illustrated in FIG. 22, while one of the HDR content and the SDR content is set to be output to the display apparatus, for example, like the flow illustrated in FIG. 19 described above, in a case where a content recorded in the disc is only an HDR content, and the display apparatus connected to the reproduction apparatus is non-HDR compliant (an SDR television set or the like), the reproduction apparatus may perform a process of converting the HDR content into an SDR content, and outputting the SDR content. Alternatively, a setting for generating a message indicating that normal output cannot be performed and outputting the generated message may be used.

In the flowchart illustrated in FIG. 22, while an example of performing a selective reproduction process of an SDR content and an HDR content is described, it is merely an example, and, for example, a selective reproduction process of contents having different settings as below also can be performed according to the flow illustrated in FIG. 22.

(1) an AVC content and an HEVC content
(2) a 2K content (1920×1080 pixels) and a 4K content (3840×2160 pixels)
(3) a content of color gamut=BT.707 and a content of color gamut=BT.2020

In such a case, a process acquired by replacing "SDR" and "HDR" described in the flow illustrated in FIG. 22 as below may be performed.

(1) "SDR"→"AVC" and "HDR"→"HEVC"
(2) "SDR"→"2K" and "HDR"→"4K"
(3) "SDR"→"BT.707" and "HDR"→"BT.2020"

[4. Embodiment in which Image Information is Recorded in Clip Information File]

Next, as Embodiment 2, an embodiment in which image information is recorded in the clip information file will be described.

As described above with reference to FIGS. 5 and 6, the clip information file is set in association with the clip AV stream file that is a storage file of a reproduction content and is a file in which reproduction control information such as reproduction position information of a content is stored.

FIG. 23 is syntax that illustrates the data configuration of one clip information file.

As illustrated in FIG. 23, in the clip information file, type information [type_indicator] representing the file type is recorded, and, after that, start address information record fields [SequenceInfoStartAddress] to [ExtensionDataStartAddress] of substantive data are set.

After that, record fields of various kinds of substantive data are set.

A clip information record field [ClipInfo( )] to an extension data record field [ExtensionData( )] are substantive data record fields in which substantive contents recorded in the clip information file are recorded. In other words, information relating to a stream that is necessary for reproducing the actual stream is recorded therein.

As the record fields of substantive data, the following fields are set.

(1) a clip information record field [ClipInfo( )] in which attribute information of a clip such as clip stream type information and application type information is recorded (2) a sequence information record field [SequenceInfo( )] in which sequence information such as time management information, mainly, in a reproduction process is recorded (3) a program information record field [ProgramInfo( )]in which program information such as identification information of a program map table and the number of streams included in a program stream is recorded (4) a CPI record field [CPI( )] in which a set EP map of an EP (entry point) of a presentation time stamp (PTS), for example, of an I picture and the like are recorded (5) a clip mark record field [ClipMark( )] that is set as a reserved field at the current time point (6) an extension data record field [ExtensionData( )] in which various kinds of extension data can be recorded As embodiments in which image information is recorded in the clip information file, examples of recording the image information using the following two fields will be sequentially described.

(Embodiment 2-1) Embodiment in which Image Information is Recorded in Extension Data Record Field [ExtensionData( )] of Clip Information File (Embodiment 2-2) Embodiment in which Image Information is Recorded in Program Information Record Field [ProgramInfo( )] of Clip Information File First, the configuration of the clip information record field [ClipInfo( )] of the clip information file, which is commonly used for Embodiments 2-1 and 2-2, will be described.

FIG. 24 is a syntax diagram that illustrates the data configuration of the clip information record field [ClipInfo( )] of the clip information file.

In the clip information record field [ClipInfo( )], attribute information of a clip such as clip stream type information and application type information is recorded.

In the application type information record field 201, for example, as illustrated in FIG. 25, the type (application type) of a content that is reproduced by applying this clip information file is recorded.

More specifically, for example, information of the reproduction target data such as a setting value 1: a main transport stream (TS) of a main path (a main reproduction path designated in the playlist) of a moving image (Movie) and a setting value 2: a main transport stream (TS) for a main path of a time-based slide show is recorded.

At present, application types=1 to 9 are defined, and "reserved" indicating no use is set to application types=10 to 255.

These values that are set to no use are used as values representing the image information of image data stored in the clip AV stream file to be reproduced according to the clip information file.

FIG. 26 is a diagram that illustrates an example of setting values of extended application types.

The setting values 0 to 9 of the application type are set as those of the current setting.

In addition, the setting values 10 to 15 of the application type are associated with the following image information.

Setting value=10: Coding Form (HEVC), Resolution (1920×1080), Color Gamut (BT.709), and Dynamic Range Setting (SDR)

Setting value=11: Coding Form (HEVC), Resolution (1920×1080), Color Gamut (BT.2020), and Dynamic Range Setting (SDR)

Setting value=12: Coding Form (HEVC), Resolution (1920×1080), Color Gamut (BT.709), and Dynamic Range Setting (HDR)

Setting value=13: Coding Form (HEVC), Resolution (3840×2260), Color Gamut (BT.709), and Dynamic Range Setting (SDR)

Setting value=14: Coding Form (HEVC), Resolution (3840×2160), Color Gamut (BT.2020), and Dynamic Flange Setting (SDR)

Setting value=15: Coding Form (HEVC), Resolution (3840×2160), Color Gamut (BT.2020), and Dynamic Range Setting (HDR)

For example, in a case where the setting value of the application type [application_type] stored in the clip information record field [ClipInfo( )] of the clip information file illustrated in FIG. 24 is [10], it represents an image that is set such that the image data stored in the clip AV stream file reproduced according to the clip information file is set to the coding form (HEVC), the resolution (1920×1080), the color gamut (BT.709), and the dynamic range setting (SDR).

The reproduction apparatus can determine the type of the image data stored in the clip AV stream file reproduced according to the clip information file based on the setting value of the application type.

In a case where a plurality of clip AV stream files storing images that are reproduction targets according to one clip information file are set and represent images of mutually-different forms, in the clip information record field [ClipInfo( )] of the clip information file, an individual application type [application_type] record field corresponding to each clip AV stream file is set, and individual values are set thereto.

The configuration of the setting of the application type [application_type] stored in the clip information record field [ClipInfo( )] of the clip information file is commonly used for Embodiments 2-1 and 2-2 described below.

[4-1. (Embodiment 2-1) Embodiment in which Image Information is Recorded in Extension Data Record Field [ExtensionData( )] of Clip Information File]

First, an embodiment in which image information is recorded in the extension data record field [ExtensionData( )] of the clip information file will be described.

FIG. 27 is syntax that illustrates the configuration of data of the extension data record field [ExtensionData( )] of a clip information file.

In this extension data record field [ExtensionData( )], various kinds of extension data that are difficult to describe in the other fields of the clip information file can be recorded.

In addition, in the extension data record field [ExtensionData( )], since various kinds of extension data are recorded, an extension data identification data field 211 recording the identification information of the extension data is set.

The extension data defined by identifiers (ID1 and ID2) recorded in the extension data identification data field 211 is recorded in a data block 212.

In this embodiment, the extension data recorded in the data block 212, for example, is program information [ProgramInfo_UHD] recording image stream information relating to an HDR content and CPI information [CPI_UHD] including an EP map and the like.

All of these are information corresponding to an ultra-high definition [UHD] image.

As illustrated in FIG. 28, as identification information representing that extension data recorded in the extension data record field [ExtensionData( )] is program information [ProgramInfo_UHD] corresponding to an ultra-high definition [UHD] image, like an entry 221 illustrated in FIG. 28, the following IDs are defined.

ID1=0x0003
ID2=0x0002

In addition, as identification information representing that extension data recorded in the extension data record field [ExtensionData( )] is CPI information [CPI_UHD] corresponding to an ultra-high definition [UHD] image, like an entry 222 illustrated in FIG. 28, the following IDs are defined.

ID1=0x0003
ID2=0x0003

As a combination of the extension data identifiers (ID1 and ID2) defining the type of extension data, the extension data for the identifications (ID1 and ID2) including (ID1, ID2)=(0x0001, 0x0001) to (0x0001, 0x0002) and (ID1, ID2)=(0x0002, 0x0001) to (0x0002, 0x0006) has already been defined, In addition, as described with reference to FIG. 9 in Embodiment 1 described above, ID1=0x0003 and ID2=0x0001 have been newly defined.

The combinations of the IDs of the entries 221 and 222 illustrated in FIG. 28 are not defined at the current time point, and such identification information (ID1 and ID2) is defined as extension data identification information representing that the extension data is program information [ProgramInfo_UHD] and CPI information [CPI_UHD] corresponding to an ultra-high definition [UHD] image.

The program information [ProgramInfo_UHD] corresponding to an ultra-high definition [UHD] image recorded in the data block 212 will be described with reference to FIG. 29 and subsequent drawings.

FIG. 29 is a syntax diagram that illustrates the data configuration of the program information [ProgramInfo_UHD] corresponding to an ultra-high definition [UHD] image recorded in the extension data record field [ExtensionDate( )] of the clip information file.

This program information [ProgramInfo_UHD] is data that is additionally recorded in the clip information file as the program information [ProgramInfo_UHD] corresponding to an ultra-high definition [UHD] image.

In this program information [ProgramInfo_UHD], image information relating to an ultra-high definition [UHD] image is recorded.

In addition, in the program information record field [ProgramInfo( )] that is originally set in the clip information file illustrated in FIG. 23, for example, image information corresponding to a content other than a UHD image is recorded.

In this embodiment, in addition to the program information record field [ProgramInfo( )] that is originally set in the clip information file, the program information [ProgramInfo( )] corresponding to one UHD image is additionally recorded in the extension data record field.

In other words, in the clip information file according to this embodiment, two units of program information are recorded.

In the program information record field [ProgramInfo( )] that is originally set in the clip information file, image information relating to images other than the UHD image is recorded.

In addition, in the program information record field [ProgramInfo( )] that is additionally recorded in the extension data record field [ExtensionData( )] of the clip information file, image information relating to an UHD image is recorded.

The program information record field [ProgramInfo( )] illustrated in FIG. 29 is program information record field [ProgramInfo( )] corresponding to an UHD image that is additionally recorded in the extension data record field and, in a stream coding information record field [StreamCodingInfo( )] 231 included therein, image information relating to an ultra-high definition [UHD] image is recorded.

The detailed configuration of the stream coding information record field [StreamCodingInfo( )] 231 is illustrated in FIG. 30.

In the stream coding information record field [StreamCodingInfo( )] 231, for example, the following information is recorded.

(1) Stream Coding Information (UHD stream coding type)
(2) video format (video_format)
(3) frame rate (frame_rate)
(4) aspect ratio (aspect_ratio)
(5) closed caption flag (cc_flag)
(6) content production information (ISRC( ))
(7) dynamic range setting information (HDR_type)
(8) color gamut setting information (color_space)

An example of setting values of data including "(1) Stream Coding Information (UHD stream coding type)", "(7) dynamic range setting information (HDR_type)", and "(8) color gamut setting information (color_space)" will be described with reference FIG. 31.

The other data of (2) to (6) is similar to the data described with reference to FIG. 21 in Embodiment 1 previously described, and thus, the description thereof will not be presented.

In FIG. 31, a correspondence table of setting values of (a) stream coding information [(HD_stream_coding_type), (b) dynamic range setting information (HDR_type), and (c) color gamut setting information (color_space) and specific meanings is illustrated.

These are similar to the data described with reference to FIGS. 12 to 18 in the previous Embodiment 1.

(a) The meaning of each setting value of the stream coding information (UHD_stream_coding_type) is as below.

A setting value=0x02 represents that the coding image data according to the MPEG-2 is stored in the clip AV stream file.

In addition, a setting value=0x1B represents that the coding image data according to the AVC is stored in the clip AV stream file.

Furthermore, a setting value=0x21 represents that the coding image data according to the HEVC is stored in the clip AV stream file.

The reproduction apparatus, by referring to the stream coding information record field, can check the coding form of image data stored in the clip AV stream file selected as a reproduction target according to the clip information file.

(b) The meaning of each setting value of the dynamic range setting information (HDR_type) is as follows.

A setting value=00 represents that an image stored in the clip AV stream file is an SDR image.

In addition, a setting value=01 represents that an image stored in the clip AV stream file is an HDR-Type 1 image.

Furthermore, a setting value=10 represents that an image stored in the clip AV stream file is an HDR-Type2 image.

In addition, a setting value=11 represents that an image stored in the clip AV stream file is an HDR-Type 3 image.

The reproduction apparatus, by referring to this dynamic range setting information record field, can check the setting form of the dynamic range of image data stored in the clip AV stream file selected as a reproduction target according to the clip information file.

Alternatively, as a configuration in which three-bit data can be stored in the dynamic range setting information (HDR_type) record field, a configuration in which the bit information described above with reference to FIG. 16 or FIG. 18 is set may be employed.

(c) The meaning of each setting value of the color gamut setting information (color_space) is as below, A setting value=00 represents that a color gamut setting of an image stored in the clip AV stream file is a color gamut setting enabling output of color values corresponding to a color space defined in the color space BT.707.

In addition, a setting value=01 represents that a color gamut setting of an image stored in the clip AV stream file is a color gamut setting enabling output of color values corresponding to a color space defined in the color space BT.2020.

Furthermore, setting values=10 and 11 are set as reserved areas. In a case where another color space is used in the future, the setting values can be used.

The reproduction apparatus, by referring to this color gamut setting information record field, can check the setting form of the color gamut of image data stored in the clip AV stream file selected as a reproduction target according to the clip information file.

Next, the CPI information [CPI_UHD] corresponding to an ultra-high definition [UHD] image that is another additional data recorded in the data block 212 of the extension data record field of the clip information file illustrated in FIG. 27 will be described with reference to FIG. 32 and subsequent drawings.

In addition, in the CPI information record field [CPI( )] that is originally set in the clip information file illustrated in FIG. 23, for example, image information corresponding to a content other than a UHD image is recorded.

In this embodiment, in addition to the CPI information record field [CPI( )] that is originally set in the clip information file, the CPI information [CPI_UHD] corresponding to one UHD image is additionally recorded in the extension data record field.

In other words, in the clip information file according to this embodiment, two units of CPI information are recorded.

In the CPI information record field [CPI( )] that is originally set in the clip information file, image information relating to images other than the UHD image is recorded.

In addition, in the CPI information record field [CPI_UHD] that is additionally recorded in the extension data record field [ExtensionData( )] of the clip information file, image information relating to an UHD image is recorded.

FIG. 32 is a syntax diagram that illustrates the data configuration of the CPI information [CPI_UHD] corresponding to an ultra-nigh definition [UHD] image recorded in the extension data record field [ExtensionDate( )] of the clip information file.

This CPI information [CPI_UHD] is data that is additionally recorded in the clip information file as the CPI information [CPI_UHD] corresponding to an ultra-high definition [UHD] image.

In this CPI information [CPI_UHD], image information relating to an ultra-high definition [UHD] image is recorded.

In the CPI information, as illustrated in FIG. 32, an EP map record field (EP_map_UHD( )] 241 is set.

The EP map will be described with reference to FIG. 33 and subsequent drawings.

First, as described with reference to FIG. 6, the playlist includes information that indicates access points corresponding to a reproduction start position and a reproduction end position of a clip using time stamps that are information on the time axis.

The clip information file is used for finding address information, at which the decoding of a stream included in the clip AV stream file is to be started, from this time stamp.

Figure 33:
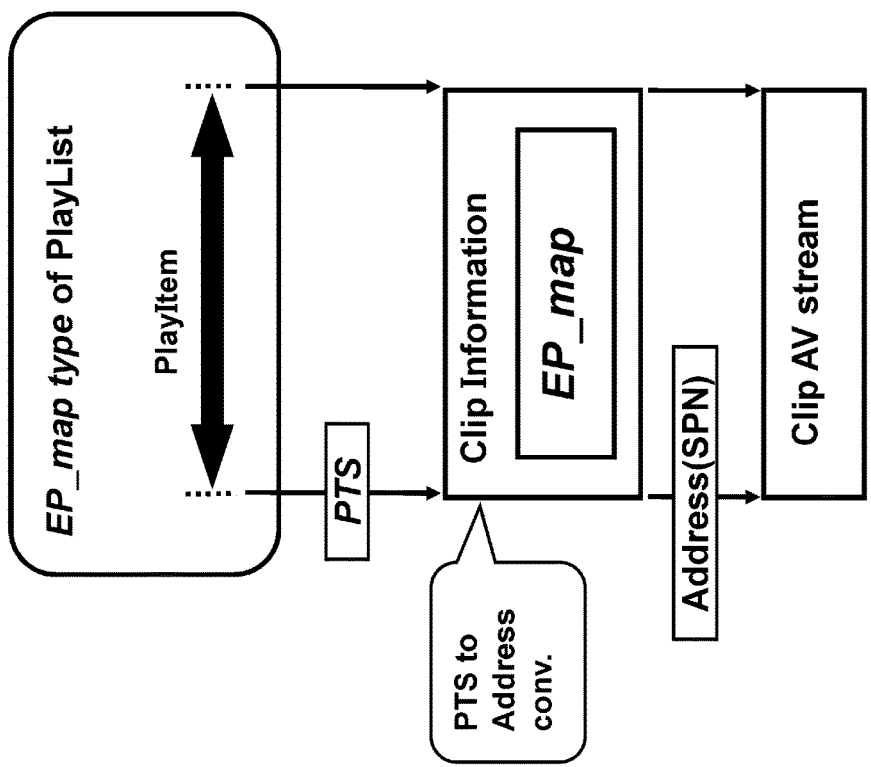
FIG. 33 is a diagram that illustrates an EP map.

In addition, the clip information file includes the EP map (EP_map) illustrated in FIG. 33.

The EP map records access point information corresponding to the reproduction start position and the reproduction end position, at which random reproduction can be started, included in the reproduction data stored in the clip AV stream file.

In other words, in the EP map, correspondence data between a time stamp representing the reproduction start position on the time axis and address information used for acquiring a packet corresponding to packet position information is recorded.

More specifically, the EP map includes the correspondence information between (a) a time stamp (PTS: Presentation Time Stamp) representing an access point on the time axis and (b) a source packet number (SPN) corresponding to an address representing the access point as the position of a packet inside the clip AV stream.

By referring to the EP map including such correspondence information, a corresponding address (SPN) is acquired based on the time stamp, and, for example, a decoding start point that is a reproduction start position inside the AV stream, and the like can be acquired based on the address (SPN).

Figure 34:
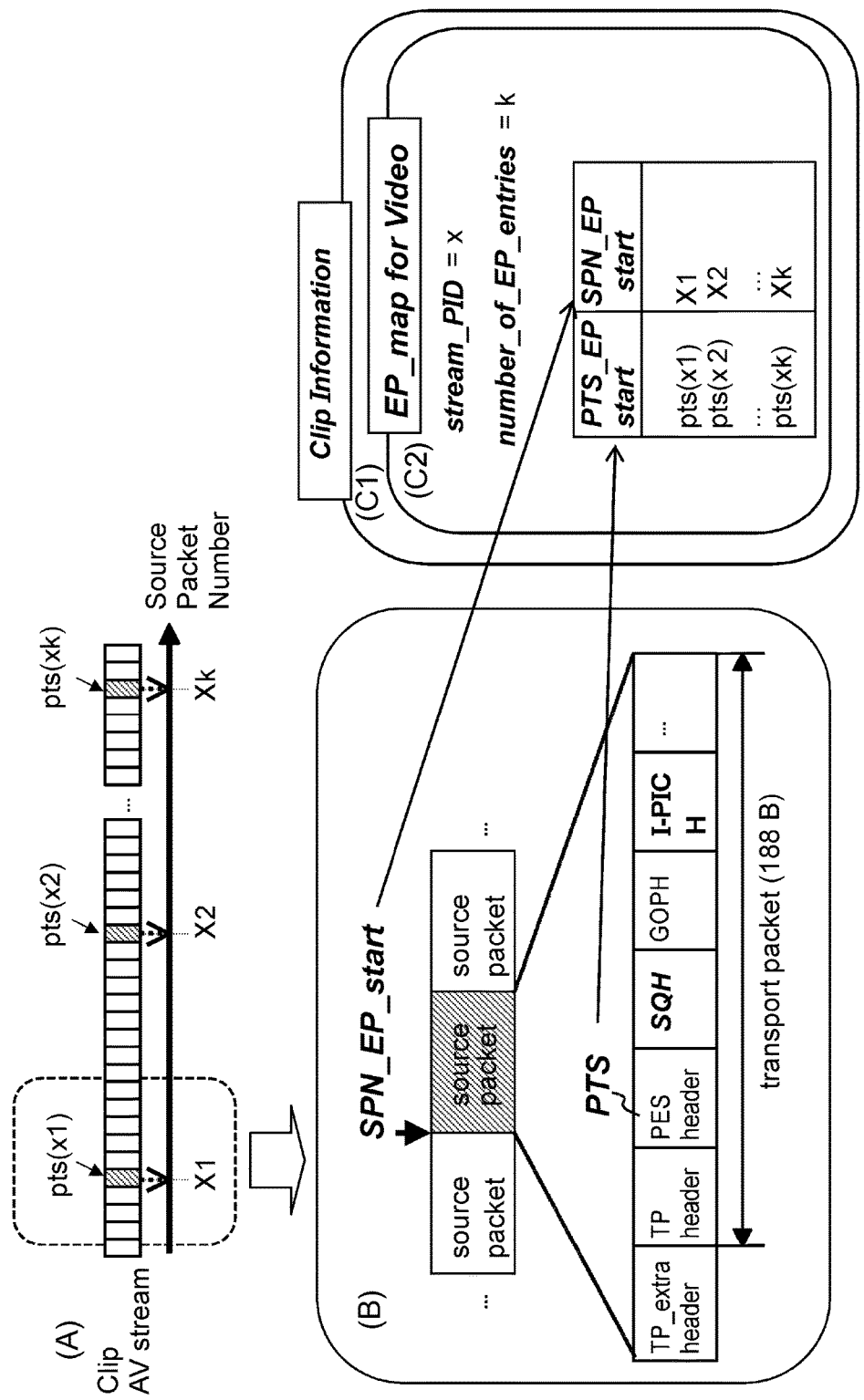
FIG. 34 is a diagram that illustrates an EP map.

FIG. 34 is a diagram that illustrates an example of a specific configuration of the EP map (EP_map) and the use thereof. In a clip AV stream illustrated in FIG. 34(A), video streams configured by source packets identified using packet identifiers: PID are multiplexed. The video streams, for each source packet, are discriminated from each other based on PIDs included in headers of transport packets included in the source packets.

The source packet of the video stream includes: IPB pictures configuring MPEG data, in other words, an I (Intra) picture, a P (Predictive) picture, and a B (Bidirectionally predictive) picture. The I picture is picture data that can be independently decoded, and the other pictures including the P picture and the B picture need to refer to prior and next I pictures in case of decoding. For example, a reproduction start point according to a random access is set as the position of a packet including an I picture that can be independently decoded.

The EP map maintains the position information of I pictures as reproduction start point position information that can be randomly accessed as data corresponding to the PTS and the SPN described above. In other words, the EP map is correspondence information between (a) a time stamp (PTS: Presentation Time Stamp) representing the access point on the time axis and (b) a source packet number (SPN) corresponding to an address representing that access point as the position of a packet inside the clip AV stream.

By referring to the EP map set as such, the place of each I picture that is a randomly accessible reproduction start position can be acquired. The EP map (EP_map) is data included in the clip information file.

The detection of the position of an I picture based on the EP map will be described with reference to FIG. 34. FIG. 34(A) illustrates a clip AV stream, and each rectangle represents a source packet of 192 bytes.

In the diagram, a source packet including the first byte of an I (Intra) picture is illustrated as a quadrangle to which diagonal lines are applied. A white rectangle having no diagonal line represents a source packet including data that is not a random access point or a source packet including data of another stream.

For example, a source packet, of a source packet number X1 including the first byte of an I picture, which can be randomly accessed, of a video stream identified as PID=x is arranged at the position of PTS=pts (x1) on the time axis of the clip AV stream. Similarly, a source packet including the first byte of an I picture, which can be randomly accessed next, is regarded as a source packet, of a source packet number X2 and is arranged at the position of PTS=pts (x2).

As illustrated in FIG. 34(B), the source packet is configured in a form acquired by adding a header (TP extra header) of four bytes to a transport packet of 188 bytes. A transport packet part is configured by a header part. (TP header) and a payload part.

SPN_EP_start, that is registration data of the EP map illustrated in FIG. 34(C2) represents the source packet number (SPN) of a source packet including the first byte of an access unit including an I picture starting from a sequence header (SQH).

A serial number set to all the packets included in the clip AV stream file is the source packet number (SPN). In the clip AV stream file, the source packet number of the first source packet has a source packet, number of zero, the source packet number of the next packet, is one, and, thereafter, the source packet number increases by one for each next packet.

As illustrated in FIG. 34(C2), in the EP map (EP_map), data of a stream. PID (Stream_PTD), the number of EP entries (number_of_EP_entries), a presentation time stamp EP start (PTS_EP_start), and a source packet number EP start (SPN_EP_start) is recorded.

The stream PID (Stream_PID) is a packet identifier (PID) of a transport packet transmitting a video stream.

The number of EP entries (number_of_EP_entries) is the number of entries of pairs of PTS_EP_start and SPN_EP_start included in EP_map.

The presentation time stamp EP start (PTS_EP_start) represents a PTS (presentation time stamp) of the access unit, starting from an I picture that can be randomly accessed.

The source packet number EP start (SPN_EP_start) represents a source packet number (SPN) including the first byte of an access unit that is referred to in accordance with the value of PTS_EP_start.

The value of the PID (packet identifier) of the video stream is stored in stream_PID, and EP_map( ) that is table information representing correspondence relation between PTS_EP_start and SPN_EP_start is generated.

For example, in the EP map of the video stream of PID=x, a table configured by correspondence data between PTS and SPN including PTS=pts(×1) and a source packet number (SPN) X1, PTS=pts (×2) and a source packet number (SPN) X2, . . . , PTS=pts (xk) and a source packet number (SPN) Xk is described.

The EP map (EP_map) including the table described above is stored in a clip information file corresponding to one clip AV stream.

The EP map (EP_map) including such data, for example, is referred to so as to specify a decode start position at the time of making a random access.

When reproduction is started from time x on the time axis in the clip, a method of calculating address information at which decoding of the stream is to be started in the clip AV stream file by using EP_map will be described with reference to FIG. 35.

Figure 35:
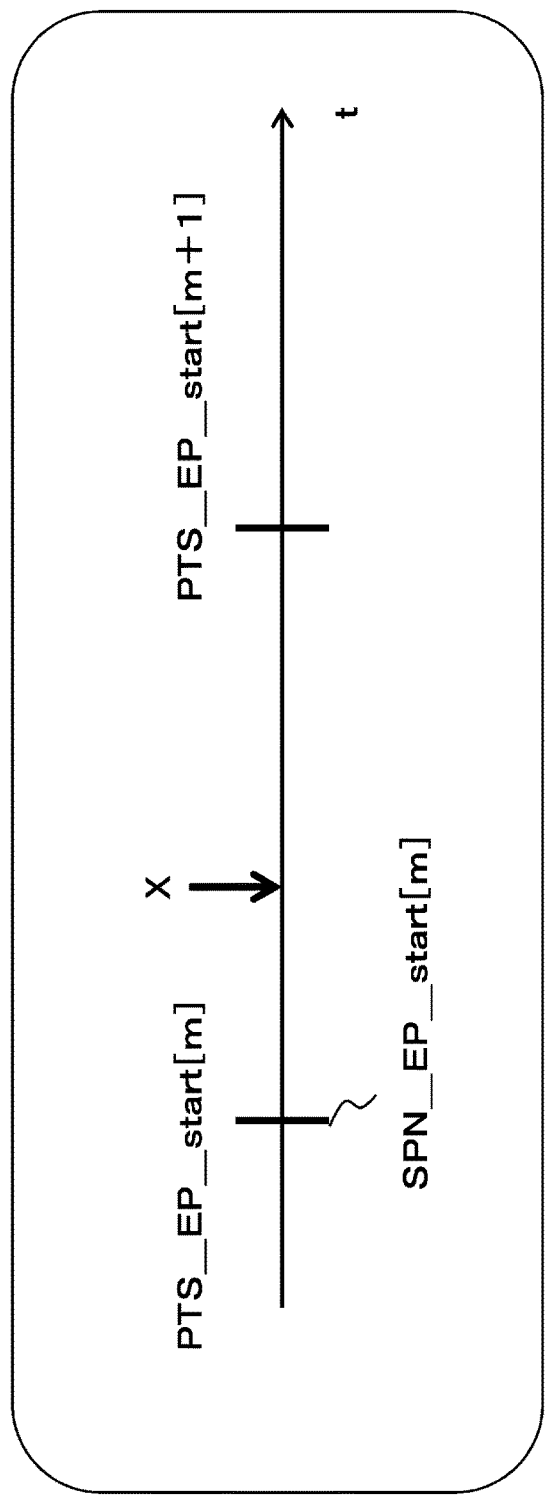
FIG. 35 is a diagram that illustrates an EP map.

As illustrated in FIG. 35, in a case where a playlist includes information used for designating the reproduction start from time x on the time axis in the clip, a time stamp [PTS_EP_start [m]] having a value that is less than x and is closest to x is specified.

Based on a time stamp [PTS_EP_start [m]] specified based on the playlist information, by referring to the EP map included in the clip information file, a source packet number [SPN_EP_start[m]] corresponding to the time stamp [PTS_EP_start[m]] is specified.

In this way, by using the EP map, based on PTS that is the reproduction time information determined based on the playlist information, SPN that is the packet position information corresponding to the PTS, in other words, [SPN_EP_start[m]] is acquired.

This packet position [SPN_EP_start[m]] is acquired as a reproduction start point in the clip AV stream file, in other words, address information at which decoding is to be started, and a decoding process is performed, whereby reproduction can be performed.

This Embodiment 2-1 is an embodiment realizing a clip information file that is applicable also in a case where two contents (for example, an SDR content and an HDR content) stored in two clip AV stream files are reproduced by using one playlist file and one clip information file, as described above in (2) Type 2 illustrated in FIG. 3.

In such a case, as an EP map to be recorded in one clip information file, it is necessary to record two EP maps including (1) an EP map for an SDR content and (2) an EP map for an HDR content.

FIG. 36 illustrates these two EP maps.

FIG. 36 illustrates the following two EP maps.
(1) EP map for an SDR content
(2) EP map for an HDR content Each of these two EP maps is configured by correspondence data between a presentation time stamp (PTS) and a source packet number (SPN).

(1) EP map for an SDR content is an EP map used in a case where an SDR image is reproduced by applying a clip AV stream file in which an SDR content is stored. A source packet number (SPN) recorded in (1) EP map for an SDR content is data that represents the position of a packet stored in a clip AV stream file storing the SDR content.

On the other hand, (2) EP map for an HDR content is an EP map used in a case where an HDR image is reproduced by applying a clip AV stream file in which an HDR content is stored. A source packet number (SPN) recorded in (2) EP map for an HDR content is data that represents the position of a packet stored in a clip AV stream file storing the HDR content.

These two EP maps including (1) EP map for an SDR content and (2) EP map for an HDR content are recorded in one clip information file.

However, the recording positions inside the clip information file are different from each other. In other words, (1) EP map for an SDR content is recorded in the CPI information record field [CPI( )] that is originally set in the clip information file illustrated in FIG. 23.

On the other hand, (2) EP map for an HDR content, as described above, is recorded in the CPI information record field [CPI( )] that is additionally recorded in the extension data record field [ExtensionData( )] of the clip information file illustrated in FIG. 23. In other words, the EP map for an HDR content is recorded in the CPI information record field, which has been described with reference to FIG. 32, that is additionally recorded in the extension data record field [ExtensionData( )] illustrated in FIG. 27.

In a case where an SDR content is reproduced, the reproduction apparatus performs a reproduction process by referring to the EP map corresponding to an SDR content recorded in the CPI information record field [CPI( )] that is originally set in the clip information file illustrated in FIG. 23.

On the other hand, in a case where an HDR content is reproduced, the reproduction apparatus performs a reproduction process by referring to the EP map corresponding to an HDR content recorded inside the CPI information record field [CPI( )] that is newly recorded in the extension data record field [ExtensionData( )] of the clip information file illustrated in FIG. 23.

In this way, for any one of the SDR content and the HDR content, a reproduction process using one clip information file can be performed.

Next, the reproduction sequence of the information processing apparatus (reproduction apparatus) performing data reproduction using the clip information file from a disc in which the clip information file described in Embodiment 2-1 is recorded will be described with reference to a flowchart illustrated FIG. 37.

Figure 37:
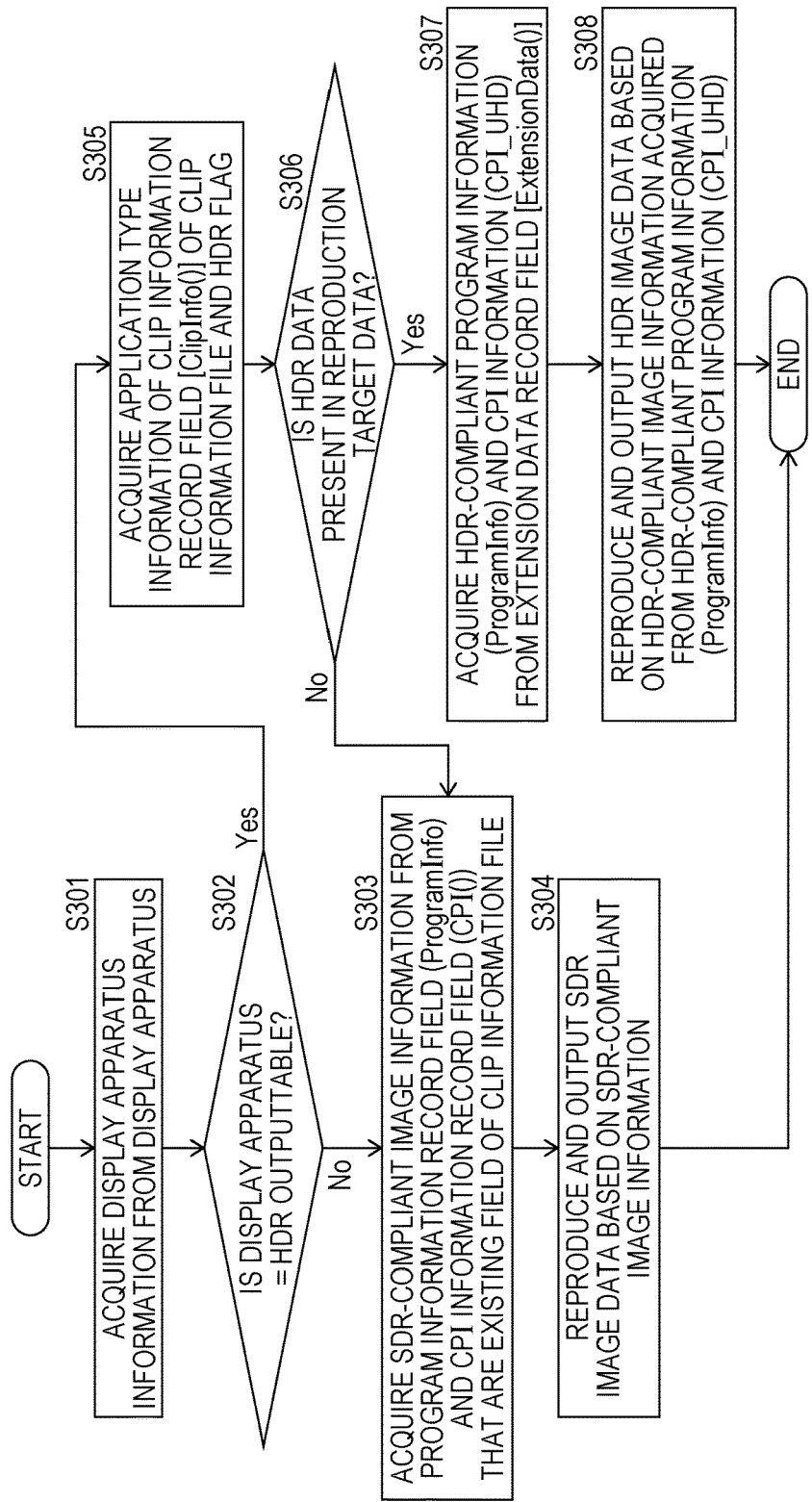
FIG. 37 is a diagram that illustrates a flowchart of a reproduction sequence of an information processing apparatus (reproduction apparatus) reproducing data using a clip information file.

The flowchart illustrated in FIG. 37 is a flowchart that illustrates the use sequence of a clip information file at the time of reproducing data.

In this Embodiment 2-1, in the clip information record field [ClipInfo( )] of the clip information file recorded in the disc, the extended application type information described with reference to FIG. 26 is recorded.

In addition, in the extension data record field [ExtensionData( )] of the clip information file, the program information [ProgramInfo_UHD] that is image information corresponding to an ultra-high definition [UHD] image and the CPI information [CPI_UHD] including the EP map and the like are recorded.

More specifically, in the stream coding information record field [StreamCodingInfo( )] of the program information [ProgramInfo_UHD], various kinds of image information corresponding to an ultra-high definition [UHD] image described with reference to FIG. 30 are recorded.

In addition, as the CPI information [CPI_UHD], an EP map corresponding to an ultra-high definition [UHD] image illustrated in FIG. 36(2) is recorded.

A data processing unit of the reproduction apparatus performs a process according to the flowchart illustrated in FIG. 37.

The data processing unit of the reproduction apparatus includes a data processing unit that includes a CPU having a program execution function and the like and performs the process according to the flow illustrated in FIG. 37 based on a program stored in a storage unit in advance. The process of each step of the flow illustrated in FIG. 37 will be sequentially described.

(Step S301)

First, the reproduction apparatus acquires display apparatus information from a display apparatus connected to the reproduction apparatus. For example, the reproduction apparatus acquires the display apparatus information including dynamic range information (HDR compliance, non-HDR compliance, or the like) displayable using the display apparatus, outputtable color gamut information (BT.707 compliance, BT.2020 compliance, or the like), and the like by performing communication through an HDMI (registered trademark) cable or the like.

(Step S302)

In step S302, the reproduction apparatus determines whether or not the display apparatus is HDR-compliant based on the display apparatus information acquired from the display apparatus in step S301.

In case of a non-HDR compliant display apparatus such as an SDR television set or the like, the determination made in step S302 is No, and the process proceeds to step S303.

On the other hand, in a case where it is checked that the connected display apparatus is an HDR-compliant display-apparatus such as an HDR television set or the like, the determination made in step S302 is Yes, and the process proceeds to step S305.

(Step S303)

In step S302, in a case where the display apparatus connected to the reproduction apparatus is checked to be a non-HDR compliant display apparatus, in step S303, image information corresponding to an SDR is acquired from the program information record field [ProgramInfo] or the CPI information record field [CPI( )] that is an existing field defined in advance in the clip information file.

Such information corresponding to an SDR image is acquired from the program information record field [ProgramInfo] or the CPI information record field [CPI( )] that is an existing field defined in advance in the clip information file illustrated in FIG. 23.

From the program information record field [ProgramInfo], image information relating to an SDR image, for example, information such as the stream coding information, the dynamic range setting information, and the color gamut setting information can be acquired.

In addition, from the CPI information record field [CPI( )], the EP map corresponding to an SDR and the like are acquired.

(Step S304)

The reproduction apparatus reproduces an SDR image acquired from the clip AV stream file and outputs the SDR image to the display apparatus based on the image information corresponding to an SDR acquired from the existing field of the clip information file in step S303.

A process according to a series of steps including steps S302 (No) and S303 to S304 is performed as a process of outputting an SDR image to a non-HDR compliant display apparatus such as an SDR television set connected to the reproduction apparatus.

In other words, the output of an SDR image according to the display function of the display apparatus such as an SDR television set is performed, and image output that is appropriate for the display apparatus is performed.

(Step S305)

On the other hand, in a case where the display apparatus connected to the reproduction apparatus is checked to be an HDR-compliant display apparatus in step S302, the reproduction apparatus performs the process of step S305.

In step S305, the reproduction apparatus acquires the recording information of the clip information record field [ClipInfo( )] of the clip information file.

In the clip information record field [ClipInfo( )] of the clip information file, the application type (application type) information described above with reference to FIG. 26 is recorded.

In other words, information of the image data reproduced according to this clip information file is recorded, and information indicating whether or not an HDR image is included is recorded.

In addition, an HDR flag similar to that described above in the playlist file is also recorded.

The data processing unit of the reproduction apparatus checks the application type (application type) information of the clip information record field [ClipInfo( )] of the clip information file and the setting value of the HDR flag and can determine whether or not an HDR image is included in the reproduction target data according to the clip information file.

(Step S306)

The reproduction apparatus, based on the application type information acquired in step S305 and the setting of the HDR flag, determines whether or not an HDR image is included in the reproduction target data according to the clip information file.

In a case where an HDR, image is included in the reproduction target data, the process proceeds to step S307.

In case of a value representing that an HDR image is not included in the reproduction target data, the process proceeds to step S303.

In a case where an HDR image is not included in the reproduction target data, the process of steps S303 to S304 is performed.

In other words, the image information corresponding to an SDR is acquired from the program information record field [ProgramInfo] or the CPI information record field [CPI( )], which is an existing field defined in advance in the clip information file, and the SDR image is reproduced and output according to the acquired STN table corresponding to an SDR.

(Step S307)

In step S306, in a case where it is checked that an HDR image is included in the reproduction target data, the process proceeds to step S307.

In step S307, the reproduction apparatus acquires image information corresponding to an HDR from the extension data record field [ExtensionData( )] of the clip information file.

More specifically, image information corresponding to an HDR is acquired from the program information record field [ProgramInfo] that is additionally recorded in the extension data record field [ExtensionData( )] of the clip information file or the CPI information record field [CPI_UHD].

In the program information record field [ProgramInfo]that is additionally recorded in the extension data record field [ExtensionData( )], the image information relating to an HDR image described above with reference to FIG. 30, for example, information such as the stream coding information, the dynamic range setting information, and the color gamut setting information is recorded.

In addition, in the CPI information record field [CPI_UHD], the EP map corresponding to an HDR described above with reference to FIG. 36 and the like are recorded.

(Step S308)

The reproduction apparatus reproduces an HDR image acquired from the clip AV stream file and outputs the HDR image to the display apparatus based on the image information corresponding to an HDR acquired from, the extension data record field [ExtensionData( )] of the clip information file in step S307.

A process according to a series of steps including steps S302 (Yes) to S305, S306 (Yes) to S307, and S308 is performed as a process of outputting an HDR image to an HDR-compliant display apparatus such as an HDR television set connected to the reproduction apparatus.

In other words, the output of an HDR image according to the display function of the display apparatus such as an HDR television set is performed, and image output that is appropriate for the display apparatus is performed.

In the flowchart illustrated in FIG. 37, while one of the HDR content and the SDR content is set to be output to the display apparatus, for example, in a case where a content recorded in the disc is only an HDR content, and the display apparatus connected to the reproduction apparatus is non-HDR compliant (an SDR television set or the like), the reproduction apparatus may perform a process of converting the HDR content into an SDR content and outputting the SDR content. Alternatively, a setting for generating a message indicating that normal output cannot be performed and outputting the generated message may be used.

In the flowchart illustrated in FIG. 37, while an example of performing a selective reproduction process of an SDR content and an HDR content is described, it is merely an example, and, for example, a selective reproduction process of contents having different settings as below also can be performed according to the flow illustrated in FIG. 37.

(1) an AVC content and an HEVC content
(2) a 2K content (1920×1080 pixels) and a 4K content (3840×2160 pixels)
(3) a content of color gamut=BT.707 and a content of color gamut=Bt.2020

In such a case, a process acquired by replacing "SDR" and "HDR" described in the flow illustrated in FIG. 37 as below may be performed.

(1) "SDR"→"AVC" and "HDR"→"HEVC"
(2) "SDR"→"2K" and "HDR"→"4K"
(3) "SDR"→"BT.707" and "HDR"→"BT.2020"

4-2. (Embodiment 2-2) Embodiment in which Image Information is Recorded in Program Information Record Field [ProgramInfo( )] of Clip Information File Next, as Embodiment 2-2, an embodiment in which image information is recorded in the program, information record field [ProgramInfo( )] of the clip information file will be described.

As described above with reference to FIG. 23, in the clip information file, the following substantive data record fields are set.

(1) a clip information record field [ClipInfo( )] in which attribute information of a clip such as clip stream type information and application type information is recorded
(2) a sequence information record field [SequenceInfo( )] in which sequence information such as time management information, mainly, in a reproduction process is recorded
(3) a program information record field [ProgramInfo( )] in which program information such as identification information of a program map table and the number of streams included in a program stream is recorded
(4) a CPI record field [CPI( )] in which a set EP map of an EP (entry point) of a presentation time stamp (PTS), for example, of an I picture and the like are recorded
(5) a clip mark record field [ClipMark( )] that is set as a reserved field at the current time point
(6) an extension data record field [ExtensionData( )] in which various kinds of extension data can be recorded Embodiment 2-2 described below is an embodiment in which image information corresponding to an ultra-high definition [UHD] image is recorded in the program information record field [ProgramInfo( )] recording program information included in the clip information file.

A syntax diagram that illustrates the data configuration of the program information record field [ProgramInfo( )] included in the clip information file is illustrated in FIG. 38.

The program information record field [ProgramInfo( )] illustrated in FIG. 38 is a program information record field [ProgramInfo( )] that is set in advance in the clip information file.

In the stream coding information record field [StreamCodingInfo( )] 251 included therein, image information relating to an ultra-high definition [UHD] image is recorded.

Figure 39:
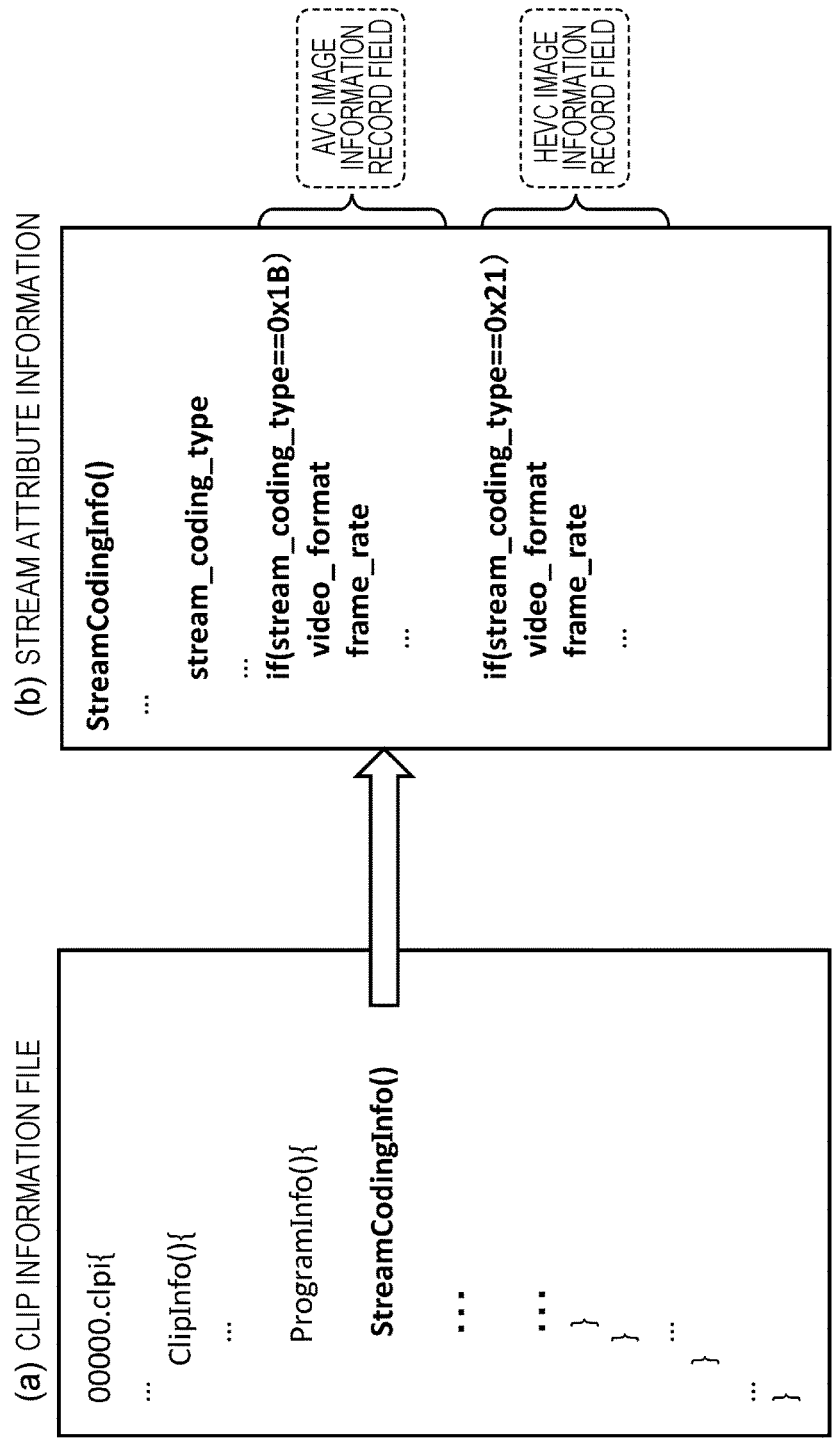
FIG. 39 is a diagram that illustrates an example of stream attribute information recorded in a clip information file.

In FIG. 39, the following diagrams are illustrated.

(a) a clip information file (b) a stream coding information record field [StreamCodingInfo( )] that is a field in which image attribute information in units of stream coding forms [Stream_coding_type] set in the program information record field [ProgramInfo( )] included in the clip information file is recorded A data area of FIG. 39(b) corresponds to the stream coding information record field [StreamCodingInfo( )] 251 illustrated in FIG. 38.

In this embodiment, in the stream coding information record field [StreamCodingInfo( )] 251, image information corresponding to an ultra-high definition [UHD] image is recorded.

An AVC image information record field recorded in the stream attribute information illustrated in FIG. 39(b), for example, is an area in which image information corresponding to a conventional SDR image is recorded.

In the AVC image information record field illustrated in FIG. 39(b), the value of the stream coding form [Stream_coding_type]=0×1B is recorded.

An example of code setting values representing the stream coding form [Stream_coding_type] is illustrated in FIG. 40.

As illustrated in FIG. 40, for example, a setting value=0x02 represents that coding image data according to the MPEG-2 is stored in the clip AV stream file.

In addition, a setting value=0×1B represents that coding image data according to the AVC is stored in the clip AV stream file.

Furthermore, a setting value=0×21 represents that coding image data according to the HEVC is stored in the clip AV stream file.

The reproduction apparatus, by referring to this stream coding information record field, can check the coding form of image data stored in the clip AV stream file selected as a reproduction target according to the clip information file.

In the AVC image information record field illustrated in FIG. 39(b), the value of the stream coding form [Stream_coding_type]=0×1B is recorded. After the record field of this stream coding form [Stream_coding_type]=0×1B, image information (a video format, a frame rate, and the like) relating to the AVC image data is recorded.

The AVC image information record field illustrated in FIG. 39(b) is an existing image information record field recorded in the stream coding information record field [StreamCodingInfo( )] 251 illustrated in FIG. 38.

In this Embodiment 2-2, image information corresponding to an ultra-nigh definition [UHD] image is newly recorded inside the stream coding information record field [StreamCodingInfo( )] 251 illustrated in FIG. 38, In FIG. 39(b), an HEVC image information recording field is illustrated.

In the HEVC image information record field illustrated in FIG. 39(b), the stream coding form [Stream_coding_type]=0x21, in other words, as described with reference to FIG. 40, a value [0x21] representing that the stream coding form is the HEVC is recorded. After the record field of this stream coding form [Stream_coding_type]=0x21, image information (a video format, a frame rate, and the like) relating to the HEVC image data is recorded.

An example of the detailed configuration of the stream coding information record field [StreamCodingInfo( )] inside the clip information file is illustrated in FIG. 41.

FIG. 41 is syntax that illustrates the HEVC image information record field 271 illustrated in FIG. 39(b) in detail.

In the HEVC image information record field 271 illustrated in FIG. 41, image information of an ultra-high definition [UHD] image that can be reproduced by applying the clip information file is recorded.

More specifically, the following image information is recorded.

(1) video format (video_format)

(2) frame rate (frame_rate)

(3) aspect ratio (aspect_ratio)

(4) closed caption flag (cc_flag)

(5) dynamic range setting information (HDR_type)

(6) color gamut setting information (color_space)

(7) content production information (ISRC( ))

(1) In the video format (video_format), resolution information, for example, resolution information such as a 2K image of 1920×1080 or a 4K image of 3840×2160 is recorded.

(2) In the frame rate (frame_rate), the frame rate information of the video is recorded.

(3) In the aspect ratio (aspect_ratio), the aspect ratio of an output image, for example, an aspect ratio such as 16:9 or 4:3 is recorded.

(4) The closed caption flag (cc_flag) is a record field of subtitle-related information.

(5) In the dynamic range setting information (HDR_type), information similar to the dynamic range information described above with reference to FIG. 31 is recorded. For example, the following values are recorded.

Setting value=00 represents that an image stored in the clip AV stream file storing a reproduction target image according to the clip information file is an SDR image.

Setting value=01 represents that an image stored in the clip AV stream file storing a reproduction target image according to the clip information file is an HDR-Type 1 image.

Setting value=10 represents that an image stored in the clip AV stream file storing a reproduction target image according to the clip information file is an HDR-Type2 image.

Setting value=11 represents that an image stored in the clip AV stream file storing a reproduction target image according to the clip information file is an HDR-Type 3 image.

Alternatively, as a configuration in which three-bit data can be stored in the dynamic range setting information (HDR_type) record field, a configuration in which the bit information described above with reference to FIG. 16 or FIG. 18 is set may be employed.

(6) In the color gamut setting information (color_space), information similar to the color gamut setting information described above with reference to FIG. 31 is recorded. For example, the following values are recorded.

A setting value=00 represents that a color gamut setting of an image stored in the clip AV stream file storing a reproduction target image according to the clip information file is a color gamut setting enabling output of color values corresponding to a color space defined in the color space BT.707.

A setting value=01 represents that a color gamut setting of an image stored in the clip AV stream file storing a reproduction target image according to the clip information file is a color gamut setting enabling output of color values corresponding to a color space defined in the color space BT.2020.

(7) In the content production information (ISRC( )), content production-related information such as a nation, an organization, date and time, and the like of the production of a reproduction target content according to the clip information file is recorded.

In this way, in this Embodiment 2-2, image information corresponding to an ultra-high definition [UHD] image is newly recorded in the stream coding information record field [StreamCodingInfo( )] 251 of the program information record field [ProgramInfo( )] included in the clip information file.

The reproduction apparatus determines whether or not the image is an image adapted to the display apparatus connected to the reproduction apparatus by referring to this image information and can perform a process of selecting and reproducing the image adapted to the connected display apparatus, a process of converting the image into image data outputtable to the connected reproduction apparatus and outputting the converted image data, or the like.

Next, the reproduction sequence of the information processing apparatus (reproduction apparatus) performing data reproduction using the clip information file from a disc in which the clip information file described in Embodiment 2-2 is recorded will be described with reference to a flowchart illustrated FIG. 42.

The flowchart illustrated in FIG. 42 is a flowchart that illustrates the use sequence of a clip information file at the time of reproducing data.

This Embodiment 2-2 has a configuration in which image information corresponding to an ultra-high definition [UHD] image is recorded in the program information record field [ProgramInfo( )] of the clip information file recorded in a disc.

A data processing unit of the reproduction apparatus performs a process according to the flowchart illustrated in FIG. 42.

The data processing unit of the reproduction apparatus includes a data processing unit that includes a CPU having a program execution function and the like and performs the process according to the flow illustrated in FIG. 42 based on a program stored in a storage unit in advance. The process of each step of the flow illustrated in FIG. 42 will be sequentially described.

(Step S401)

First, the reproduction apparatus acquires display apparatus information from a display apparatus connected to the reproduction apparatus. For example, the reproduction apparatus acquires the display apparatus information including dynamic range information (HDR compliance, non-HDR compliance, or the like) displayable using the display apparatus, outputtable color gamut information (BT.707 compliance, BT.2020 compliance, or the like), and the like by performing communication through an HDMI (registered trademark) cable or the like.

(Step S402)

In step S402, the reproduction apparatus determines whether or not the display apparatus is HDR-compliant based on the di splay apparatus information acquired from the display apparatus in step S401.

In case of a non-HDR compliant display apparatus such as an SDR television set or the like, the determination made in step S402 is No, and the process proceeds to step S403.

On the other hand, in a case where it is checked that the connected display apparatus is an HDR-compliant display apparatus such as an HDR television set or the like, the determination made in step S402 is Yes, and the process proceeds to step S405.

(Step S403)

In step S402, in a case where the display apparatus connected to the reproduction apparatus is checked to be a non-HDR compliant display apparatus, in step S403, image information corresponding to an SDR is acquired from the program information record field [ProgramInfo] that is an existing field defined in advance in the clip information file.

Such information corresponding to an SDR image is acquired from the program information record field [ProgramInfo] that is an existing field defined in advance in the clip information file illustrated in FIG. 23.

From the program information record field [ProgramInfo], image information relating to an SDR image, for example, information such as the stream coding information, the dynamic range setting information, and the color gamut setting information can be acquired.

(Step S404)

The reproduction apparatus reproduces an SDR image acquired from the clip AV stream file and outputs the SDR image to the display apparatus based on the image information corresponding to an SDR acquired from the existing field of the clip information file in step S403.

A process according to a series of steps including steps S402 (No) and S403 to S404 is performed as a process of outputting an SDR image to a non-HDR compliant display apparatus such as an SDR television set connected to the reproduction apparatus.

In other words, the output of an SDR image according to the display function of the display apparatus such as an SDR television set is performed, and image output that is appropriate for the display apparatus is performed.

(Step S405)

On the other hand, in a case where the display apparatus connected to the reproduction apparatus is checked to be an HDR-compliant display apparatus in step S402, the reproduction apparatus performs the process of step S405.

In step S405, the reproduction apparatus acquires the recording information of the clip information record field [ClipInfo( )] of the clip information file.

In the clip information record field [ClipInfo( )] of the clip information file, the application type (application_type) information described above with reference to FIG. 26 is recorded.

In other words, information of the image data reproduced according to this clip information file is recorded, and information indicating whether or not an HDR image is included is recorded.

In addition, an HDR flag similar to that described above in the playlist file is also recorded.

The data processing unit of the reproduction apparatus checks the application type (application_type) information of the clip information record field [ClipInfo( )] of the clip information file and the setting value of the HDR flag and can determine whether or not an HDR image is included in the reproduction target data according to the clip information file.

(Step S406)

The reproduction apparatus, based on the application type information acquired in step S405 and the setting of the HDR flag, determines whether or not an HDR image is included in the reproduction target data according to the clip information file.

In a case where an HDR image is included in the reproduction target data, the process proceeds to step S407.

In case of a value representing that an HDR image is not included in the reproduction target data, the process proceeds to step S403.

In a case where an HDR image is not included in the reproduction target data, the process of steps S403 to S404 is performed.

In other words, the image information corresponding to an SDR is acquired from the program information record field [ProgramInfo], which is an existing field defined in advance in the clip information file, and the SDR image is reproduced and output according to the acquired STN table corresponding to an SDR.

(Step S407)

In step S406, in a case where it is checked that an HDR image is included in the reproduction target data, the process proceeds to step S407.

In step S407, the reproduction apparatus acquires the image information from the program information record field [ProgramInfo] that is an existing field defined in advance in the clip information file.

In the program information record field [ProgramInfo], as described with reference to FIGS. 38 to 41, the image information relating to an HDR image is additionally recorded. For example, information such as the stream coding information, the dynamic range setting information, and the color gamut setting information corresponding to an HDR image can be acquired from the program information record field.

(Step S408)

The reproduction apparatus reproduces an HDR image acquired from the clip AV stream file and outputs the HDR image to the display apparatus based on the image information corresponding to an HDR acquired from the program information record field [ProgramInfo] of the clip information file in step S407.

A process according to a series of steps including steps S402 (Yes) to S405, S406 (Yes) to S407, and S408 is performed as a process of outputting an HDR image to an HDR-compliant display apparatus such as an HDR television set connected to the reproduction apparatus.

In other words, the output of an HDR image according to the display function of the display apparatus such as an HDR television set is performed, and image output that is appropriate for the display apparatus is performed.

In the flowchart illustrated in FIG. 42, while one of the HDR content and the SDR content is set to be output to the display apparatus, as the flow illustrated in FIG. 37 described above, for example, in a case where a content recorded in the disc is only an HDR content, and the display apparatus connected to the reproduction apparatus is non-HDR compliant (an SDR television set or the like), the reproduction apparatus may perform a process of converting the HDR, content into an SDR content and outputting the SDR content. Alternatively, a setting for generating a message indicating that normal output cannot be performed and outputting the generated message may be used.

In the flowchart illustrated in FIG. 42, while an example of performing a selective reproduction process of an SDR content and an HDR content is described, it is merely an example, and, for example, a selective reproduction process of contents having different settings as below also can be performed according to the flow illustrated in FIG. 42.

(1) an AVC content and an HEVC content (2) a 2K content (1920×1080 pixels) and a 4K content (3840×2160 pixels)

(3) a content of color gamut=BT.707 and a content of color gamut=BT.2020

In such a case, a process acquired by replacing "SDR" and "HDR" described in the flow illustrated in FIG. 42 as below may be performed.

(1) "SDR"→"AVC" and "HDR"→"HEVC"

(2) "SDR"→"2K" and "HDR"→"4K"

(3) "SDR"→"BT.707" and "HDR"→"BT.2020"

[5. Generation (Authoring) of Recording Data for Medium and Data Recording Process]

In the embodiments described above, the description has focused on a content reproduction process using a playlist file or a clip information file recorded in a disc.

However, the configuration according to the present disclosure includes not only the data reproduction process but also generation (authoring) of recording data for a medium, a data recording process for a medium, and furthermore, an information recording medium having data recorded thereon.

For example, an information processing apparatus performing generation (authoring) recording data for a medium performs a process of generating a playlist file or a clip information file described above.

More specifically, a data processing unit performing a generation process of recording data for a disc is included, and the data processing unit performs a generation process of a file including the following data as a reproduction control information file corresponding to reproduction data.

identification data representing whether or not an ultra-high definition (UHD) image is recorded as control target data based on the reproduction control information file in a case where the ultra-high definition (UHD) is included as the control target data based on the reproduction control information file, image information of the ultra-high definition (UHD) image The reproduction control information file recording these is generated.

For example, the data processing unit generates a reproduction control information file in which identification data representing whether or not high dynamic range (HDR) image data is recorded as control target data based on the reproduction control information file and, in a case where the HDR image data is included as control target data based on the reproduction control information file, image information of the HDR image are recorded.

Here, the reproduction control information file is a playlist file or a clip information file and has a configuration in which the data described in the embodiment described above is recorded.

For example, one playlist file or one clip information file in which image information of both high dynamic range (HDR) image data and standard dynamic range (SDR) image data is recorded is generated.

In addition, an information recording medium having data generated by the recording data generating process described above recorded thereon, for example, has the following configuration.

The information recording medium records a reproduction data storage file and a reproduction control information file corresponding to the reproduction data storage file, and the reproduction control information file, as recording data, includes: identification data representing whether or not an ultra-high definition (UHD) image is recorded as control target data based on the reproduction control information file and image information of the ultra-high definition (UHD) image in a case where the ultra-high definition (UHD) is included as the control target data based on the reproduction control information file.

A reproduction apparatus reproducing a disc having such data recorded thereon, as described in each embodiment described above, can acquire image information of the ultra-high definition (UHD) image by referring to the reproduction control information file.

Here, the reproduction control information file is a playlist file or a clip information file storing the recording data described in the embodiments described above.

[7. Example of Configuration of Information Processing Apparatus]

Next, an example of the hardware configuration of an information processing apparatus that can be applied as a disc reproduction apparatus, a recording data generating apparatus, a data recording apparatus, or an information recording medium manufacturing apparatus will be described with reference to FIG. 43.

A central processing unit (CPU) 301 functions as a data processing unit that executes various processes according to a program stored in a read only memory (ROM) 302 or a storage unit 308. For example, a process according to the sequence described in the embodiments described above is executed. In a random access memory (RAM) 303, programs executed by the CPU 301, data, and the like are stored. The CPU 301, the ROM 302, and the RAM 303 are interconnected through a bus 304.

The CPU 301 is connected to an input/output, interface 305 through the bus 304, and an input unit 306 configured by various switches, a keyboard, a mouse, a microphone or the like, and an output unit 307 configured by a display, a speaker or the like are connected to the input/output interface 305. The CPU 301 executes various processes in response to an instruction input from the input unit 306 and outputs a result of the process, for example, to the output unit 307.

A storage unit 308 connected to the input/output interface 305, for example, is configured by a hard disk or the like and stores programs executed by the CPU 301 and various kinds of data. A communication unit 309 functions as a transmission/reception unit of data communication through a network such as the Internet or a local area network and furthermore a transmission/reception unit of broadcast waves and communicates with external apparatuses.

A drive 310 connected to the input/output interface 305 drives a magnetic disk, an optical disc, a magneto-optical disk, or a removable medium 311 such as a semiconductor memory including a memory card and the like and records/reads data.

While data coding or data decoding can be executed as the process of the CPU 301 as a data processing unit, a codec as hardware dedicated for executing a coding process or a decoding process may be configured to be included.

[7. Summary of Configuration of Present Disclosure]

As above, embodiments of the present disclosure have been described in detail with reference to specific embodiments. However, it is apparent that those skilled in the art can modify the embodiments or make a substitution for elements thereof in a range not departing from the concept of the present disclosure. In other words, since the present invention has been disclosed in exemplary forms, the present invention should not be construed as being limited to the embodiments. In order to determine the concept of the present disclosure, the claims need to be considered.

Technologies disclosed in this specification may take the following configurations.

(1)

An information processing apparatus including:

a data processing unit that performs a reproduction process of a disc recording data, wherein the data processing unit acquires a reproduction control information file corresponding to reproduction data recorded in a disc, determines whether or not an ultra-high definition (UHD) image is recorded in the disc based on recording data of the acquired reproduction control information file, and acquires image information of the ultra-high definition (UHD) image from the reproduction control information and controls output data for a display apparatus based on the acquired image information in a case where the ultra-high definition (UHD) image is recorded in the disc.

(2)

The information processing apparatus according to (1), wherein the data processing unit determines whether or not high dynamic range (HDR) image data is recorded in the disc based on the recording data of the reproduction control information file, and acquires image information of the HDR image from the reproduction control information and controls the output data for the display apparatus based on the acquired image information in a case where the HDR image is recorded in the disc.

(3)

The information processing apparatus according to (1) or (2), wherein the reproduction control information file is a playlist file, and wherein the data processing unit acquires the image information of the ultra-high definition (UHD) image from the playlist file and controls the output data for the display apparatus based on the acquired image information.

(4)

The information processing apparatus according to (3), wherein the data processing unit acquires the image information of the ultra-high definition (UHD) image from an extension data record field of the playlist file and controls the output data for the display apparatus based on the acquired image information.

(5)

The information processing apparatus according to (4), wherein the data processing unit acquires the image information of the ultra-nigh definition (UHD) image from a stream number table (STN) recorded in the extension data record field of the playlist file and controls the output data for the display apparatus based on the acquired image information.

(6)

The information processing apparatus according to (3), wherein the data processing unit acquires the image information of the ultra-high definition (UHD) image from a reproduction stream information record field of the playlist file and controls the output data for the display apparatus based on the acquired image information.

(7)

The information processing apparatus according to any of (1) to (6), wherein the reproduction control information file is a clip information file, and wherein the data processing unit acquires the image information of the ultra-high definition (UHD) image from the clip information file and controls the output data for the display apparatus based on the acquired image information.

(8)

The information processing apparatus according to (7), wherein the data processing unit acquires the image information of the ultra-high definition (UHD) image from an extension data record field of the clip information file and controls the output data for the display apparatus based on the acquired image information.

(9)

The information processing apparatus according to (8), wherein the data processing unit acquires image information of at least one of program information or CPI information of the ultra-high definition (UHD) image recorded in the extension data record field of the clip information file and controls the output data for the display apparatus based on the acquired image information.

(10)

The information processing apparatus according to (7), wherein the data processing unit acquires the image information of the ultra-high definition (UHD) image from a program information record field of the clip information file and controls the output data for the display apparatus based on the acquired image information.

(11)

An information processing apparatus including:
a data processing unit that performs a generation process of recording data for a medium, wherein
the data processing unit,
as a reproduction control information file corresponding to reproduction data,
generates the reproduction control information file in which
identification data representing whether or not an ultra-high definition (UHD) image is recorded as control target data based on the reproduction control information file, and
in a case where ultra-high definition (UHD) is included as control target data based on the reproduction control information file, image information of the ultra-nigh definition (UHD) image are recorded.

(12)

The information processing apparatus according to claim 11, wherein
the data processing unit
generates the reproduction control information file in which
identification data representing whether or not HDR (High Dynamic Range) image data is recorded as control target data based on the reproduction control information file and
in a case where the HDR image data is included as control target data based on the reproduction control information file, image information of the HDR image are recorded.

(13)

The information processing apparatus according to (11) or (12),
wherein the reproduction control information file is a playlist file, and
wherein the data processing unit generates the playlist file in which the identification data and the image information are recorded.

(14)

The information processing apparatus according to (13), wherein the data processing unit generates one playlist file in which image information of both high dynamic range (HDR) image data and standard dynamic range (SDR) image data that are control target data of the playlist file is recorded.

(15)

The information processing apparatus according to any of (11) to (14),
wherein the reproduction control information file is a clip information file, and
wherein the data processing unit generates the clip information file in which the identification data and the image information are recorded.

(16)

The information processing apparatus according to (15), wherein the data processing unit generates one clip information file in which image information of both high dynamic range (HDR) image data and standard dynamic range (SDR) image data that are control target data of the clip information file is recorded.

(17)

An information recording medium on which a reproduction data storage file and a reproduction control information file corresponding to the reproduction data storage file are recorded, wherein
the reproduction control information file includes
identification data representing whether or not an ultra-nigh definition (UHD) image is recorded as control target data based on the reproduction control information file, and
image information of the ultra-nigh definition (UHD) image as recording data in a case where ultra-high definition (UHD) is included as the control target data based on the reproduction control information file, and wherein
a reproduction apparatus reproducing the reproduction data has a configuration in which the image information of the ultra-high definition (UHD) image can be acquired by referring to the reproduction control information file.

(18)

The information recording medium according to (17), wherein the reproduction control information file is a playlist file or a clip information file.

(19)

An information processing method executed in an information processing apparatus,
the information processing apparatus including a data processing unit that performs a reproduction process of a disc recording data,
the information processing method using the data processing unit including:
acquiring a reproduction control information file corresponding to reproduction data recorded in a disc;
determining whether or not an ultra-high definition (UHD) image is recorded in the disc based on recording data of the acquired reproduction control information file; and
acquiring image information of the ultra-high definition (UHD) image from the reproduction control information and controlling output data for a display apparatus based on the acquired image information in a case where the ultra-nigh definition (UHD) image is recorded in the disc.

(20)

A program causing an information processing apparatus to execute an information process,
the information processing apparatus including a data processing unit that performs a reproduction process of a disc recording data,
the program causing the data processing unit to execute:
acquiring a reproduction control information file corresponding to reproduction data recorded in a disc;
determining whether or not an ultra-high definition (UHD) image is recorded in the disc based on recording data of the acquired reproduction control information file; and
acquiring image information of the ultra-high definition (UHD) image from the reproduction control information and controlling output data for a display apparatus based on the acquired image information in a case where the ultra-high definition (UHD) image is recorded in the disc.

A series of the processes described in the specification can be executed by hardware, software, or a combined configuration of both the hardware and software. In a case where the process is executed by software, a program recording a processing sequence can be installed to a memory arranged inside a computer built in dedicated hardware and executed, or the program can be installed to a general-purpose computer that can execute various processes and be executed. For example, the program may be recorded on a recording medium in advance. In addition to the installation of the program to a computer from a recording medium, the program can be received through a network called local area network (LAN) and the Internet and be installed to a recording medium such as a built-in hard disk.

Various processes described in this specification may be not only executed in a time series according to the description but also executed in a parallel or individual manner depending on the processing capacity of an apparatus executing the process or as is necessary. In this specification, a system is a logical aggregated configuration of a plurality of apparatuses, and the apparatuses of the configuration are not limited to be arranged inside the same casing.

INDUSTRIAL APPLICABILITY

As above, as described above, according the configuration of one embodiment of the present disclosure, image information of an ultra-high definition (UHD) image can be acquired from a playlist file or a clip information file, and a configuration performing image reproduction corresponding to a display apparatus is realized.

More specifically, a data processing unit that performs a reproduction process of a disc recording data acquires a playlist file or a clip information file as a reproduction control information file corresponding to reproduction data recorded in a disc, determines whether or not an ultra-nigh definition (UHD) image is recorded in the disc based on recording data of such a file, and, in a case where the ultra-high definition (UHD) image is recorded in the disc, acquires image information of the ultra-high definition (UHD) image from the reproduction control information and controls output data for a display apparatus based on the acquired image information.

According to this configuration, image reproduction according to a display apparatus is realized by acquiring image information of an ultra-high definition (UHD) image from a playlist file or a clip information file.

REFERENCE SIGNS LIST

10 Information recording medium (disc)
20 Information processing apparatus
31 Non-HDR compliant display apparatus (SDR television set)
32 HDR-compliant display apparatus (HDR television set)
51 Management information setting unit
52 Data unit
301 CPU
302 ROM
303 RAM
304 Bus
305 Input/output interface
306 Input unit
307 Output unit
308 Storage unit
309 Communication unit
310 Drive
311 Removable medium

The invention claimed is:
1. An information processing apparatus comprising:
a data processing unit that performs a reproduction process of a recording data, wherein
the data processing unit
acquires a reproduction control information file corresponding to reproduction data recorded in a recording medium,
determines whether or not an ultra-high definition (UHD) image is recorded in the recording medium based on recording data of the acquired reproduction control information file, and
acquires image information of the ultra-high definition (UHD) image from the reproduction control information and controls output data for a display apparatus based on the acquired image information in a case where the ultra-high definition (UHD) image is recorded in the recording medium.

2. The information processing apparatus according to claim 1, wherein
the data processing unit
determines whether or not high dynamic range (HDR) image data is recorded in the recording medium based on the recording data of the reproduction control information file, and
acquires image information of the HDR image from the reproduction control information and controls the output data for the display apparatus based on the acquired image information in a case where the HDR image is recorded in the recording medium.

3. The information processing apparatus according to claim 1,
wherein the reproduction control information file is a playlist file, and
wherein the data processing unit acquires the image information of the ultra-high definition (UHD) image from the playlist file and controls the output data for the display apparatus based on the acquired image information.

4. The information processing apparatus according to claim 3, wherein the data processing unit acquires the image information of the ultra-high definition (UHD) image from an extension data record field of the playlist file and controls the output data for the display apparatus based on the acquired image information.

5. The information processing apparatus according to claim 4, wherein the data processing unit acquires the image information of the ultra-high definition (UHD) image from a stream number table (STN) recorded in the extension data record field of the playlist file and controls the output data for the display apparatus based on the acquired image information.

6. The information processing apparatus according to claim 3, wherein the data processing unit acquires the image information of the ultra-high definition (UHD) image from a reproduction stream information record field of the playlist file and controls the output data for the display apparatus based on the acquired image information.

7. The information processing apparatus according to claim 1,
wherein the reproduction control information file is a clip information file, and
wherein the data processing unit acquires the image information of the ultra-high definition (UHD) image from the clip information file and controls the output data for the display apparatus based on the acquired image information.

8. The information processing apparatus according to claim 7, wherein the data processing unit acquires the image information of the ultra-high definition (UHD) image from an extension data record field of the clip information file and controls the output data for the display apparatus based on the acquired image information.

9. The information processing apparatus according to claim 8, wherein the data processing unit acquires image information of at least one of program information or CPI information of the ultra-high definition (UHD) image recorded in the extension data record field of the clip information file and controls the output data for the display apparatus based on the acquired image information.

10. The information processing apparatus according to claim 7, wherein the data processing unit acquires the image information of the ultra-high definition (UHD) image from a program information record field of the clip information file and controls the output data for the display apparatus based on the acquired image information.

11. An information processing apparatus comprising:
a data processing unit that performs a generation process of recording data for a medium, wherein
the data processing unit,
as a reproduction control information file corresponding to reproduction data,
generates the reproduction control information file in which
identification data representing whether or not an ultra-high definition (UHD) image is recorded as control target data based on the reproduction control information file, and
in a case where ultra-high definition (UHD) is included as control target data based on the reproduction control information file, image information of the ultra-high definition (UHD) image are recorded.

12. The information processing apparatus according to claim 11, wherein
the data processing unit
generates the reproduction control information file in which
identification data representing whether or not high dynamic range (HDR) image data is recorded as control target data based on the reproduction control information file and
in a case where the HDR image data is included as control target data based on the reproduction control information file, image information of the HDR image are recorded.

13. The information processing apparatus according to claim 11,
wherein the reproduction control information file is a playlist file, and
wherein the data processing unit generates the playlist file in which the identification data and the image information are recorded.

14. The information processing apparatus according to claim 13, wherein the data processing unit generates one playlist file in which image information of both high dynamic range (HDR) image data and standard dynamic range (SDR) image data that are control target data of the playlist file is recorded.

15. The information processing apparatus according to claim 11,
wherein the reproduction control information file is a clip information file, and
wherein the data processing unit generates the clip information file in which the identification data and the image information are recorded.

16. The information processing apparatus according to claim 15, wherein the data processing unit generates one clip information file in which image information of both high dynamic range (HDR) image data and standard dynamic range (SDR) image data that are control target data of the clip information file is recorded.

17. A non-transitory computer-readable information recording medium on which a reproduction data storage file and a reproduction control information file corresponding to the reproduction data storage file are recorded, wherein
the reproduction control information file includes
identification data representing whether or not an ultra-high definition (UHD) image is recorded as control target data based on the reproduction control information file, and
image information of the ultra-high definition (UHD) image as recording data in a case where ultra-high definition (UHD) is included as the control target data based on the reproduction control information file, and
wherein a reproduction apparatus reproducing the reproduction data has a configuration in which the image information of the ultra-high definition (UHD) image can be acquired by referring to the reproduction control information file.

18. The non-transitory computer-readable information recording medium according to claim 17, wherein the reproduction control information file is a playlist file or a clip information file.

19. An information processing method executed in an information processing apparatus,
the information processing apparatus including a data processing unit that performs a reproduction process of a recording data,
the information processing method using the data processing unit comprising:
acquiring a reproduction control information file corresponding to reproduction data recorded in a recording medium;
determining whether or not an ultra-high definition (UHD) image is recorded in the recording medium based on recording data of the acquired reproduction control information file; and
acquiring image information of the ultra-high definition (UHD) image from the reproduction control information and controlling output data for a display apparatus based on the acquired image information in a case where the ultra-high definition (UHD) image is recorded in the recording medium.

20. A non-transitory computer-readable medium having embodied thereon a program, which when executed by at least one processor of an information processing apparatus that includes a data processing unit that performs a reproduction process of a recording data, causes the data processing unit of the information processing apparatus to execute an information processing method, the information processing method comprising:
acquiring a reproduction control information file corresponding to reproduction data recorded in a recording medium;
determining whether or not an ultra-high definition (UHD) image is recorded in the recording medium based on recording data of the acquired reproduction control information file; and
acquiring image information of the ultra-high definition (UHD) image from the reproduction control information and controlling output data for a display apparatus based on the acquired image information in a case where the ultra-high definition (UHD) image is recorded in the recording medium.

* * * * *